United States Patent
Danziger

(10) Patent No.: US 12,025,743 B2
(45) Date of Patent: *Jul. 2, 2024

(54) INTERLACED SCAN PATTERNS FOR LIDAR SYSTEM

(71) Applicant: Luminar Tehnologies, Inc., Orlando, FL (US)

(72) Inventor: Eric C. Danziger, San Francisco, CA (US)

(73) Assignee: Luminar Technologies, Inc., Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/886,671

(22) Filed: Aug. 12, 2022

(65) Prior Publication Data

US 2022/0390573 A1    Dec. 8, 2022

Related U.S. Application Data

(63) Continuation of application No. 16/155,337, filed on Oct. 9, 2018, now Pat. No. 11,415,676.

(Continued)

(51) Int. Cl.
*G01S 7/48* (2006.01)
*G01S 7/481* (2006.01)
(Continued)

(52) U.S. Cl.
CPC ......... *G01S 7/4817* (2013.01); *G01S 7/4802* (2013.01); *G01S 7/4808* (2013.01); *G01S 7/4865* (2013.01);
(Continued)

(58) Field of Classification Search
USPC ....................................................... 356/5.01
See application file for complete search history.

(56) References Cited

U.S. PATENT DOCUMENTS 9,383,753 B1    7/2016    Templeton
9,791,557 B1    10/2017   Wyrwas et al.
(Continued)

FOREIGN PATENT DOCUMENTS

WO    2018/055449    3/2018

OTHER PUBLICATIONS

Non-Final Office Action dated Sep. 20, 2023 for U.S. Appl. No. 17/883,722.
(Continued)

*Primary Examiner* — James R Hulka

(57) ABSTRACT

In one embodiment, a lidar system includes a light source configured to emit pulses of light. The lidar system also includes a scanner configured to scan at least a portion of the emitted pulses of light along an interlaced scan pattern, including: (i) scanning the portion of the emitted pulses of light substantially parallel to a first scan axis to produce multiple scan lines of the interlaced scan pattern; and (ii) distributing the scan lines along a second scan axis in an interlaced manner, where the interlaced scan pattern is an n-fold interlaced scan pattern that includes n sub-scans, where: n is an integer greater than or equal to 2, each sub-scan includes two or more of the scan lines of the interlaced scan pattern, and the n sub-scans are scanned sequentially where a first sub-scan of the n sub-scans is scanned prior to a second sub-scan.

25 Claims, 20 Drawing Sheets

Related U.S. Application Data

(60) Provisional application No. 62/569,991, filed on Oct. 9, 2017.

(51) Int. Cl.

| | | |
|---|---|---|
| *G01S 7/4865* | (2020.01) | |
| *G01S 17/08* | (2006.01) | |
| *G01S 17/42* | (2006.01) | |
| *G01S 17/89* | (2020.01) | |
| *G01S 17/931* | (2020.01) | |
| *G02B 26/10* | (2006.01) | |
| *G01S 17/10* | (2020.01) | |

(52) U.S. Cl.
CPC .............. *G01S 17/08* (2013.01); *G01S 17/42* (2013.01); *G01S 17/89* (2013.01); *G01S 17/931* (2020.01); *G02B 26/10* (2013.01); *G01S 17/10* (2013.01)

(56) References Cited

U.S. PATENT DOCUMENTS

| | | |
|---|---|---|
| 9,874,629 B2 | 1/2018 | Kostamovaara |
| 10,131,446 B1 | 11/2018 | Stambler et al. |
| 10,345,437 B1 | 7/2019 | Russell et al. |
| 10,802,120 B1 | 10/2020 | LaChapelle et al. |
| 11,415,676 B2* | 8/2022 | Danziger .............. G01S 7/4802 |
| 2002/0059042 A1 | 5/2002 | Kacyra et al. |
| 2003/0043058 A1 | 3/2003 | Jamieson et al. |
| 2005/0057741 A1 | 3/2005 | Anderson et al. |
| 2005/0225478 A1 | 10/2005 | Nakamura |
| 2005/0243301 A1 | 11/2005 | Takagi |
| 2008/0123167 A1 | 5/2008 | Weiss et al. |
| 2008/0158417 A1 | 7/2008 | Living |
| 2008/0278715 A1 | 11/2008 | Swenson et al. |
| 2008/0284704 A1 | 11/2008 | Song et al. |
| 2009/0185159 A1 | 7/2009 | Rohner et al. |
| 2011/0286066 A1 | 11/2011 | Weiss et al. |
| 2012/0257186 A1 | 10/2012 | Rieger et al. |
| 2012/0263224 A1 | 10/2012 | Mohnen |
| 2012/0281199 A1 | 11/2012 | Thielen et al. |
| 2013/0127854 A1 | 5/2013 | Shpunt et al. |
| 2013/0207970 A1 | 8/2013 | Shpunt et al. |
| 2013/0242363 A1 | 9/2013 | Weiss et al. |
| 2013/0329808 A1 | 12/2013 | Mohnen et al. |
| 2014/0043309 A1 | 2/2014 | Go et al. |
| 2014/0063489 A1 | 3/2014 | Steffey et al. |
| 2014/0240317 A1 | 8/2014 | Go et al. |
| 2014/0300885 A1 | 10/2014 | Debrunner et al. |
| 2014/0327945 A1 | 11/2014 | Weiss et al. |
| 2016/0006914 A1 | 1/2016 | Neumann |
| 2016/0047896 A1 | 2/2016 | Dussan |
| 2016/0047903 A1 | 2/2016 | Dussan |
| 2016/0259058 A1 | 9/2016 | Verheggen et al. |
| 2016/0274589 A1 | 9/2016 | Templeton et al. |
| 2017/0153319 A1 | 6/2017 | Villeneuve et al. |
| 2017/0269215 A1 | 9/2017 | Hall et al. |
| 2017/0328990 A1 | 11/2017 | Magee et al. |
| 2017/0350983 A1 | 12/2017 | Hall et al. |
| 2018/0059248 A1 | 3/2018 | O'Keefe |
| 2018/0113216 A1 | 4/2018 | Kremer et al. |
| 2018/0164410 A1 | 6/2018 | Gnecchi et al. |
| 2018/0172804 A1 | 6/2018 | Gassend et al. |
| 2018/0172807 A1 | 6/2018 | Korcut et al. |
| 2018/0188355 A1 | 7/2018 | Bao et al. |
| 2018/0188357 A1 | 7/2018 | Li et al. |
| 2018/0224528 A1 | 8/2018 | Rieger et al. |
| 2018/0231644 A1 | 8/2018 | Gassend et al. |
| 2018/0259645 A1 | 9/2018 | Shu et al. |
| 2018/0284224 A1 | 10/2018 | Weed et al. |
| 2018/0284234 A1 | 10/2018 | Curatu |
| 2018/0329037 A1 | 11/2018 | Bozchalooi |
| 2019/0001442 A1 | 1/2019 | Unrath et al. |
| 2019/0107606 A1 | 4/2019 | Russell et al. |
| 2019/0107607 A1* | 4/2019 | Danziger .............. G01S 7/4802 |
| 2019/0107623 A1 | 4/2019 | Campbell et al. |
| 2019/0129009 A1 | 5/2019 | Eichenholz et al. |
| 2019/0154808 A1 | 5/2019 | Gassend et al. |
| 2019/0180502 A1 | 6/2019 | England et al. |
| 2019/0235083 A1 | 8/2019 | Zhang et al. |
| 2019/0310368 A1 | 10/2019 | LaChapelle |
| 2019/0324124 A1 | 10/2019 | O'Keefe |
| 2020/0132851 A1 | 4/2020 | Gassend et al. |
| 2020/0284908 A1 | 9/2020 | Paulsen |

OTHER PUBLICATIONS

Wikipedia Contributors. "Optical Amplifier." Wikipedia, The Free Encyclopedia, May 31, 2023.

* cited by examiner

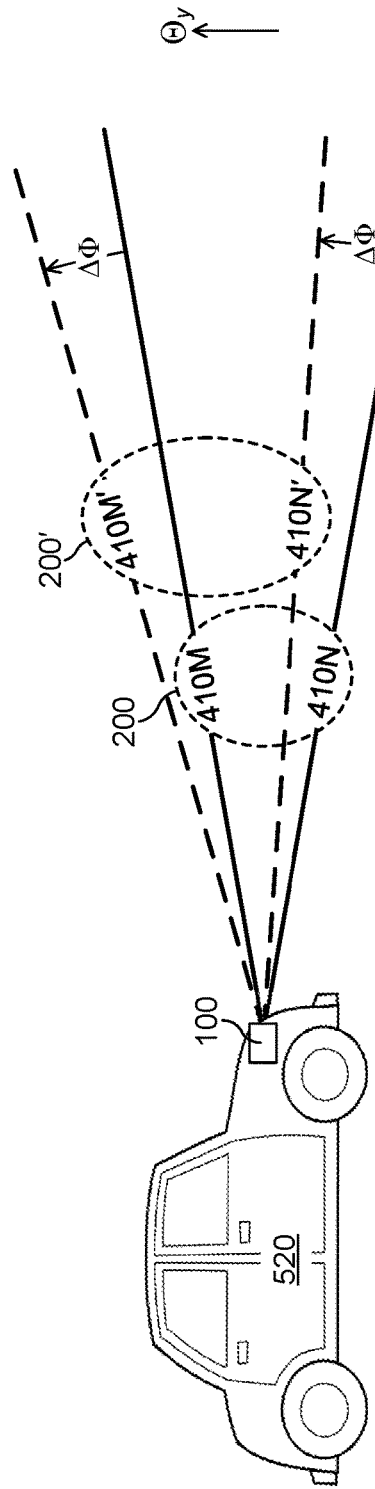
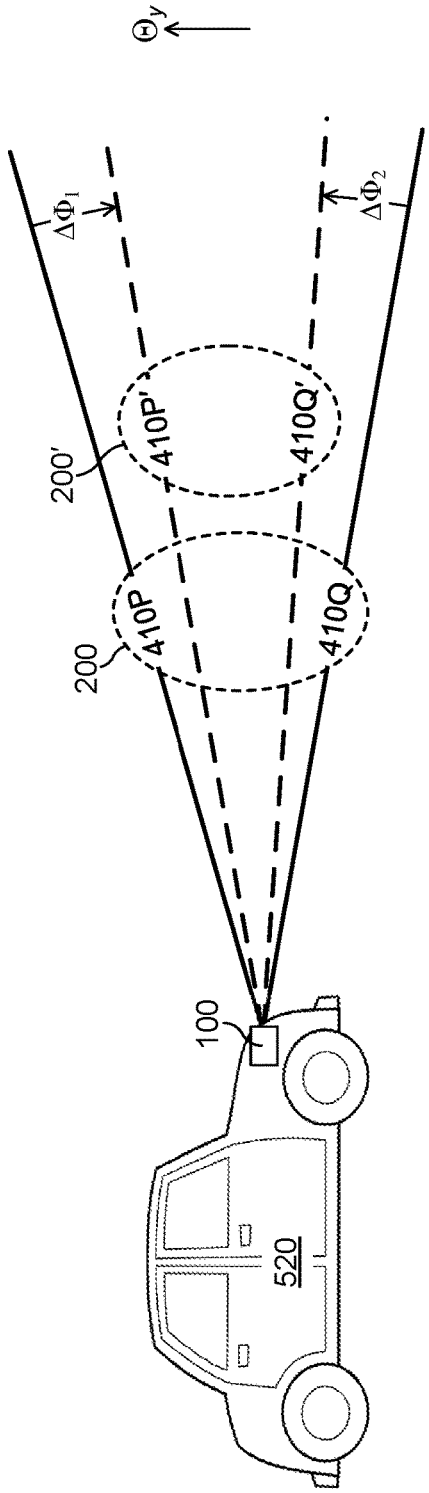
Figure 24
Figure 25

INTERLACED SCAN PATTERNS FOR LIDAR SYSTEM

PRIORITY

This application is a continuation of U.S. patent application Ser. No. 16/155,337, filed 9 Oct. 2018, which claims the benefit, under 35 U.S.C. § 119(e), of U.S. Provisional Application No. 62/569,991, filed 9 Oct. 2017, both of which are incorporated herein by reference.

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

BRIEF DESCRIPTION OF THE DRAWINGS

FIGS. 24-25 each illustrate an example scan pattern to which one or more angular offsets are applied.

DESCRIPTION OF EXAMPLE EMBODIMENTS

Figure 1:
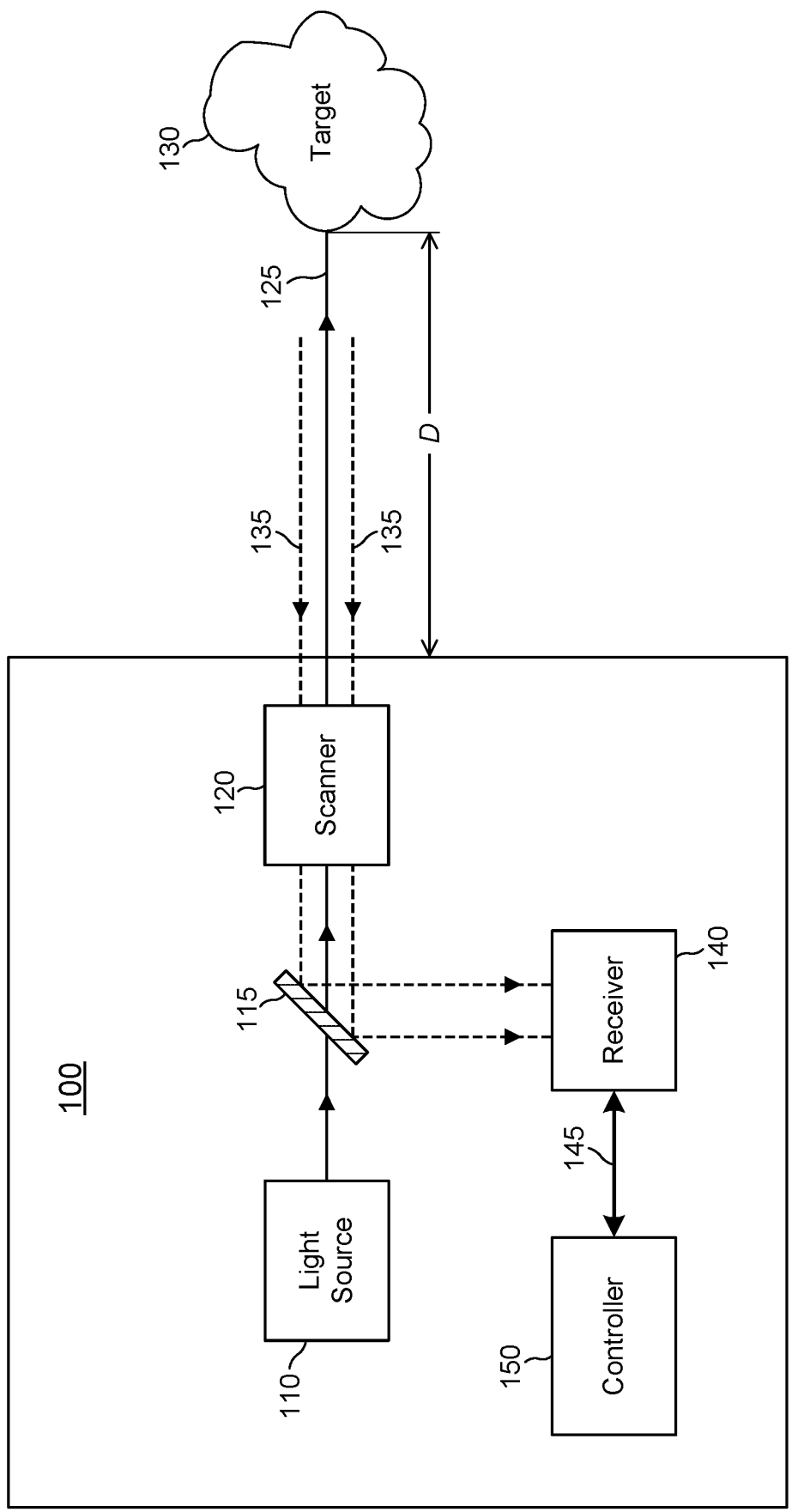
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with an operating wavelength between approximately 1.2 μm and 1.7 μm. The light source 110 emits an output beam of light 125 which may be continuous-wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is directed by mirror 115 to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (μJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ. In particular embodiments, output beam 125 may be referred to as a laser beam, light beam, optical beam, emitted beam, or beam. In particular embodiments, input beam 135 may be referred to as a return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and generate one or more representative signals. For example, the receiver 140 may generate an output electrical signal 145 that is representative of the input beam 135. This electrical signal 145 may be sent to controller 150. In particular embodiments, controller 150 may include a processor, computing system (e.g., an ASIC or FPGA), or other suitable circuitry configured to analyze one or more characteristics of the electrical signal 145 from the receiver 140 to determine one or more characteristics of the target 130, such as its distance downrange from the lidar system 100. This can be done, for example, by analyzing the time of flight or phase modulation for a beam of light 125 transmitted by the light source 110. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D = c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 µs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 100 kHz to 5 MHz or a pulse period (e.g., a time between consecutive pulses) of approximately 200 ns to 10 µs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 µs. As another example, light source 110 may have a pulse repetition frequency that can be varied from approximately 500 kHz to 3 MHz. As used herein, a pulse of light may be referred to as an optical pulse, a light pulse, or a pulse.

In particular embodiments, light source 110 may produce a pulsed or CW free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 µJ, 0.1 µJ, 1 µJ, 10 µJ, 100 µJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E = P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 µJ has a peak power of approximately 1 kW. The average power ($P_{av}$) of an output beam 125 can be related to the pulse repetition frequency (PRF) and pulse energy by the expression $P_{av} = PRF \cdot E$. For example, if the pulse repetition frequency is 500 kHz, then the average power of an output beam 125 with 1-µJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, or a vertical-cavity surface-emitting laser (VCSEL). As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed laser diode with a peak emission wavelength between 1400 nm and 1600 nm. As an example, light source 110 may include a current-modulated InGaAsP DFB laser diode that produces optical pulses at a wavelength of approximately 1550 nm.

In particular embodiments, light source 110 may include a pulsed or CW laser diode followed by one or more optical-amplification stages. As an example, light source 110 may be a fiber-laser module that includes a CW or current-modulated laser diode with an operating wavelength of approximately 1550 nm followed by a single-stage or a multi-stage erbium-doped fiber amplifier (EDFA). As another example, light source 110 may include a continuous-wave (CW) or quasi-CW laser diode followed by an external optical modulator (e.g., an electro-optic amplitude modulator), and the output of the modulator may be fed into an optical amplifier. As another example, light source 110 may include a pulsed or CW laser diode followed by a semiconductor optical amplifier (SOA). The SOA may include an active optical waveguide configured to receive light from the laser diode and amplify the light as it propagates through the waveguide. The SOA may be integrated on the same chip as the laser diode, or the SOA may be a separate device with an anti-reflection coating on its input facet or output facet. In particular embodiments, light source 110 may include a laser diode which produces optical pulses that are not amplified by an optical amplifier. As an example, a laser diode (which may be referred to as a direct emitter or a direct-emitter laser diode) may emit optical pulses that form an output beam 125 that is directed downrange from a lidar system 100. A light source 110 that includes a direct-emitter laser diode may not include an optical amplifier, and the optical pulses produced by a direct emitter may not be amplified. A direct-emitter laser diode may be driven by an electrical power source that supplies current pulses to the laser diode, and each current pulse may result in the emission of an output optical pulse.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce linearly polarized light, and lidar system 100 may include a quarter-wave plate that converts this linearly polarized light into circularly polarized light. The circularly polarized light may be transmitted as output beam 125, and lidar system 100 may receive input beam 135, which may be substantially or at least partially circularly polarized in the same manner as the output beam 125 (e.g., if output beam 125 is right-hand circularly polarized, then input beam 135 may also be right-hand circularly polarized). The input beam 135 may pass through the same quarter-wave plate (or a different quarter-wave plate) resulting in the input beam 135 being converted to linearly polarized light which is orthogonally polarized (e.g., polarized at a right angle) with respect to the linearly polarized light produced by light source 110. As another example, lidar system 100 may employ polarization-diversity detection where two polarization components are detected separately. The output beam 125 may be linearly polarized, and the lidar system 100 may split the input beam 135 into two polarization components (e.g., s-polarization and p-polarization) which are detected separately by two photodiodes (e.g., a balanced photoreceiver that includes two photodiodes).

In particular embodiments, lidar system 100 may include one or more optical components configured to condition, shape, filter, modify, steer, or direct the output beam 125 or the input beam 135. As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto an active region of a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto an active region of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115. As an example, mirror 115 (which may be referred to as an overlap mirror, superposition mirror, or beam-combiner mirror) may include a hole, slot, or aperture which output light beam 125 passes through. As another example, mirror 115 may be configured so that at least 80% of output beam 125 passes through mirror 115 and at least 80% of input beam 135 is reflected by mirror 115. In particular embodiments, mirror 115 may provide for output beam 125 and input beam 135 to be substantially coaxial so that the two beams travel along substantially the same optical path (albeit in opposite directions).

In particular embodiments, lidar system 100 may include a scanner 120 to steer the output beam 125 in one or more directions downrange. As an example, scanner 120 may include one or more scanning mirrors that are configured to rotate, oscillate, tilt, pivot, or move in an angular manner about one or more axes. In particular embodiments, a flat scanning mirror may be attached to a scanner actuator or mechanism which scans the mirror over a particular angular range. As an example, scanner 120 may include a galvanometer scanner, a resonant scanner, a piezoelectric actuator, a polygonal scanner, a rotating-prism scanner, a voice coil motor, an electric motor (e.g., a DC motor, a brushless DC motor, a synchronous electric motor, or a stepper motor), or a microelectromechanical systems (MEMS) device, or any other suitable actuator or mechanism. In particular embodiments, scanner 120 may be configured to scan the output beam 125 over a 5-degree angular range, 20-degree angular range, 30-degree angular range, 60-degree angular range, or any other suitable angular range. As an example, a scanning mirror may be configured to periodically oscillate or rotate back and forth over a 15-degree range, which results in the output beam 125 scanning across a 30-degree range (e.g., a $\Theta$-degree rotation by a scanning mirror results in a $2\Theta$-degree angular scan of output beam 125). In particular embodiments, a field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, or any other suitable FOR. In particular embodiments, a FOR may be referred to as a scan region.

In particular embodiments, scanner 120 may be configured to scan the output beam 125 (which includes at least a portion of the pulses of light emitted by light source 110) across a FOR of the lidar system 100. In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first mirror and a second mirror, where the first mirror directs the output beam 125 toward the second mirror, and the second mirror directs the output beam 125 downrange. As an example, the first mirror may scan the output beam 125 along a first direction, and the second mirror may scan the output beam 125 along a second direction that is substantially orthogonal to the first direction. As another example, the first mirror may scan the output beam 125 along a substantially horizontal direction, and the second mirror may scan the output beam 125 along a substantially vertical direction (or vice versa). In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern (which may be referred to as an optical scan pattern, optical scan path, or scan path) may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternately, the pixels may have a particular nonuniform distribution (e.g., the pixels may be distributed across all or a portion of the 60°×20° FOR, and the pixels may have a higher density in one or more particular regions of the 60°×20° FOR).

In particular embodiments, a light source 110 may emit pulses of light which are scanned by scanner 120 across a FOR of lidar system 100. One or more of the emitted pulses of light may be scattered by a target 130 located downrange from the lidar system 100, and a receiver 140 may detect at least a portion of the pulses of light scattered by the target 130. In particular embodiments, receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions). Receiver 140 may have an active region or an avalanche-multiplication region that includes silicon, germanium, or InGaAs. The active region of receiver 140 may have any suitable size, such as for example, a diameter or width of approximately 20-500 µm.

In particular embodiments, receiver 140 may include circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more characteristics (e.g., rising edge, falling edge, amplitude, or duration) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, a lidar system 100 may be used to determine the distance to one or more downrange targets 130. By scanning the lidar system 100 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

In particular embodiments, one or more lidar systems 100 may be integrated into a vehicle. As an example, multiple lidar systems 100 may be integrated into a car to provide a complete 360-degree horizontal FOR around the car. As another example, 4-10 lidar systems 100, each system having a 45-degree to 90-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

Although this disclosure describes or illustrates example embodiments of lidar systems 100 or light sources 110 that produce light waveforms that include pulses of light, the embodiments described or illustrated herein may also be applied to other types of light waveforms, including continuous-wave (CW) light or modulated light waveforms. For example, a lidar system 100 as described or illustrated herein may include a light source 110 configured to produce pulses of light. Alternatively, a lidar system 100 may be configured to act as a frequency-modulated continuous-wave (FMCW) lidar system and may include a light source 110 configured to produce CW light or a frequency-modulated light waveform.

A pulsed lidar system is one type of lidar system 100 in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered from a remote target) relative to the modulation frequency of the emitted light. For example, for a linearly chirped light source (e.g., a frequency modulation that produces a linear change in frequency with time), the larger the frequency difference between the emitted light and the received light, the farther away the target 130 is located. The frequency difference can be determined by mixing the received light with a portion of the emitted light (e.g., by coupling the two beams onto a detector, or mixing analog electric signals corresponding to the received light and the emitted light) and determining the resulting beat frequency. For example, the electrical signal from an APD can be analyzed using a fast Fourier transform (FFT) technique to determine the frequency difference between the emitted light and the received light.

If a linear frequency modulation m (e.g., in units of Hz/s) is applied to a CW laser, then the distance D from the target 130 to the lidar system 100 may be expressed as $D = c \cdot \Delta f/(2m)$, where c is the speed of light and $\Delta f$ is the difference in frequency between the transmitted light and the received light. For example, for a linear frequency modulation of $10^{12}$ Hz/s (or, 1 MHz/μs), if a frequency difference of 330 kHz is measured, then the distance to the target is approximately 50 meters. Additionally, a frequency difference of 1.33 MHz corresponds to a target located approximately 200 meters away.

The light source 110 for a FMCW lidar system can be a fiber laser (e.g., a seed laser diode followed by one or more optical amplifiers) or a direct-emitter laser diode. The seed laser diode or the direct-emitter laser diode can be operated in a CW manner (e.g., by driving the laser diode with a substantially constant DC current), and the frequency modulation can be provided by an external modulator (e.g., an electro-optic phase modulator). Alternatively, the frequency modulation can be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) can have any suitable frequency or shape (e.g., piecewise linear, sinusoidal, triangle-wave, or sawtooth).

Figure 2:
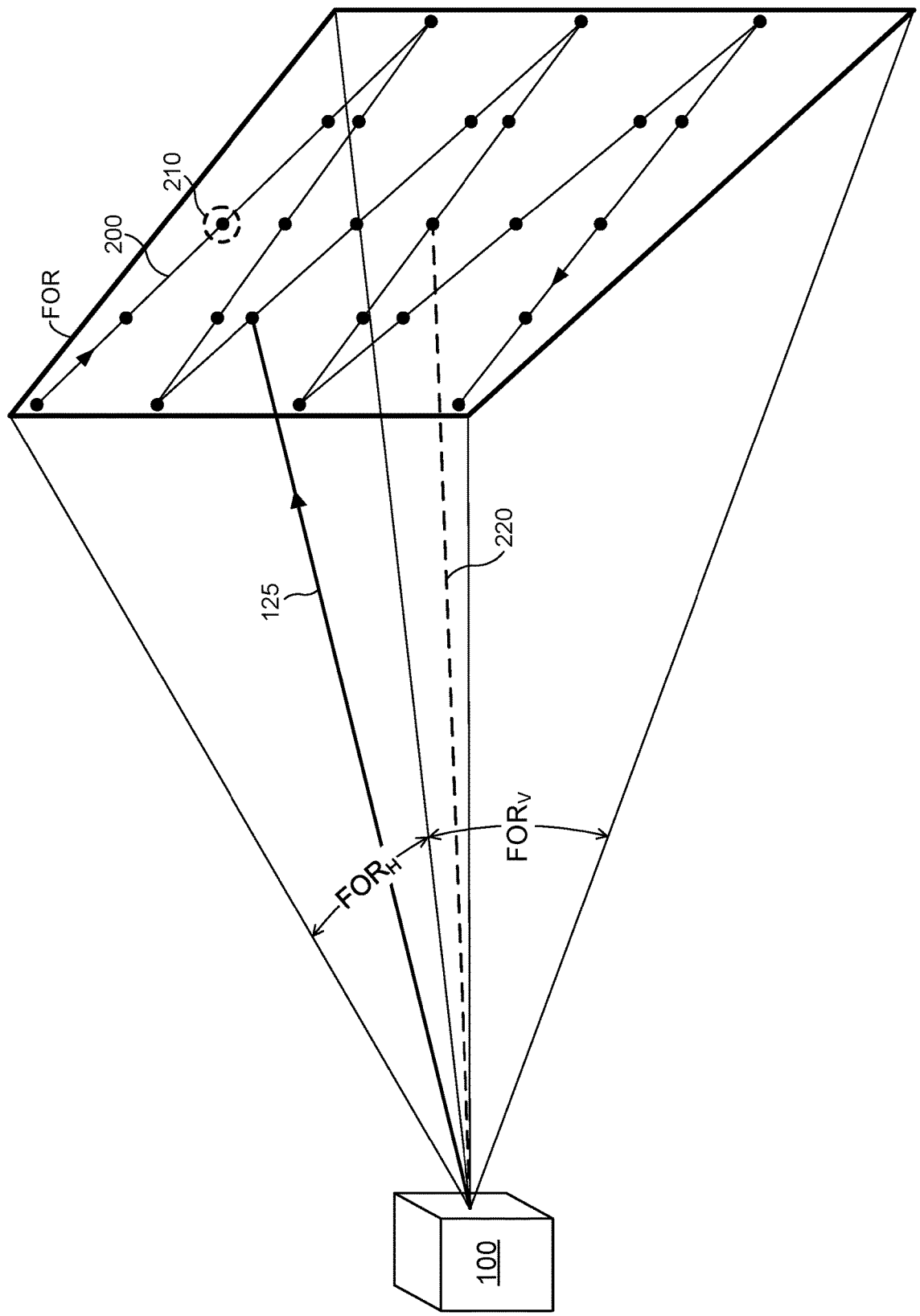
FIG. 2 illustrates an example scan pattern produced by a lidar system.

FIG. 2 illustrates an example scan pattern 200 produced by a lidar system 100. A scan pattern 200 (which may be referred to as a scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses and one or more corresponding distance measurements. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
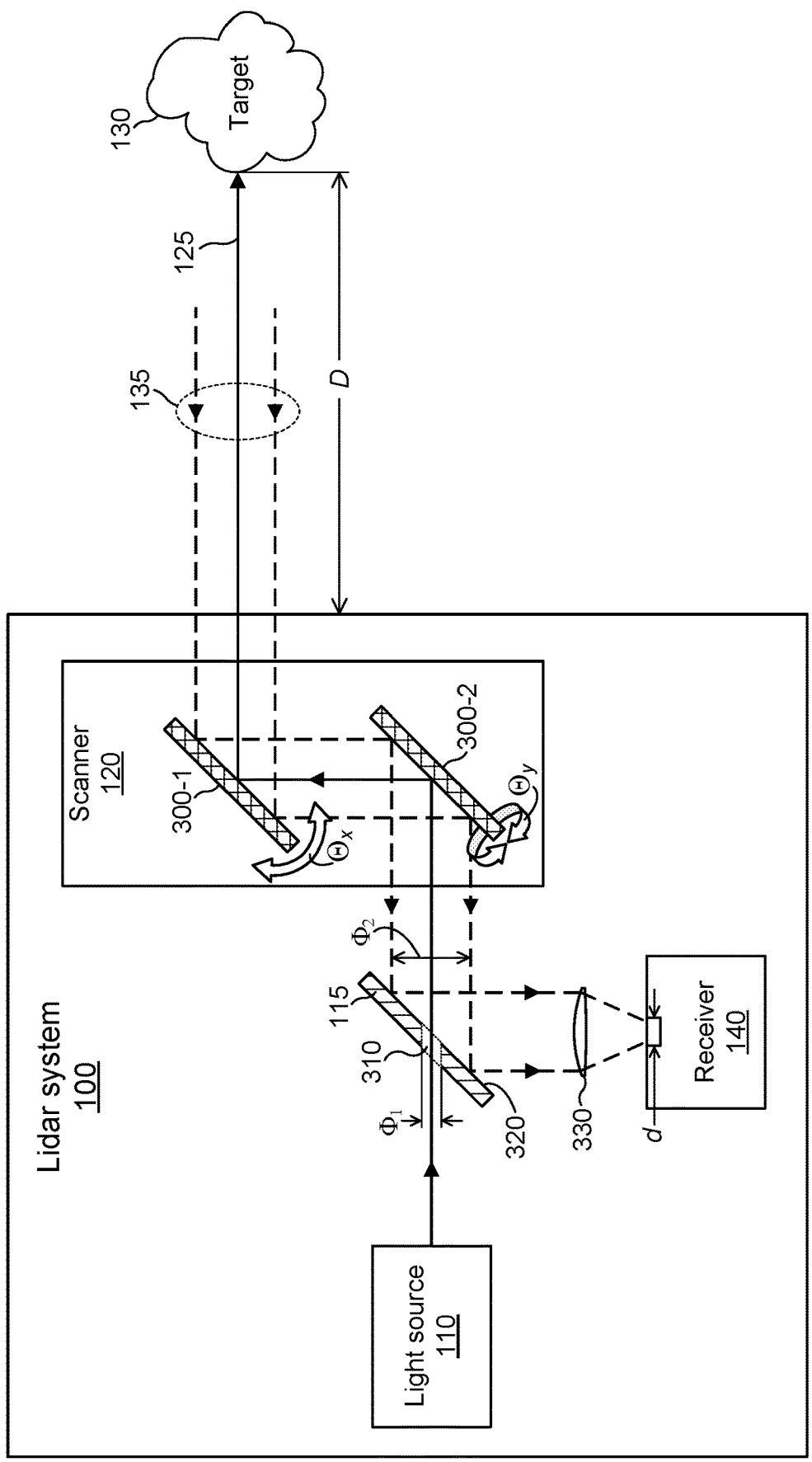
FIG. 3 illustrates an example lidar system with an example overlap mirror.

FIG. 3 illustrates an example lidar system 100 with an example overlap mirror 115. In particular embodiments, a lidar system 100 may include a light source 110 configured to emit pulses of light and a scanner 120 configured to scan at least a portion of the emitted pulses of light across a field of regard. As an example, the light source 110 may include a pulsed solid-state laser or a pulsed fiber laser, and the optical pulses produced by the light source 110 may be directed through aperture 310 of overlap mirror 115 and then coupled to scanner 120. In particular embodiments, a lidar system 100 may include a receiver 140 configured to detect at least a portion of the scanned pulses of light scattered by a target 130 located a distance D from the lidar system 100. As an example, one or more pulses of light that are directed downrange from lidar system 100 by scanner 120 (e.g., as part of output beam 125) may scatter off a target 130, and a portion of the scattered light may propagate back to the lidar system 100 (e.g., as part of input beam 135) and be detected by receiver 140.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to a maximum range $R_{MAX}$ of the lidar system 100. In particular embodiments, a maximum range (which may be referred to as a maximum distance) of a lidar system 100 may refer to the maximum distance over which the lidar system 100 is configured to sense or identify targets 130 that appear in a field of regard of the lidar system 100. The maximum range of lidar system 100 may be any suitable distance, such as for example, 25 m, 50 m, 100 m, 200 m, 500 m, or 1 km. As an example, a lidar system 100 with a 200-m maximum range may be configured to sense or identify various targets 130 located up to 200 m away from the lidar system 100. For a lidar system 100 with a 200-m maximum range ($R_{MAX}$=200 m), the time of flight corresponding to the maximum range is approximately $2 \cdot R_{MAX}/c \cong 1.33$ μs.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, overlap mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 1400 nm and approximately 2100 nm. As an example, lidar system 100 may include a laser with an operating wavelength between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 1530 nm and approximately 1560 nm. As another example, lidar system 100 may be a Class 1 or Class I laser product that includes a fiber laser or solid-state laser with an operating wavelength between approximately 1400 nm and approximately 1600 nm.

In particular embodiments, scanner 120 may include one or more mirrors, where each mirror is mechanically driven by a galvanometer scanner, a resonant scanner, a MEMS device, a voice coil motor, an electric motor, or any suitable combination thereof. A galvanometer scanner (which may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror is rotated back and forth using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate. An electric motor, such as for example, a brushless DC motor or a synchronous electric motor, may be used to continuously rotate a mirror at a substantially fixed frequency (e.g., a rotational frequency of approximately 1 Hz, 10 Hz, 50 Hz, 100 Hz, 500 Hz, or 1,000 Hz). The mirror may be continuously rotated in one rotation direction (e.g., clockwise or counter-clockwise relative to a particular rotation axis).

In particular embodiments, a scanner 120 may include any suitable number of mirrors driven by any suitable number of mechanical actuators. As an example, a scanner 120 may include a single mirror configured to scan an output beam 125 along a single direction (e.g., a scanner 120 may be a one-dimensional scanner that scans along a horizontal or vertical direction). The mirror may be driven by one actuator (e.g., a galvanometer) or two actuators configured to drive the mirror in a push-pull configuration. As another example, a scanner 120 may include a single mirror that scans an output beam 125 along two directions (e.g., horizontal and vertical). The mirror may be driven by two actuators, where each actuator provides rotational motion along a particular direction or about a particular axis. As another example, a scanner 120 may include two mirrors, where one mirror scans an output beam 125 along a substantially horizontal direction and the other mirror scans the output beam 125 along a substantially vertical direction. In the example of FIG. 3, scanner 120 includes two mirrors, mirror 300-1 and mirror 300-2. Mirror 300-2 rotates along the $\Theta_y$ direction and scans output beam 125 along a substantially vertical direction, and mirror 300-1 rotates along the $\Theta_x$ direction and scans output beam 125 along a substantially horizontal direction.

In particular embodiments, a scanner 120 may include two mirrors, where each mirror is driven by a corresponding galvanometer scanner. As an example, scanner 120 may include a galvanometer actuator that scans mirror 300-1 along a first direction (e.g., horizontal), and scanner 120 may include another galvanometer actuator that scans mirror 300-2 along a second direction (e.g., vertical). In particular embodiments, a scanner 120 may include two mirrors, where one mirror is driven by a galvanometer actuator and the other mirror is driven by a resonant actuator. As an example, a galvanometer actuator may scan mirror 300-1 along a first direction, and a resonant actuator may scan mirror 300-2 along a second direction. The first and second scanning directions may be substantially orthogonal to one another. As an example, the first direction may be substantially vertical, and the second direction may be substantially horizontal, or vice versa. In particular embodiments, a scanner 120 may include two mirrors, where one mirror is driven by an electric motor and the other mirror is driven by a galvanometer actuator. As an example, mirror 300-1 may be a polygon mirror that is rotated about a fixed axis by an electric motor (e.g., a brushless DC motor), and mirror 300-2 may be driven by a galvanometer or MEMS actuator. In particular embodiments, a scanner 120 may include two mirrors, where both mirrors are driven by electric motors. As an example, mirror 300-2 may be a polygon mirror driven by an electric motor, and mirror 300-1 may be driven by another electric motor. In particular embodiments, a scanner 120 may include one mirror driven by two actuators which are configured to scan the mirror along two substantially orthogonal directions. As an example, one mirror may be driven along a substantially horizontal direction by a resonant actuator or a galvanometer actuator, and the mirror may also be driven along a substantially vertical direction by a galvanometer actuator. As another example, a mirror may be driven along two substantially orthogonal directions by two resonant actuators or by two electric motors.

In particular embodiments, a scanner 120 may include a mirror configured to be scanned along one direction by two actuators arranged in a push-pull configuration. Driving a mirror in a push-pull configuration may refer to a mirror that is driven in one direction by two actuators. The two actuators may be located at opposite ends or sides of the mirror, and the actuators may be driven in a cooperative manner so that when one actuator pushes on the mirror, the other actuator pulls on the mirror, and vice versa. As an example, a mirror may be driven along a horizontal or vertical direction by two voice coil actuators arranged in a push-pull configuration. In particular embodiments, a scanner 120 may include one mirror configured to be scanned along two axes, where motion along each axis is provided by two actuators arranged in a push-pull configuration. As an example, a mirror may be driven along a horizontal direction by two resonant actuators arranged in a horizontal push-pull configuration, and the mirror may be driven along a vertical direction by another two resonant actuators arranged in a vertical push-pull configuration.

In particular embodiments, a scanner 120 may include two mirrors which are driven synchronously so that the output beam 125 is directed along any suitable scan pattern 200. As an example, a galvanometer actuator may drive mirror 300-1 with a substantially linear back-and-forth motion (e.g., the galvanometer may be driven with a substantially sinusoidal or triangle-shaped waveform) that causes output beam 125 to trace a substantially horizontal back-and-forth pattern. Additionally, another galvanometer actuator may scan mirror 300-2 along a substantially vertical direction. For example, the two galvanometers may be synchronized so that for every 64 horizontal traces, the output beam 125 makes a single trace along a vertical direction. As another example, a resonant actuator may drive mirror 300-1 along a substantially horizontal direction, and a galvanometer actuator or a resonant actuator may scan mirror 300-2 along a substantially vertical direction.

In particular embodiments, a scanner 120 may include one mirror driven by two or more actuators, where the actuators are driven synchronously so that the output beam 125 is directed along a particular scan pattern 200. As an example, one mirror may be driven synchronously along two substantially orthogonal directions so that the output beam 125 follows a scan pattern 200 that includes substantially straight lines. In particular embodiments, a scanner 120 may include two mirrors driven synchronously so that the synchronously driven mirrors trace out a scan pattern 200 that includes substantially straight lines. As an example, the scan pattern 200 may include a series of substantially straight lines directed substantially horizontally, vertically, or along any other suitable direction. The straight lines may be achieved by applying a dynamically adjusted deflection along a vertical direction (e.g., with a galvanometer actuator) as an output beam 125 is scanned along a substantially horizontal direction (e.g., with a galvanometer or resonant actuator). If a vertical deflection is not applied, the output beam 125 may trace out a curved path as it scans from side to side. By applying a vertical deflection as the mirror is scanned horizontally, a scan pattern 200 that includes substantially straight lines may be achieved. In particular embodiments, a vertical actuator may be used to apply both a dynamically adjusted vertical deflection as the output beam 125 is scanned horizontally as well as a discrete vertical offset between each horizontal scan (e.g., to step the output beam 125 to a subsequent row of a scan pattern 200).

In the example of FIG. 3, lidar system 100 produces an output beam 125 and receives light from an input beam 135. The output beam 125, which includes at least a portion of the pulses of light emitted by light source 110, may be scanned across a field of regard. The input beam 135 may include at least a portion of the scanned pulses of light which are scattered by one or more targets 130 and detected by receiver 140. In particular embodiments, output beam 125 and input beam 135 may be substantially coaxial. The input and output beams being substantially coaxial may refer to the beams being at least partially overlapped or sharing a common propagation axis so that input beam 135 and output beam 125 travel along substantially the same optical path (albeit in opposite directions). As output beam 125 is scanned across a field of regard, the input beam 135 may follow along with the output beam 125 so that the coaxial relationship between the two beams is maintained.

In particular embodiments, a lidar system 100 may include an overlap mirror 115 configured to overlap the input beam 135 and output beam 125 so that they are substantially coaxial. In FIG. 3, the overlap mirror 115 includes a hole, slot, or aperture 310 which the output beam 125 passes through and a reflecting surface 320 that reflects at least a portion of the input beam 135 toward the receiver 140. The overlap mirror 115 may be oriented so that input beam 135 and output beam 125 are at least partially overlapped. In particular embodiments, input beam 135 may pass through a lens 330 which focuses the beam onto an active region of the receiver 140. The active region may refer to an area over which receiver 140 may receive or detect input light. The active region may have any suitable size or diameter d, such as for example, a diameter of approximately 25 µm, 50 µm, 80 µm, 100 µm, 200 µm, 500 µm, 1 mm, 2 mm, or 5 mm. In particular embodiments, overlap mirror 115 may have a reflecting surface 320 that is substantially flat or the reflecting surface 320 may be curved (e.g., mirror 115 may be an off-axis parabolic mirror configured to focus the input beam 135 onto an active region of the receiver 140). A reflecting surface 320 (which may be referred to as a reflective surface 320) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, aperture 310 may have any suitable size or diameter $\Phi_1$, and input beam 135 may have any suitable size or diameter $\Phi_2$, where $\Phi_2$ is greater than $\Phi_1$. As an example, aperture 310 may have a diameter $\Phi_1$ of approximately 0.2 mm, 0.5 mm, 1 mm, 2 mm, 3 mm, 5 mm, or 10 mm, and input beam 135 may have a diameter $\Phi_2$ of approximately 2 mm, 5 mm, 10 mm, 15 mm, 20 mm, 30 mm, 40 mm, or 50 mm. In particular embodiments, reflective surface 320 of overlap mirror 115 may reflect greater than or equal to 70% of input beam 135 toward the receiver 140. As an example, if reflective surface 320 has a reflectivity R at an operating wavelength of the light source 110, then the fraction of input beam 135 directed toward the receiver 140 may be expressed as $R \times [1-(\Phi_1/\Phi_2)^2]$. For example, if R is 95%, $\Phi_1$ is 2 mm, and $\Phi_2$ is 10 mm, then approximately 91% of input beam 135 may be directed toward the receiver 140 by reflective surface 320.

Figure 4:
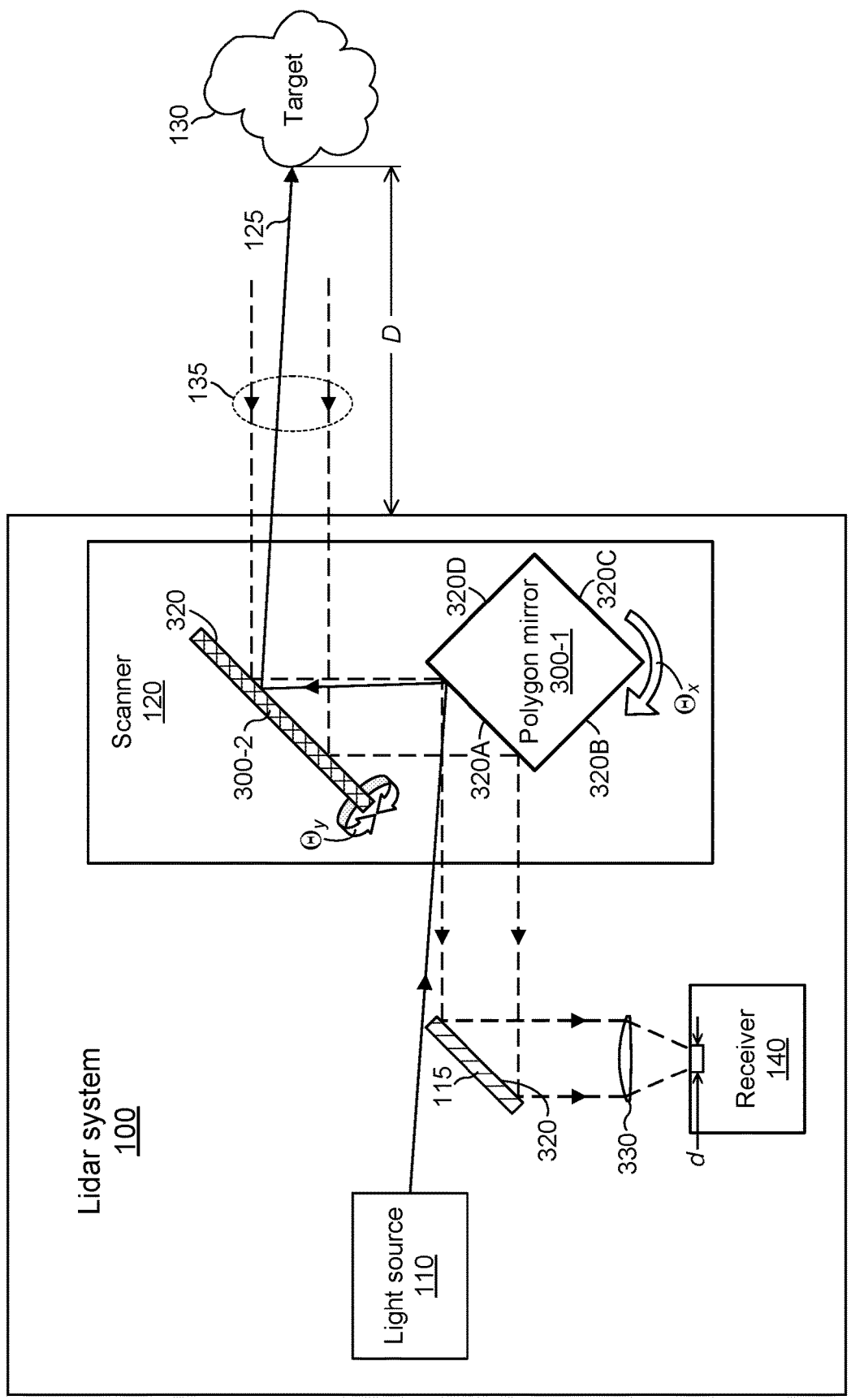
FIG. 4 illustrates an example lidar system with an example rotating polygon mirror.

FIG. 4 illustrates an example lidar system 100 with an example rotating polygon mirror 300-1. In particular embodiments, a scanner 120 may include a polygon mirror 300-1 configured to scan output beam 125 along a particular direction. In the example of FIG. 4, scanner 120 includes two scanning mirrors: (1) a polygon mirror 300-1 that rotates along the $\Theta_x$ direction and (2) a scanning mirror 300-2 that oscillates back and forth along the $\Theta_y$ direction. The output beam 125 from light source 110, which passes alongside mirror 115, is reflected by a reflecting surface (e.g., surface 320A, 320B, 320C, or 320D) of polygon mirror 300-1 and is then reflected by reflecting surface 320 of mirror 300-2. Scattered light from a target 130 returns to the lidar system 100 as input beam 135. The input beam 135 reflects from mirror 300-2, polygon mirror 300-1, and mirror 115, which directs input beam 135 through focusing lens 330 and to receiver 140.

In particular embodiments, a polygon mirror 300-1 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 300-1 that results in output beam 125 scanning along a substantially horizontal direction. Similarly, a rotation along a $\Theta_y$ direction may refer to a rotational motion that results in output beam 125 scanning along a substantially vertical direction. In FIG. 4, mirror 300-1 is a polygon mirror that rotates along the $\Theta_x$ direction and scans output beam 125 along a substantially horizontal direction, and mirror 300-2 rotates along the $\Theta_y$ direction and scans output beam 125 along a substantially vertical direction. In particular embodiments, a polygon mirror 300-1 may be configured to scan output beam 125 along any suitable direction. As an example, a polygon mirror 300-1 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 300-1 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 300-1 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 4, the polygon mirror 300-1 has a substantially square cross-sectional shape and four reflecting surfaces (320A, 320B, 320C, and 320D). The polygon mirror 300-1 in FIG. 4 may be referred to as a square mirror, a cube mirror, or a four-sided polygon mirror. In FIG. 4, the polygon mirror 300-1 may have a shape similar to a cube, cuboid, or rectangular prism. Additionally, the polygon mirror 300-1 may have a total of six sides, where four of the sides are faces with reflective surfaces (320A, 320B, 320C, and 320D).

In particular embodiments, a polygon mirror 300-1 may be continuously rotated in a clockwise or counter-clockwise rotation direction about a rotation axis of the polygon mirror 300-1. The rotation axis may correspond to a line that is perpendicular to the plane of rotation of the polygon mirror 300-1 and that passes through the center of mass of the polygon mirror 300-1. In FIG. 4, the polygon mirror 300-1 rotates in the plane of the drawing, and the rotation axis of the polygon mirror 300-1 is perpendicular to the plane of the drawing. An electric motor may be configured to rotate a polygon mirror 300-1 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 300-1 may be mechanically coupled to an electric motor (e.g., a brushless DC motor or a synchronous electric motor) which is configured to spin the polygon mirror 300-1 at a rotational speed of approximately 160 Hz (or, 9600 revolutions per minute (RPM)).

In particular embodiments, output beam 125 may be reflected sequentially from the reflective surfaces (320A, 320B, 320C, and 320D) as the polygon mirror 300-1 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 300-1. In FIG. 4, the output beam 125 reflects off of reflective surface 320A to produce one scan line. Then, as the polygon mirror 300-1 rotates, the output beam 125 reflects off of reflective surfaces 320B, 320C, and 320D to produce a second, third, and fourth respective scan line.

In particular embodiments, output beam 125 may be directed to pass by a side of mirror 115 rather than passing through mirror 115. As an example, mirror 115 may not include an aperture 310, and the output beam 125 may be directed to pass along a side of mirror 115. In the example of FIG. 3, lidar system includes an overlap mirror 115 with an aperture 310 that output beam 125 passes through. In the example of FIG. 4, output beam 125 from light source 110 is directed to pass by mirror 115 (which does not include an aperture 310) and then to polygon mirror 300-1.

Figure 5:
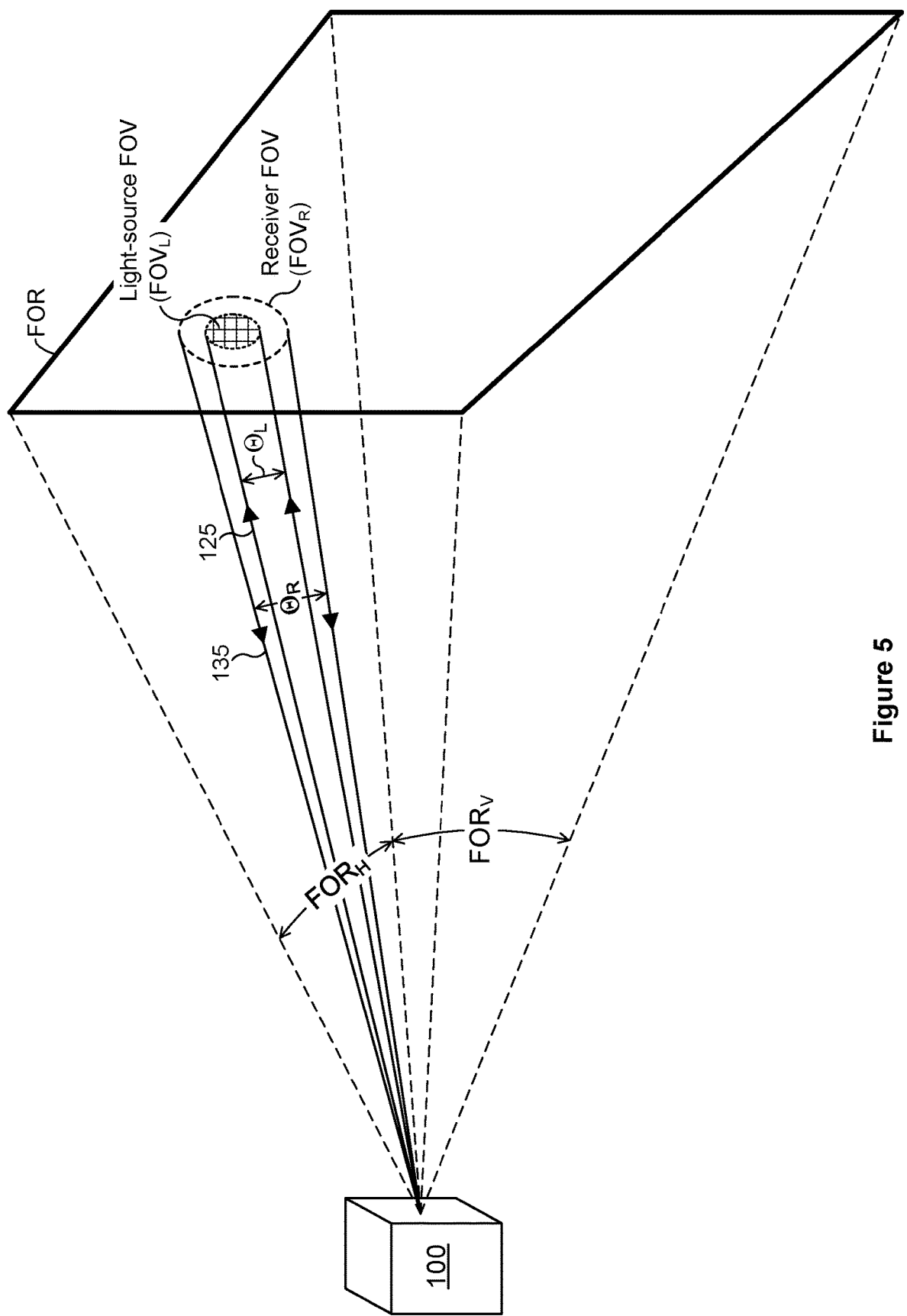
FIG. 5 illustrates an example light-source field of view and receiver field of view for a lidar system.

FIG. 5 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 5), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 6:
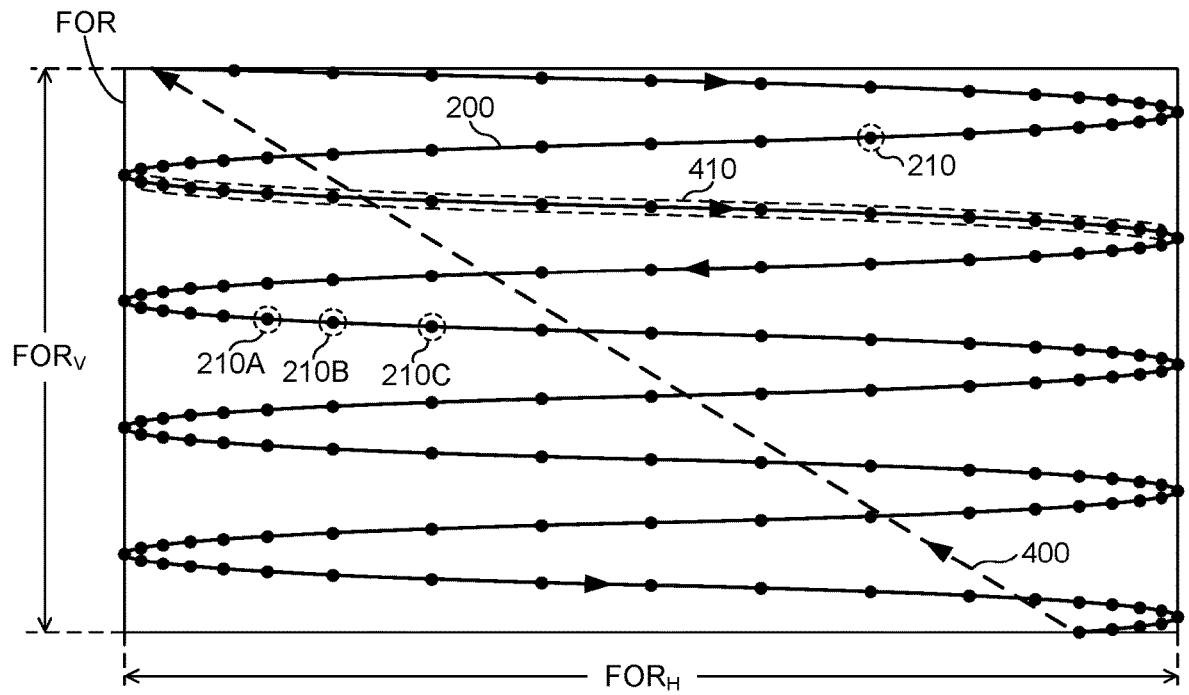
FIG. 6 illustrates an example scan pattern that includes multiple scan lines and multiple pixels.

FIG. 6 illustrates an example scan pattern 200 that includes multiple scan lines 410 and multiple pixels 210. In particular embodiments, scan pattern 200 may include any suitable number of scan lines 410 (e.g., approximately 1, 2, 5, 10, 20, 50, 100, 500, or 1,000 scan lines 410), and each scan line 410 of a scan pattern 200 may include any suitable number of pixels (e.g., 1, 2, 5, 10, 20, 50, 100, 200, 500, 1,000, 2,000, or 5,000 pixels 210). The scan pattern 200 illustrated in FIG. 6 includes approximately nine scan lines 410, and each scan line 410 includes approximately 18 pixels 210. In particular embodiments, each scan line 410 of a scan pattern 200 may include approximately the same number of pixels 210. As an example, each scan line 410 of a scan pattern 200 may include between approximately 950 and approximately 1,050 pixels 210. In particular embodiments, a scan pattern 200 where the scan lines 410 are scanned in two directions may be referred to as a bidirectional scan pattern 200, and a scan pattern 200 where the scan lines 410 are scanned in the same direction may be referred to as a unidirectional scan pattern 200. The scan pattern 200 in FIG. 6 may be referred to as a bidirectional scan pattern 200 where the scan lines 410 alternate between scanning from right to left and scanning from left to right. A bidirectional scan pattern 200 may be produced by a scanner 120 that includes a scanning mirror that oscillates in a back-and-forth motion corresponding to the bidirectional scan pattern 200.

In particular embodiments, a scan pattern 200 may include a retrace 400 where a scanner 120 resets from an end point of a scan 200 back to a starting point of the scan 200. The scan pattern 200 illustrated in FIG. 6 starts at the upper-left portion of the FOR and ends at the lower-right portion. In FIG. 6, the scan pattern 200 includes retrace 400 represented by a dashed diagonal line that connects the end of scan pattern 200 to the beginning. In particular embodiments, lidar system 100 may not send out pulses or acquire distance data during a retrace 400, or lidar system 100 may acquire distance data during a retrace 400 (e.g., a retrace path may include one or more pixels 210).

In particular embodiments, the pixels 210 of a scan pattern 200 may be substantially evenly spaced with respect to time or angle. As an example, each pixel 210 (and its associated pulse) may be separated from an immediately preceding or following pixel 210 by any suitable time interval, such as for example a time interval of approximately 0.5 µs, 1.0 µs, 1.4 µs, or 2.0 µs. In FIG. 6, pixels 210A, 210B, and 210C may be associated with pulses that were emitted with a 1.6 µs fixed time interval between the pulses. As another example, each pixel 210 (and its associated pulse) may be separated from an immediately preceding or following pixel 210 by any suitable angle, such as for example an angle of approximately 0.01°, 0.02°, 0.05°, 0.1°, 0.2°, 0.3°, 0.5°, or 1°. In FIG. 6, pixels 210A and 210B may have an angular separation of approximately 0.1° (e.g., pixels 210A and 210B may each be associated with optical beams separated by an angle of 0.1°). In particular embodiments, the pixels 210 of a scan pattern 200 may have an adjustable spacing with respect to time or angle. As an example, a time interval or angle separating two successive pixels 210 may be dynamically varied during a scan or from one scan to a subsequent scan.

In particular embodiments, lidar system 100 may include a scanner 120 configured to direct output beam 125 along any suitable scan pattern 200. As an example, all or part of scan pattern 200 may follow a substantially sinusoidal path, triangle-wave path, square-wave path, sawtooth path, piecewise linear path, periodic-function path, or any other suitable path or combination of paths. In the example of FIG. 6, scan pattern 200 corresponds to an approximately sinusoidal path, where pixels 210 are arranged along a sinusoidal curve.

In particular embodiments, pixels 210 may be substantially evenly distributed across scan pattern 200, or pixels 210 may have a distribution or density that varies across a FOR of scan pattern 200. In the example of FIG. 6, pixels 210 have a greater density toward the left and right edges of the FOR, and the pixel density in the middle region of the FOR is lower compared to the edges. As an example, pixels 210 may be distributed so that ≥40% of the pixels 210 are located in the left 25% of the FOR, ≥40% of the pixels 210 are located in the right 25% of the FOR, and the remaining <20% of the pixels 210 are located in the middle 50% of the FOR. In particular embodiments, a time interval or angle between pixels 210 may be dynamically adjusted during a scan so that a scan pattern 200 has a particular distribution of pixels 210 (e.g., a higher density of pixels 210 in one or more particular regions). As an example, a scan pattern 200 may be configured to have a higher density of pixels 210 in a middle or central region of scan 200 or toward one or more edges of scan 200 (e.g., a middle region or a left, right, upper, or lower edge that includes approximately 5%, 10%, 20%, 30%, or any other suitable percentage of the FOR of scan pattern 200). For example, pixels 210 may be distributed so that ≥50% of the pixels 210 are located in a central, left, or right region of scan pattern 200 with the remaining <50% of the pixels 210 distributed throughout the rest of scan pattern 200. As another example, a scan pattern 200 may have a higher density of pixels along a right edge of the scan pattern 200 than along a left edge of the scan pattern 200.

In particular embodiments, a distribution of pixels 210 in a scan pattern 200 may be determined, at least in part, by a pulse period of light source 110, a scanning speed provided by scanner 120, or a shape or path followed by scan pattern 200. As an example, the pulse period of light source 110 may be a substantially fixed value, or the pulse period may be adjusted dynamically during a scan to vary the density of pixels 210 across the scan region. As another example, an angular speed with which a mirror (e.g., mirror 300-1 or mirror 300-2) of scanner 120 rotates may be substantially fixed or may vary during a scan. As another example, a scan pattern 200 may provide for a varying distribution of pixels 210 based on a shape of the pattern. For example, a triangle-wave scan pattern 200 (combined with a substantially constant pulse period and angular speed) may provide a substantially uniform distribution of pixels 210 along the horizontal direction, while a sinusoidal scan pattern 200 may result in a higher density of pixels 210 along the left and right edges and a lower density of pixels 210 in the middle region. Additionally, two or more scan parameters may be selected or adjusted to optimize or adjust the density of pixels 210 in a scan pattern 200. As an example, a sinusoidal scan pattern 200 may be combined with a dynamically adjusted pulse period of light source 100 to provide for a higher density of pixels 210 along the right edge and a lower density of pixels 210 in the middle region and along the left edge.

In particular embodiments, a particular scan pattern 200 may be repeated from one scan to the next, or one or more parameters of a scan pattern 200 may be adjusted or varied within a scan or from one scan to another. As an example, a time interval or angle between pixels 210 may be varied from one scan to another scan. A relatively long time interval may be applied in an initial scan to produce a moderate-density point cloud, and a relatively short time interval may be applied in a subsequent scan to produce a high-density point cloud. As another example, a time interval or angle between pixels 210 may be varied within a particular scan pattern 200. For a particular region of a scan pattern 200, a time interval may be decreased to produce a higher density of pixels 210 within that particular region.

Figure 7:
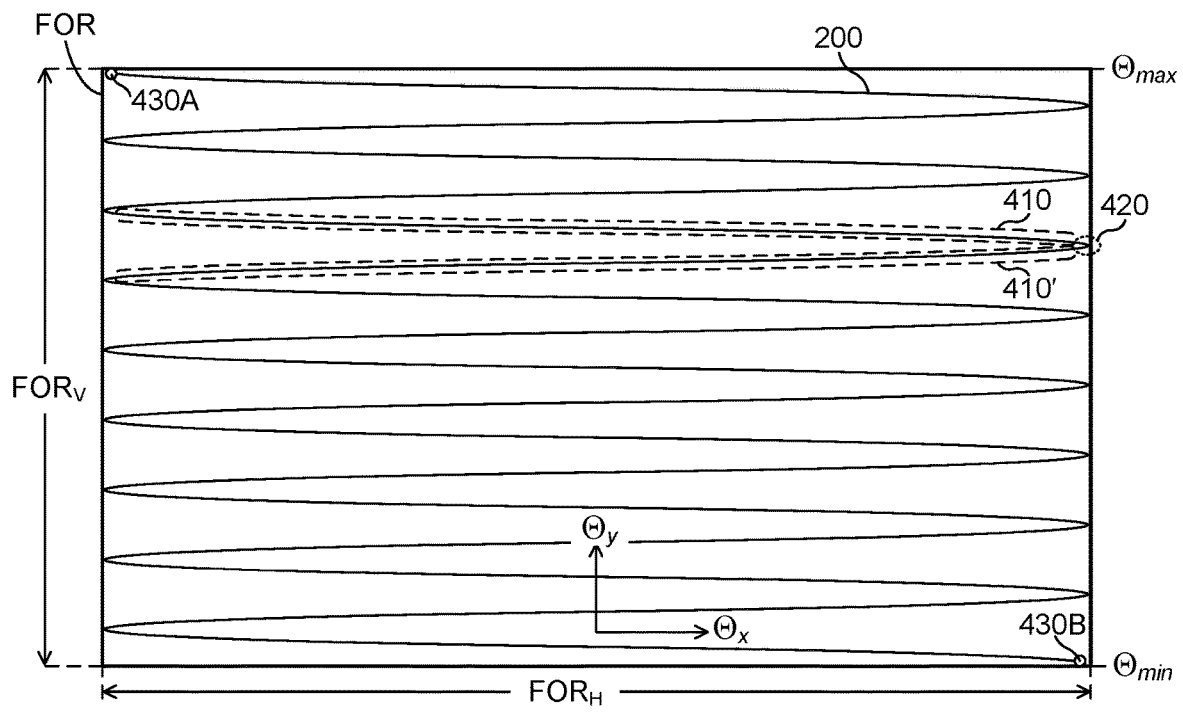
FIG. 7 illustrates an example scan pattern with a substantially uniform distribution of scan lines.

FIG. 7 illustrates an example scan pattern 200 with a substantially uniform distribution of scan lines 410. Scan pattern 200 illustrated in FIG. 7 is a bidirectional scan pattern 200 where scan line 410 travels across the FOR from left to right, and scan line 410' travels from right to left (or vice versa). In particular embodiments, a bidirectional scan pattern 200 may include multiple reversal regions 420 where the scan pattern 200 switches from scanning in one direction to scanning in another direction. Each adjacent pair of scan lines 410 of a bidirectional scan pattern 200 may be coupled together by a reversal region 420. In FIG. 7, reversal region 420 may correspond to a transition from the left-to-right scan of scan line 410 to the right-to-left scan of scan line 410'. In particular embodiments, a bidirectional scan pattern 200 may be produced by a scanner 120 that includes a scanning mirror configured to be driven repeatedly in a back-and-forth motion by any suitable mechanical actuator, such as for example, a galvanometer scanner, a resonant scanner, or a MEMS-based scanner. Additionally, each scan line 410 of a bidirectional scan pattern 200 may correspond to a single forward or backward motion of a galvanometer scanner. As an example, mirror 300-1 in FIG. 3 may produce a back-and-forth oscillatory motion that results in a corresponding back-and-forth motion of the output beam 125. Scan line 410 in FIG. 7 may be produced by a forward motion of mirror 300-1 in FIG. 3, and scan line 410' may be produced by a backward motion of mirror 300-1.

In the example of FIG. 7, point 430A may correspond to a starting point of the scan 200, and point 430B may correspond to an end point of the scan 200, or vice versa. As an example, the scan pattern 200 may start at point 430A and scan across the FOR in a top-to-bottom manner until reaching the end point 430B. As another example, the scan pattern 200 may start at point 430B and scan across the FOR in a bottom-to-top manner until reaching the end point 430A. In FIG. 7, a retrace path 400 is not included for clarity of illustrating the details of the scan pattern 200. Similarly, scan patterns 200 illustrated in other figures described herein may not include a retrace path 400, even though in practice the scan pattern 200 may operate with a retrace path 400 that connects the end of the scan pattern 200 to the start. In the example of FIG. 7, pixels 210 are not included in the scan pattern 200 for clarity of illustrating the scan pattern 200. Similarly, scan patterns 200 illustrated in other figures described herein may not include pixels 210 for clarity of illustrating the scan pattern 200, even though in practice the scan pattern 200 may include multiple pixels 210.

In particular embodiments, a scan pattern 200 may include a scan-pattern x-component and a scan-pattern y-component. The x-component may correspond to a horizontal angular scan, and the y-component may correspond to a vertical angular scan, or vice versa. As an example, polygon mirror 300-1 in FIG. 4 may provide the x-component of a scan pattern 200, and mirror 300-2 may provide the y-component of the scan pattern 200. The x-component and y-component together may represent the shape, location, or angular distribution of scan lines 410 across a FOR. In particular embodiments, a horizontal angular scan may be referred to as an azimuthal scan, and a vertical angular scan may be referred to as an elevation scan or an altitude scan. In particular embodiments, axes $\Theta_x$ and $\Theta_y$ may be referred to as scan axes of scan pattern 200, and the shape, location, or angular distribution of scan lines 410 across a FOR may be provided with respect to the scan axes $\Theta_x$ and $\Theta_y$. The scan-pattern x-component may correspond to motion with respect to scan axis $\Theta_x$, and the scan-pattern y-component may correspond to motion with respect to scan axis $\Theta_y$. As an example, scan axis $\Theta_x$ may correspond to a direction or orientation of the scan lines 410, where each scan line 410 is directed or oriented substantially parallel to scan axis $\Theta_x$. Additionally, the distribution of scan lines 410 within a FOR may be represented with respect to scan axis $\Theta_y$. In FIG. 7, the scan lines 410 of scan pattern 200 are oriented substantially parallel to scan axis $\Theta_x$, and the scan lines 410 are distributed substantially uniformly along scan axis $\Theta_y$. Scan axis $\Theta_x$ in FIG. 7 may correspond to $FOR_H$ and may extend horizontally from −30 degrees to +30 degrees. Similarly, scan axis $\Theta_y$ may correspond to $FOR_V$ and may extend vertically from −10 degrees to +10 degrees.

In particular embodiments, the angles $\Theta_{min}$ and $\Theta_{max}$ may represent the minimum and maximum angles, respectively, of a scan pattern 200 or a FOR along the scan axis $\Theta_y$. The angular size of the $FOR_V$ may have any suitable angular value, and the angles $\Theta_{min}$ and $\Theta_{max}$ may have any suitable angular values. As an example, the angular range or extent of $FOR_V$ may be approximately 30°, and the angles $\Theta_{min}$ and $\Theta_{max}$ may be approximately −15° and +15°, respectively. As another example, $FOR_V$ may be approximately 30°, and the angles $\Theta_{min}$ and $\Theta_{max}$ may be approximately −10° and +20°, respectively.

In particular embodiments, a scan pattern 200 may include scan lines 410 having any suitable alignment or orientation, such as for example, horizontal, vertical, or oriented at approximately 10, 30, 45, or 60 degrees with respect to a horizontal or vertical direction. Similarly, the scan axes $\Theta_x$ and $\Theta_y$ may have any suitable alignment or orientation. As an example, scan axis $\Theta_x$ may have a substantially horizontal orientation, and scan axis $\Theta_y$ may have a substantially vertical orientation, or vice versa. In FIG. 7, scan axis $\Theta_x$ has a substantially horizontal orientation, and scan axis $\Theta_y$ has a substantially vertical orientation. In particular embodiments, scan axis $\Theta_x$ and scan axis $\Theta_y$ may be substantially orthogonal to one another. As an example, scan axis $\Theta_x$ may be oriented to within approximately 10° of a horizontal direction, and scan axis $\Theta_y$ may be oriented to within approximately 10° of a vertical direction. In particular embodiments, the scan axes $\Theta_x$ and $\Theta_y$ being substantially orthogonal to one another may refer to scan axis $\Theta_x$ and scan axis $\Theta_y$ being orthogonal to within any suitable angular amount, such as for example, to within 0.1°, 0.5°, 1°, 5°, 10°, or 20°. For example, scan axis $\Theta_y$ may be oriented at an angle of approximately 85° with respect to scan axis $\Theta_x$. As another example, scan axis $\Theta_y$ may be oriented at 90°±2° with respect to scan axis $\Theta_x$.

In particular embodiments, the scan lines 410 of a scan pattern 200 may be distributed, positioned, or arranged within the range of $FOR_V$ and along scan axis $\Theta_y$ in any suitable manner. In FIG. 7, the scan lines 410 are arranged between $\Theta_{min}$ and $\Theta_{max}$, the minimum and maximum angles, respectively, of $FOR_V$. In FIG. 7, the scan lines 410 are arranged in a substantially uniform manner along scan axis $\Theta_y$, where adjacent scan lines 410 are separated by a substantially fixed separation distance or angle. As an example, the vertical FOR in FIG. 7 may be approximately 16°, and adjacent scan lines 410 may have a substantially constant angular separation of approximately 1°. As another example, for a scan pattern 200 with 60 scan lines 410 uniformly distributed within a $FOR_V$ of 30°, adjacent scan lines 410 may be separated by approximately 0.5°. As another example, for a scan pattern 200 with 400 scan lines 410 uniformly distributed within a $FOR_V$ of 20°, adjacent scan lines 410 may be separated by approximately 0.05°.

Figure 8:
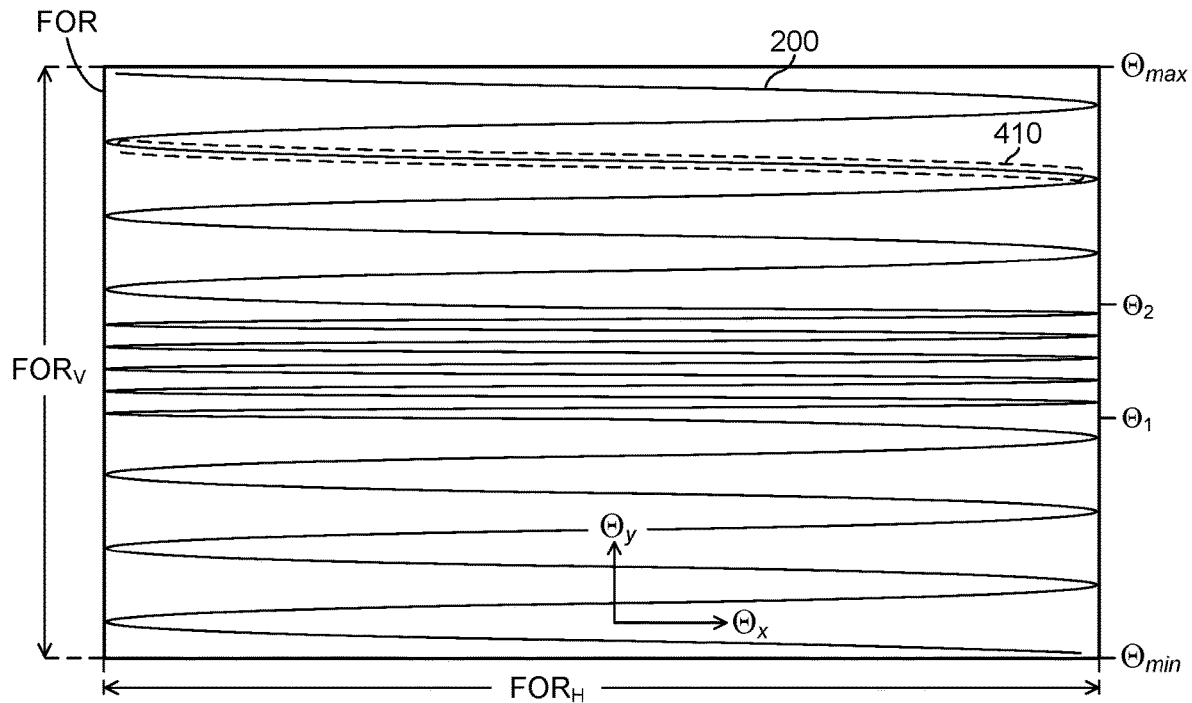
FIG. 8 illustrates an example scan pattern with a nonuniform distribution of scan lines.

FIG. 8 illustrates an example scan pattern 200 with a nonuniform distribution of scan lines 410. In particular embodiments, scanner 120 may be configured to distribute scan lines 410 along scan axis $\Theta_y$ in a nonuniform manner to provide a scan pattern 200 with an adjustable density of scan lines 410. The adjustable-density scan pattern 200 illustrated in FIG. 8 includes a higher density of scan lines 410 between angles $\Theta_1$ and $\Theta_2$ and a lower density of scan lines 410 between angles $\Theta_{min}$ and $\Theta_1$ and between angles $\Theta_2$ and $\Theta_{max}$. In particular embodiments, a scan pattern 200 with a nonuniform distribution of scan lines 410 may include two or more regions having two or more respective scan-line densities. As an example, a scan pattern 200 may include one region with a lower density of scan lines 410 and another region with a higher density of scan lines 410. In the example of FIG. 8, the bidirectional, adjustable-density scan pattern 200 includes two regions with a lower density of scan lines 410 (the regions between angles $\Theta_{min}$ and $\Theta_1$ and between angles $\Theta_2$ and $\Theta_{max}$) and one region with a higher density of scan lines 410 (the region between angles $\Theta_1$ and $\Theta_2$).

In particular embodiments, a nonuniform distribution of scan lines 410 may be provided by a scanner 120 that includes a scanning mirror with an adjustable scan rate. As an example, scanner 120 in FIG. 4 may produce an adjustable-density scan pattern 200 based on scanning mirror 300-2 having an adjustable scan rate along the $\Theta_y$ scan axis. Mirror 300-2 may have a relatively high scan rate when scanning between angles $\Theta_{min}$ and $\Theta_1$ and between angles $\Theta_2$ and $\Theta_{max}$, which results in a relatively low density of scan lines 410 in those regions. When scanning between angles $\Theta_1$ and $\Theta_2$, mirror 300-2 may be adjusted to have a relatively low scan rate, which results in a relatively high density of scan lines 410. In particular embodiments, the region of higher-density scan lines 410 between angles $\Theta_1$ and $\Theta_2$ may be located or adjusted in any suitable manner. As an example, the values of $\Theta_1$ and $\Theta_2$ may be approximately $-2°$ and $+2°$, respectively, or approximately $-5°$ and $+3°$, respectively. Additionally, the values of $\Theta_1$ or $\Theta_2$ may be updated from one scan to another. As another example, the value of $\Theta_2 - \Theta_1$ (which represents an angular range of the higher-density scan region) may be approximately $0.5°$, $1°$, $2°$, $5°$, $10°$, or $20°$, and the value of $\Theta_2 - \Theta_1$ may be updated from one scan to another.

Figure 9:
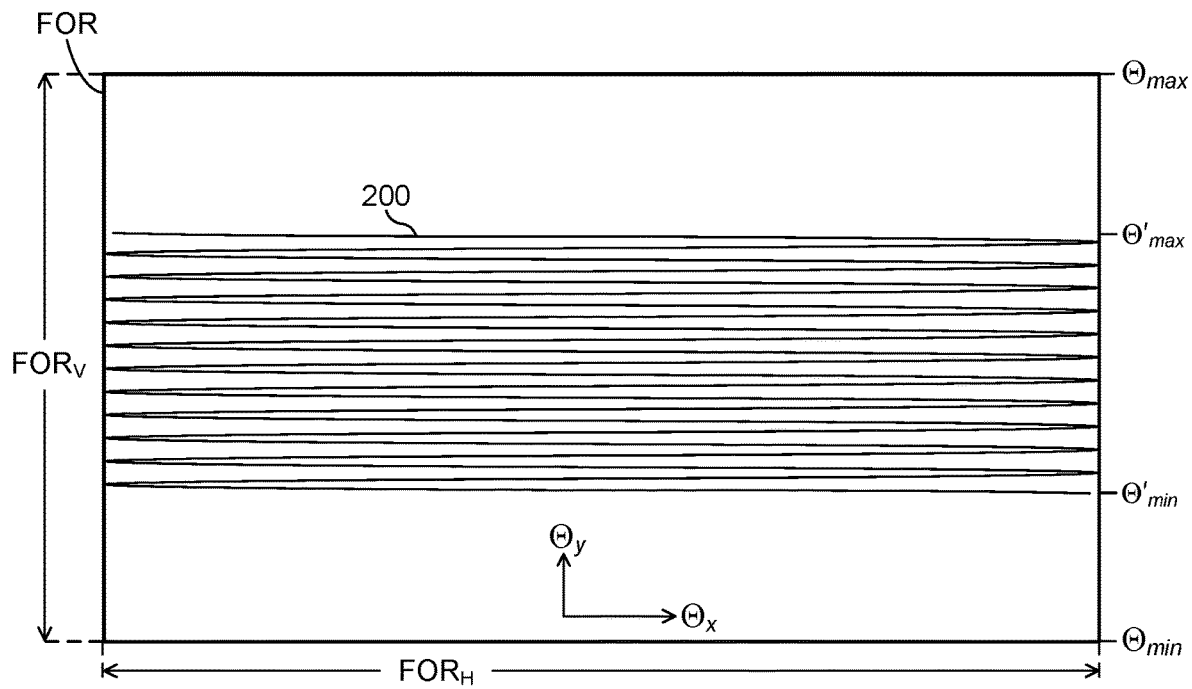
FIG. 9 illustrates an example focused scan pattern.

FIG. 9 illustrates an example focused scan pattern 200. In particular embodiments, a focused scan pattern 200 may be referred to as a focused scan, a targeted scan pattern, or a targeted scan. In the example of FIG. 9, the full $FOR_V$ along the $\Theta_y$ scan axis extends from $\Theta_{min}$ to $\Theta_{max}$, and the focused scan pattern 200 is located within the $FOR_V$ and between the angles $\Theta'_{min}$ and $\Theta'_{max}$. In particular embodiments, the location or angular range of a focused scan pattern 200 may be adjusted in any suitable manner. As an example, the values $\Theta'_{min}$ and $\Theta'_{max}$ may be approximately $-4°$ and $+4°$, respectively, or approximately $0°$ and $+3°$, respectively. As another example, the value of $\Theta'_{max} - \Theta'_{min}$ (which represents an angular range or extent of the focused scan pattern 200) may be approximately $0.5°$, $1°$, $2°$, $5°$, $10°$, or $20°$. In particular embodiments, a focused scan pattern 200 may include a relatively high density of scan lines 410 located within a portion of a $FOR_V$. In particular embodiments, a lidar system 100 may perform a scan that covers a full FOR (e.g., a uniform scan as illustrated in FIG. 7), and then the lidar system 100 may perform a targeted scan that covers a portion of the FOR. A targeted scan may provide a higher density of scan lines 410 or pixels 210 and may reveal additional information about a target 130 that is at least partially contained within the region of the targeted scan.

In particular embodiments, a focused scan pattern 200 may be provided by a scanner 120 that includes a scanning mirror (e.g., scanning mirror 300-2 in FIG. 4) configured to adjust the angles of the scan pattern 200 along the $\Theta_y$ scan axis. As an example, scanning mirror 300-2 in FIG. 4 may be configured to scan an output beam 125 over the full $FOR_V$ along the $\Theta_y$ scan axis between the angles $\Theta_{min}$ and $\Theta_{max}$. Additionally, the scan angles of scanning mirror 300-2 in FIG. 4 may be adjusted to scan between the angles $\Theta'_{min}$ and $\Theta'_{max}$ to produce a focused scan pattern 200.

In particular embodiments, scan lines 410 may be distributed along the $\Theta_y$ scan axis with any suitable scan-line density or with any suitable combination of scan-line densities. As an example, scan lines 410 may have a scan-line density along the $\Theta_y$ scan axis of approximately 0.1, 0.2, 0.5, 1, 2, 5, 10, 20, or 50 scan lines per degree. In the example of FIG. 7, the vertical FOR may be approximately 16°, and the scan lines 410 may have a substantially constant scan-line density of approximately 1 scan line per degree. As another example, for a scan pattern 200 with 64 scan lines 410 uniformly distributed within a $FOR_V$ of 20°, the scan lines 410 may have a scan-line density of approximately 3.2 scan lines per degree. In the example of FIG. 8, the scan-line density may vary between approximately 2 scan lines per degree (for angles $\Theta_{min}$ to $\Theta_1$ and angles $\Theta_2$ to $\Theta_{max}$) and approximately 8 scan lines per degree (for angles $\Theta_1$ to $\Theta_2$). In the example of FIG. 9, for the focused scan pattern 200 located between angles $\Theta'_{min}$ and $\Theta'_{max}$, the scan-line density may be approximately 5, 10, or 20 scan lines per degree.

Figure 10:
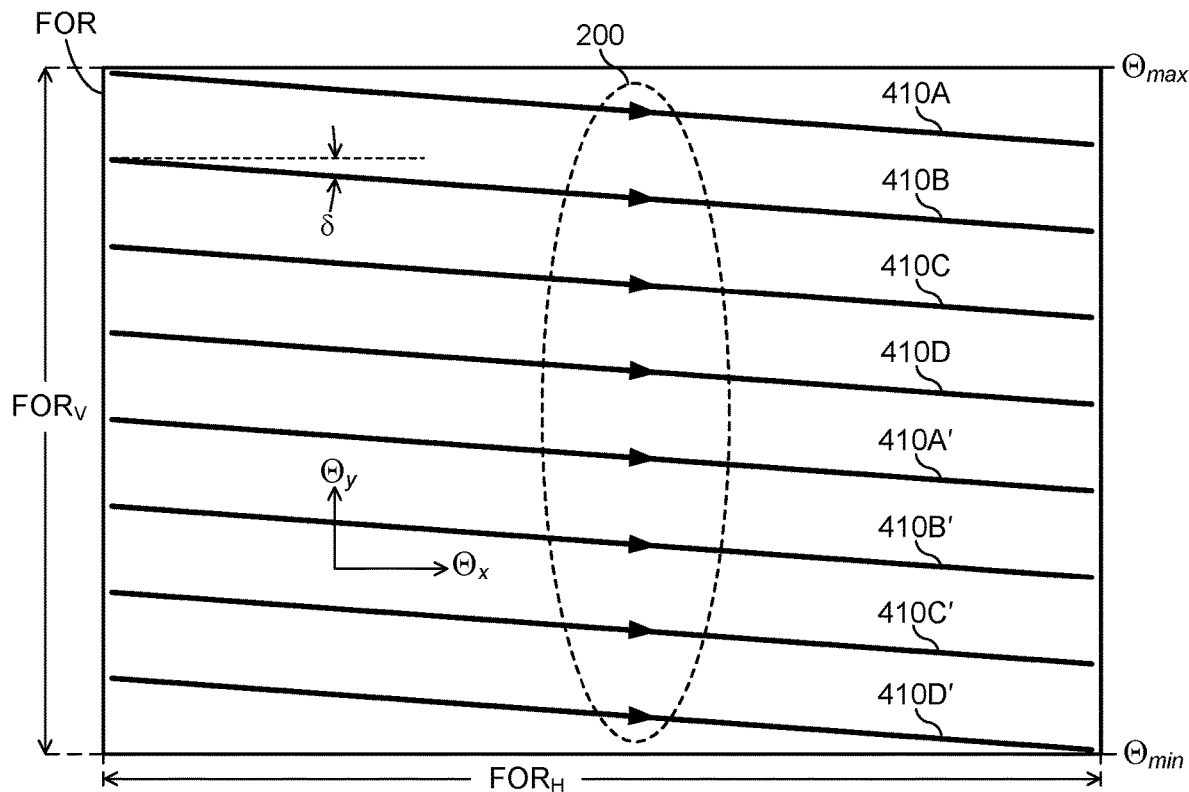
FIG. 10 illustrates an example scan pattern with a substantially uniform distribution of scan lines.

FIG. 10 illustrates an example scan pattern 200 with a substantially uniform distribution of scan lines 410. Scan pattern 200 illustrated in FIG. 10 is a unidirectional scan pattern 200 where each scan line 410 travels across the FOR in substantially the same direction (e.g., from left to right). In particular embodiments, scan lines 410 of a unidirectional scan pattern 200 may be directed across a FOR in any suitable direction, such as for example, from left to right, from right to left, from top to bottom, from bottom to top, or at any suitable angle (e.g., at a 5°, 10°, 30°, or 45° angle) with respect to a horizontal or vertical axis. In particular embodiments, a unidirectional scan pattern 200 may not include a reversal region 420, and each scan line 410 may be a separate line that is not directly connected to a previous or subsequent scan line 410.

In particular embodiments, a unidirectional scan pattern 200 may be produced by a scanner 120 that includes a polygon mirror (e.g., polygon mirror 300-1 of FIG. 4), where each scan line 410 is associated with a particular reflective surface 320 of the polygon mirror. As an example, reflective surface 320A of polygon mirror 300-1 in FIG. 4 may produce scan line 410A in FIG. 10. Similarly, as the polygon mirror 300-1 rotates, reflective surfaces 320B, 320C, and 320D may successively produce scan lines 410B, 410C, and 410D, respectively. Additionally, for a subsequent revolution of the polygon mirror 300-1, the scan lines 410A', 410B', 410C', and 410D' may be successively produced by reflections of the output beam 125 from reflective surfaces 320A, 320B, 320C, and 320D, respectively. In particular embodiments, N successive scan lines 410 of a unidirectional scan pattern 200 may correspond to one full revolution of a N-sided polygon mirror. As an example, the four scan lines 410A, 410B, 410C, and 410D in FIG. 10 may correspond to one full revolution of the four-sided polygon mirror 300-1 in FIG. 4. Additionally, a subsequent revolution of the polygon mirror 300-1 may produce the next four scan lines 410A', 410B', 410C', and 410D' in FIG. 10.

In particular embodiments, during at least a portion of a scan, light source 110 may be configured to emit pulses of light at a substantially constant pulse repetition frequency, or light source 110 may be configured to vary the pulse repetition frequency. Additionally, a scanning mirror of scanner 120 may scan output beam 125 (which includes at least a portion of the pulses of light emitted by the light source 110) at a substantially constant angular scanning speed. As an example, polygon mirror 300-1 in FIG. 4 may rotate at a substantially constant rotation speed, and the output beam 125 may scan across the FOR (e.g., along scan axis $\Theta_x$) at a corresponding constant angular scanning speed. If a polygon mirror 300-1 has a rotation speed of R (e.g., in units of revolutions per second or degrees per second), then the output beam 125 may scan across the FOR at an angular scanning speed of approximately 2R, since a $\Theta$-degree rotation of polygon mirror 300-1 results in a 2$\Theta$-degree angular motion of output beam 125. For example, if the polygon mirror 300-1 has a rotation speed of 10,000 degrees per second, then the output beam 125 may scan across the FOR at an angular scanning speed of approximately 20,000 degrees per second. In particular embodiments, the number of scan lines 410 per second produced by a polygon mirror 300-1 with N reflective surfaces 320 and a rotation speed R may be expressed as R×N, where R has units of revolutions per second. As an example, if the 4-sided polygon mirror 300-1 in FIG. 4 has a rotation speed of 150 revolutions per second, then the lidar system 100 may produce approximately 600 scan lines 410 per second.

In particular embodiments, the angular scanning speed $\omega_x$ (in units of deg/s) of the output beam 125 along scan axis $\Theta_x$ may be expressed as $\omega_x=2\times R\times 360$, where R has units of revolutions per second. For example, if polygon mirror 300-1 rotates at 100 revolutions per second (which corresponds to an angular rotation rate of approximately 36,000 degrees per second, or 628 radians per second), then the output beam 125 may scan along scan axis $\Theta_x$ at an angular scanning speed of approximately 72,000 degrees per second (or approximately 1,257 radians per second). The expression $FOR_H/(2\times R\times 360)$ represents the time for the output beam 125 to make a single scan across $FOR_H$ (along scan axis $\Theta_x$) and produce a single scan line 410. As an example, for a $FOR_H$ of 60° and a 100-Hz rotation speed (100 revolutions per second), one scan line 410 may be traced across the $FOR_H$ in approximately 0.83 ms. In particular embodiments, each scan line 410 of a scan pattern 200 may include approximately the same number of pixels 210. As an example, if the light-source pulse repetition frequency (PRF) is substantially constant and the rotation speed R of polygon mirror 300-1 is substantially constant, then each scan line 410 may include approximately the same number of pixels 210. As another example, each of the scan lines 410 in FIG. 10 may include approximately 1,000 pixels 210. The approximate number of pixels 210 in one scan line 410 may be found from the expression $P=(PRF\times FOR_H)/(2\times R\times 360)$. For example, if the rotation speed R is 100 revolutions per second, the $FOR_H$ is 60° degrees, and the PRF is 600 kHz, then each scan line 410 includes approximately P=500 pixels 210.

In particular embodiments, the output beam 125 may have any suitable angular scan rate along the $\Theta_y$ scan axis, such as for example an angular scan rate of approximately 1, 2, 5, 10, 20, 50, 100, 300, or 1,000 degrees per second. In particular embodiments, an angular scan rate may be referred to as a scan rate, a scan speed, an angular scan speed, a scanning speed, or an angular scanning speed. The angular scanning speed along scan axis $\Theta_y$ may be expressed as $\omega_y=\Delta\Theta_y/\tau_y$, where $\Delta\Theta_y$ is an angular range of the scan pattern 200 along the $\Theta_y$ scan axis, and $\tau_y$ is a time for the output beam 125 to travel across $\Delta\Theta_y$ and trace out a single scan pattern 200 from a starting point to an end point (not including the time to perform a retrace 400). As an example, if $\Delta\Theta_y$ is 30° and $\tau_y$ is 100 ms, then the angular scanning speed along scan axis $\Theta_y$ is approximately 300 degrees per second. As another example, if $\Delta\Theta_y$ is 2° and $\tau_y$ is 40 ms, then the angular scanning speed along scan axis $\Theta_y$ is approximately 50 degrees per second. In FIG. 10, the angular scan range along the $\Theta_y$ scan axis is approximately equal to $FOR_V$. The scan time $\tau_y$ may be related to the frame rate F at which the lidar system 100 scans by the expression $F=1/(\tau_y+\tau_{retrace})$, where $\tau_{retrace}$ is a time for the output beam 125 to traverse the retrace path 400. Based on this, the angular scanning speed along scan axis $\Theta_y$ may be expressed as $\omega_y=(\Delta\Theta_y\times F)/(1-F\times\tau_{retrace})$. As an example, for a 10-Hz frame rate over a 30° range with a 10 ms retrace time, the scanning speed $\omega_y$ is approximately 333 degrees per second. As another example, for a 1-Hz scan rate over a 5° range with a 20 ms retrace time, the scanning speed $\omega_y$ is approximately 5.1 degrees per second.

In particular embodiments, a scan line 410 may have an incline angle $\delta$ with respect to the $\Theta_x$ axis. The incline angle $\delta$ may have any suitable value, such as for example, approximately 0°, 0.1°, 0.2°, 0.5°, 1°, 2°, 5°, or 10°. The incline angle $\delta$ may be oriented upward or downward according to the direction the output beam 125 is scanned along the $\Theta_y$ scan axis. In FIG. 10, the output beam is scanned along the $\Theta_y$ scan axis from top to bottom, and each scan line 410 is angled downward (with respect to the $\Theta_x$ axis) at an incline angle $\delta$ of approximately 4°. In particular embodiments, the incline angle $\delta$ may depend on the angular scanning speeds along the scan axes $\Theta_x$ and $\Theta_y$ and may be expressed as $\delta=\arctan(\omega_y/\omega_x)$. As an example, if the output beam 125 is scanned along scan axis $\Theta_x$ at an angular scanning speed $\omega_x$ of 72,000 degrees per second and along scan axis $\Theta_y$ at an angular scanning speed $\omega_y$ of 300 degrees per second, then scan lines 410 may have an incline angle $\delta$ of approximately 4.2 mrad (or, approximately 0.24°). As another example, if $\omega_x$ is 10,000 degrees per second and $\omega_y$ is 350 degrees per second, then scan lines 410 may have an incline angle $\delta$ of approximately 2°, and each scan line 410 may be oriented downward at 2° with respect to the $\Theta_x$ axis.

Figure 11:
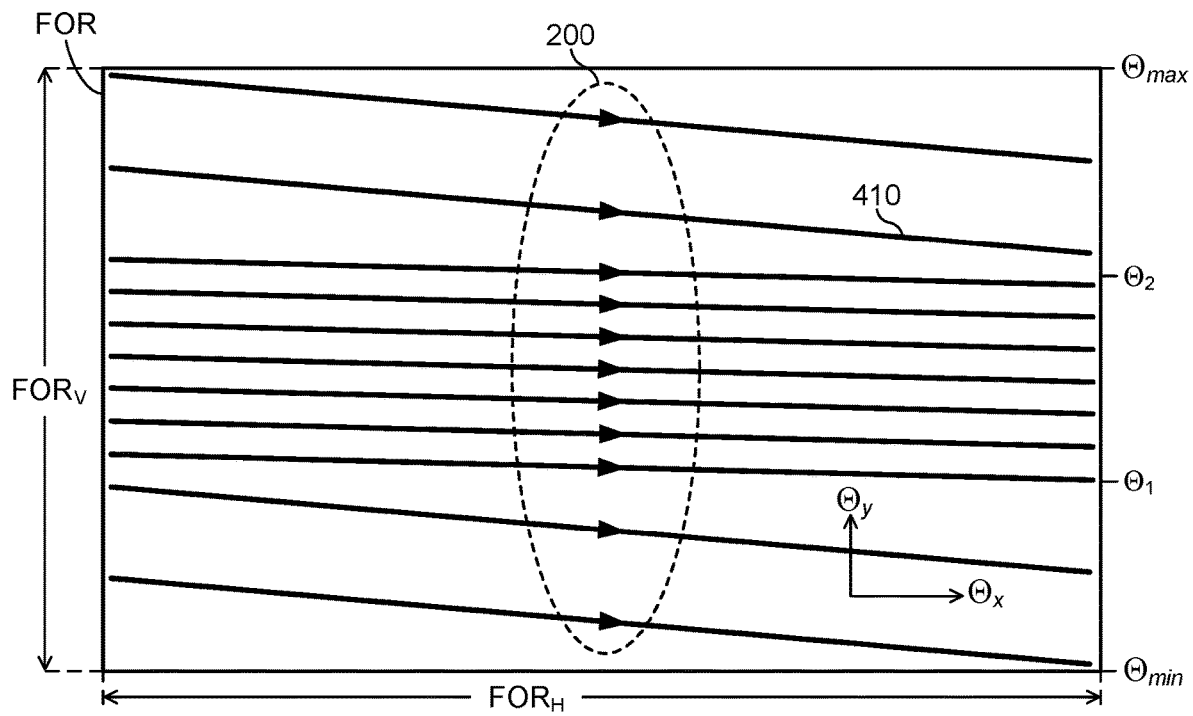
FIG. 11 illustrates an example scan pattern with a nonuniform distribution of scan lines.

FIG. 11 illustrates an example scan pattern 200 with a nonuniform distribution of scan lines 410. The scan pattern 200 illustrated in FIG. 11 is similar to the scan pattern 200 illustrated in FIG. 8, except scan pattern 200 in FIG. 11 is a unidirectional scan pattern 200 where each scan line 410 travels across the FOR in substantially the same direction (e.g., from left to right). The unidirectional, adjustable-density scan pattern 200 illustrated in FIG. 11 includes a higher density of scan lines 410 between angles $\Theta_1$ and $\Theta_2$ and a lower density of scan lines 410 between angles $\Theta_{min}$ and $\Theta_1$ and between angles $\Theta_2$ and $\Theta_{max}$. In particular embodiments, the region of higher-density scan lines 410 between angles $\Theta_1$ and $\Theta_2$ may be located or adjusted in any suitable manner. As an example, the values of angles $\Theta_{min}$ and $\Theta_{max}$ may be approximately $-15°$ and $+15°$, respectively, and the values of $\Theta_1$ and $\Theta_2$ may be approximately $-2°$ and $+2°$, respectively, or approximately $-5°$ and $+3°$, respectively. Additionally, the values of $\Theta_1$ or $\Theta_2$ may be updated from one scan to another. As another example, the value of $\Theta_2-\Theta_1$ (which represents an angular range of the higher-density scan region) may be approximately 0.5°, 1°, 2°, 5°, 10°, or 20°, and the value of $\Theta_2-\Theta_1$ may be updated from one scan to another.

Figure 12:
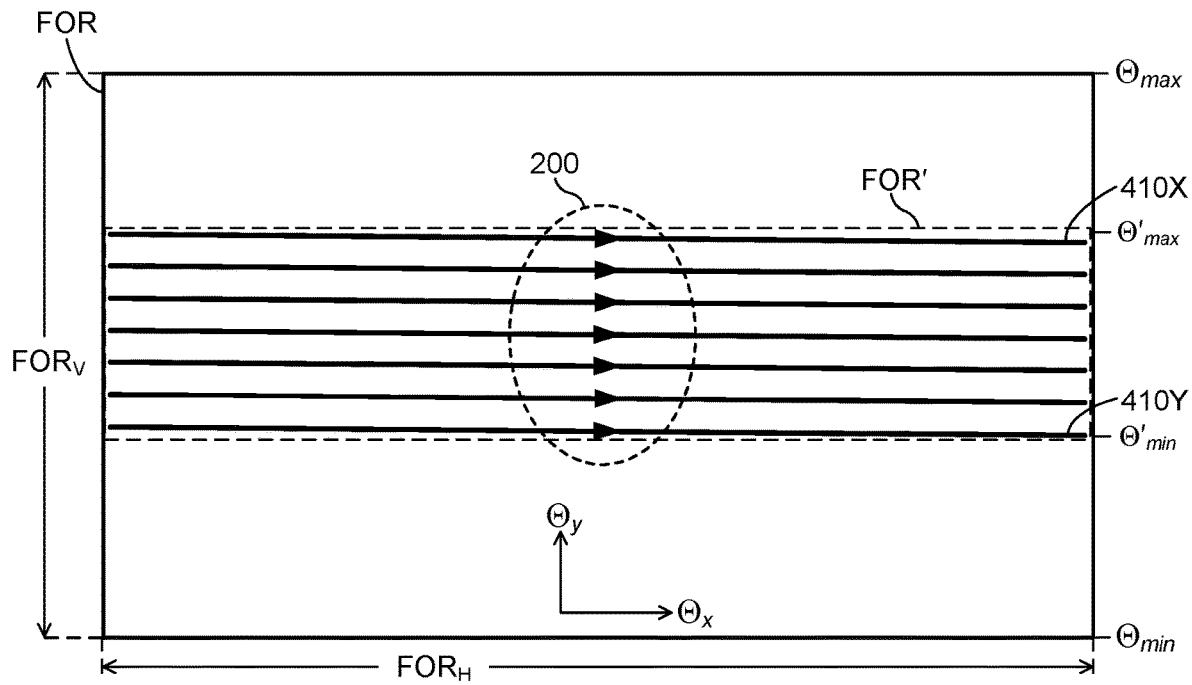
FIG. 12 illustrates an example scan pattern contained within an adjustable field of regard.

FIG. 12 illustrates an example scan pattern 200 contained within an adjustable field of regard FOR'. In particular embodiments, a field of regard (represented by FOR) may be referred to as a fixed field of regard or a global field of regard, and an adjustable field of regard (represented by FOR') may be referred to as a configurable field of regard or a focused field of regard. An adjustable field of regard FOR' may refer to a field of regard that covers a portion of a fixed field of regard or is contained within a fixed field of regard. In particular embodiments, a scan pattern 200 contained within an adjustable field of regard FOR' may be a focused scan pattern, a scan pattern with a uniform distribution of scan lines 410, or a scan pattern with a nonuniform distribution of scan lines 410. As an example, a nonuniform scan pattern 200 similar to that shown in FIG. 11 may be contained within an adjustable field of regard FOR' between the angles $\Theta'_{min}$ and $\Theta'_{max}$. In the example of FIG. 12, the adjustable field of regard FOR' contains a focused scan pattern with a substantially uniform distribution of scan lines 410.

The maximum angle $\Theta_{max}$ and the minimum angle $\Theta_{min}$ (which may be referred to as the fixed maximum angle and the fixed minimum angle, respectively) set the upper and lower limits of the fixed field of regard along the $\Theta_y$ axis. The maximum and minimum angles of the FOR may be non-adjustable and may be determined by a maximum range over which a scanning mirror (e.g., mirror 300-2 in FIG. 4) is capable of scanning along the $\Theta_y$ scan axis. The maximum scan angle $\Theta'_{max}$ and the minimum scan angle $\Theta'_{min}$ of the adjustable field of regard FOR' may be referred to as the adjustable maximum scan angle (or adjustable maximum angle) and the adjustable minimum scan angle (or adjustable minimum angle), respectively. The maximum and minimum angles of the fixed field of regard may be fixed or non-adjustable angular values, and the maximum and minimum adjustable angles may be adjustable to any suitable values located between the maximum and minimum angles of the fixed field of regard. An adjustable field of regard may cover or coincide with a fixed field of regard for one or more scans performed by scanner 120 (e.g., $\Theta'_{max}$ may be approximately equal to $\Theta_{max}$, and $\Theta'_{min}$ may be approximately equal to $\Theta_{min}$). For example, $\Theta_{max}$ may be +15°, and $\Theta_{min}$ may be −15°, and for one or more scans performed by scanner 120, the angles $\Theta'_{max}$ and $\Theta'_{min}$ may be set to +15° and −15°, respectively (e.g., the FOR' has approximately the same extent as the FOR). For one or more subsequent scans, the angles $\Theta'_{max}$ and $\Theta'_{min}$ may be adjusted to any suitable values such that $\Theta_{max} \geq \Theta'_{max} > \Theta'_{min} \geq \Theta_{min}$. For example, the angles $\Theta'_{max}$ and $\Theta'_{min}$ may be adjusted to +4° and −6°, respectively.

In particular embodiments, an adjustable field of regard may be adjustable along the $\Theta_y$ axis and may be fixed along the $\Theta_x$ axis. An adjustable field of regard may have an extent along the $\Theta_x$ axis that is fixed and is approximately the same as the extent of the fixed field of regard (e.g., a FOR and FOR' may cover approximately the same $FOR_H$). As an example, an adjustable field of regard may have a fixed horizontal range of approximately 60°. In particular embodiments, an adjustable field of regard may include a non-adjustable field of regard along the $\Theta_x$ scan axis that is greater than or equal to 40°. For example, the FOR' in FIG. 12 may be fixed along the $\Theta_x$ scan axis with an extent along the $\Theta_x$ scan axis that is approximately equal to $FOR_H$. In particular embodiments, an adjustable field of regard may include an adjustable field of regard along the $\Theta_y$ scan axis that is between approximately 1° and approximately 40°. For example, the size of the FOR' in FIG. 12 may be adjustable along the $\Theta_y$ scan axis so that $(\Theta'_{max}-\Theta'_{min})$ may be set to any suitable value from 1° to 40°.

In particular embodiments, an adjustable field of regard may cover a horizontal swath or section of a fixed field of regard, where the horizontal swath has a fixed horizontal extent and an adjustable vertical extent. For example, a fixed field of regard may cover a 60-degree horizontal range and a 30-degree vertical range, and an adjustable field of regard may cover the same 60-degree horizontal range and a 10-degree vertical range within the 30-degree vertical range of the fixed field of regard. In the example of FIG. 12, the adjustable field of regard FOR' has approximately the same extent along the $\Theta_x$ axis as the fixed field of regard FOR. In particular embodiments, an adjustable field of regard may cover a vertical swath of a fixed field of regard. For example, a fixed field of regard may cover an 80-degree horizontal range and a 40-degree vertical range, and an adjustable field of regard may cover the same 40-degree vertical range and a 20-degree horizontal range within the 80-degree horizontal range.

In particular embodiments, a focused scan pattern may have an increased density of scan lines 410 with respect to a standard scan pattern. As an example, scan pattern 200 in FIG. 10 may have a scan-line density of approximately 2 scan lines per degree, and focused scan pattern 200 in FIG. 12 may have a scan-line density of approximately 8 scan lines per degree. In particular embodiments, a focused scan pattern may have an increased frame rate with respect to a standard scan pattern. As an example, a standard scan pattern may have approximately 2 scan lines per degree and a 10-Hz frame rate, and a focused scan pattern may have approximately 2 scan lines per degree and a 40-Hz frame rate. A focused scan pattern may have one-fourth the number of scan lines as a standard scan pattern, and so, the focused scan pattern may be able to scan at a four-times faster frame rate. In particular embodiments, a focused scan pattern may have an increased density of scan lines 410 and an increased frame rate with respect to a standard scan pattern. As an example, a standard scan pattern may have approximately 2 scan lines per degree and a 10-Hz frame rate, and a focused scan pattern may have approximately 4 scan lines per degree and a 20-Hz frame rate.

In particular embodiments, a lidar system 100 may include a light source 110 configured to emit pulses of light and a scanner 120 configured to scan at least a portion of the emitted pulses of light along a scan pattern 200 contained within an adjustable field of regard FOR'. In particular embodiments, a scanner 120 may include a first scanning mirror (e.g., polygon mirror 300-1 in FIG. 4) and a second scanning mirror (e.g., mirror 300-2 in FIG. 4). The first scanning mirror may be referred to as a x-scan mirror, and the second scanning mirror may be referred to as a y-scan mirror. The x-scan mirror may be configured to scan pulses of light substantially parallel to a scan axis $\Theta_x$ to produce multiple scan lines 410 of the scan pattern 200, where each scan line 410 is oriented substantially parallel to the scan axis $\Theta_x$. The y-scan mirror may be configured to distribute the scan lines 410 along a scan axis $\Theta_y$ that is substantially orthogonal to scan axis $\Theta_x$. In FIG. 3, scanner 120 includes x-scan mirror 300-1 and y-scan mirror 300-2. Scanning mirror 300-1 oscillates back and forth to scan output beam 125 along scan axis $\Theta_x$ and produce multiple scan lines 410, and scanning mirror 300-2 is oscillated to distribute the scan lines 410 along scan axis $\Theta_y$. In FIG. 4, scanner 120 includes x-scan mirror 300-1 and y-scan mirror 300-2. Scanning mirror 300-1 is a polygon mirror that is rotated continuously to scan output beam 125 along scan axis $\Theta_x$ and produce multiple scan lines 410, and scanning mirror 300-2 is oscillated to distribute the scan lines 410 along scan axis $\Theta_y$.

In particular embodiments, scan lines 410 may be distributed within an adjustable field of regard FOR' according to an adjustable $\Theta_y$-axis scan profile, where the adjustable scan profile includes $\Theta'_{min}$ (the minimum scan angle along the $\Theta_y$ axis), $\Theta'_{max}$ (the maximum scan angle along the $\Theta_y$ axis), and a scan-line distribution. The scan lines 410 may be located between the minimum scan angle $\Theta'_{min}$ and the maximum scan angle $\Theta'_{max}$, and the scan-line distribution represents a distribution of scan lines 410 between the minimum and maximum scan angles and corresponds to one or more positions or one or more scanning speeds of the y-scan mirror. The scan-line distribution represents how the scan lines 410 are distributed along the $\Theta_y$ axis (e.g., evenly distributed, or distributed with a variation in scan-line density), and the scan-line distribution may be determined at least in part by the scanning speed of the y-scan mirror.

In particular embodiments, a scan-line distribution may represent or correspond to one or more scanning speeds of a y-scan mirror (e.g., scanning mirror 300-2 in FIG. 3 or scanning mirror 300-2 in FIG. 4). In particular embodiments, the one or more scanning speeds of they-scan mirror may include a substantially constant scanning speed, and the corresponding scan-line distribution may include scan lines 410 that are spaced apart substantially uniformly along the $\Theta_y$ scan axis. As an example, scanning mirror 300-2 in FIG. 4 may be scanned at a substantially constant scanning speed (e.g., 300 degrees per second), and the resulting scan lines 410 may have a substantially uniform spacing between them (e.g., as illustrated by the scan lines 410 in FIG. 10 and FIG. 12). In particular embodiments, the one or more scanning speeds of the y-scan mirror (e.g., mirror 300-2 in FIG. 4) may include a lower scanning speed (e.g., 50 degrees per second) and a higher scanning speed (e.g., 400 degrees per second). The corresponding scan-line distribution may include a higher density of scan lines 410 corresponding to the lower scanning speed and a lower density of scan lines 410 corresponding to the higher scanning speed. As an example, scanning mirror 300-2 in FIG. 4 may have an adjustable scanning speed and may be configured to produce a scan pattern 200 like that in FIG. 11 with a region of higher-density scan lines 410 between angles $\Theta_1$ and $\Theta_2$ and lower-density scan lines 410 outside that region.

In particular embodiments, a scan-line distribution may represent or correspond to one or more positions or angles of the y-scan mirror (e.g., scanning mirror 300-2 in FIG. 3 or scanning mirror 300-2 in FIG. 4). In particular embodiments, the one or more positions of the y-scan mirror may include a beginning position and an ending position. As an example, the beginning position may correspond to a scan line 410 located approximately at a maximum scan angle $\Theta'_{max}$, and the ending position may correspond to a scan line 410 located approximately at a minimum scan angle $\Theta'_{min}$. In the example of FIG. 12, scan line 410X may be associated with a beginning position of a scanning mirror, and scan line 410Y may be associated with an ending position of the scanning mirror. After scan line 410Y is scanned, the scanning mirror may perform a retrace operation by moving from the ending position back to the beginning position and then start a new scan. In particular embodiments, the one or more positions of the y-scan mirror may include one or more positions of the y-scan mirror between a beginning and ending position. As an example, each scan line 410 of a scan pattern 200 may correspond to a particular position or angle of a scanning mirror. In the example of FIG. 11, each of the 11 scan lines 410 may correspond to a particular position or angle of a scanning mirror, and these positions or angles may be specified by a scan-line distribution.

In particular embodiments, a scan pattern 200 as illustrated in FIG. 10, 11, or 12 may be produced by a lidar system 100 that includes a scanner 120 with a polygon mirror that includes two or more reflective surfaces 320 (e.g., polygon mirror 300-1 in FIG. 4). The polygon mirror 300-1 in FIG. 4 may be configured to continuously rotate at a substantially constant rotation speed (e.g., 150 revolutions per second) in one direction about a rotation axis of the polygon mirror. Pulses of light emitted by a light source 110 may be reflected sequentially from the reflective surfaces 320 as the polygon mirror 300-1 is rotated, resulting in the pulses of light begin scanned substantially parallel to the first scan axis $\Theta_x$ to produce multiple scan lines 410, where each scan line 410 corresponds to a reflection from one of the reflective surfaces 320.

In particular embodiments, the multiple scan lines 410 of a scan pattern 200 may be distributed temporally based at least in part on a scanning speed of a x-scan mirror. Each scan line 410 may be produced over a particular time interval, and scan lines 410 may be produced sequentially so that their respective time intervals do not overlap. As an example, scan line 410A in FIG. 10 may be produced during a time interval from 0 ms to 1 ms, and scan line 410B may be produced during a subsequent time interval from 1 ms to 2 ms. The respective scan lines 410 of a scan pattern 200 may be produced sequentially in time so that no two scan lines 410 are produced at the same time or over the same time interval. For example, scan line 410A may be produced from 0.2 ms to 0.8 ms, and scan line 410B may be produced from 1.2 ms to 1.8 ms (e.g., there is a 0.4-ms time gap between the two scan lines). The scanning speed or the number of reflective surfaces 320 of the x-scan mirror may determine how the scan lines 410 are distributed in time. For example, the polygon mirror 300-1 in FIG. 4 with N=4 sides may have a rotation speed R of 100 revolutions per second, corresponding to producing approximately 400 scan lines per second (or, one scan line every 2.5 ms). Scan line 410A in FIG. 10 may then be produced during a time interval from 0 ms to 2.5 ms, and the subsequent scan line 410B may be produced during a time interval from 2.5 ms to 5 ms. For example, scan line 410A may be produced from 0.5 ms to 2 ms, and scan line 410B may be produced from 3 ms to 4.5 ms.

In particular embodiments, a x-scan mirror may scan pulses of light substantially parallel to a scan axis $\Theta_x$. and each scan line 410 may be oriented substantially parallel to the scan axis $\Theta_x$. Each scan line 410 of a scan pattern 200 being oriented substantially parallel to the scan axis $\Theta_x$ may refer to each scan line 410 being oriented to within approximately 0°, 0.1°, 0.2°, 0.5°, 1°, 2°, 5°, or 10° of the scan axis $\Theta_x$. The scan-line orientation may correspond to the incline angle δ as described above with respect to FIG. 10. As an example, the scan lines 410 in FIG. 10 may be referred to as being substantially parallel to the scan axis $\Theta_x$, and each scan line 410 may have an incline angle δ that is less than or equal to 5°. As another example, the scan lines 410 in FIG. 11 may be referred to as being substantially parallel to the scan axis $\Theta_x$, and each scan line 410 may have an incline angle δ that is between approximately 1° and approximately 5°. As another example, the scan lines 410 in FIG. 12 may be referred to as being substantially parallel to the scan axis $\Theta_x$, and each scan line 410 may have an incline angle δ that is approximately equal to 0.5°. In particular embodiments, one or more scan lines 410 of a scan pattern 200 may be a substantially straight line. In the example of FIGS. 10-12, each scan line 410 is a substantially straight line.

Figure 13:
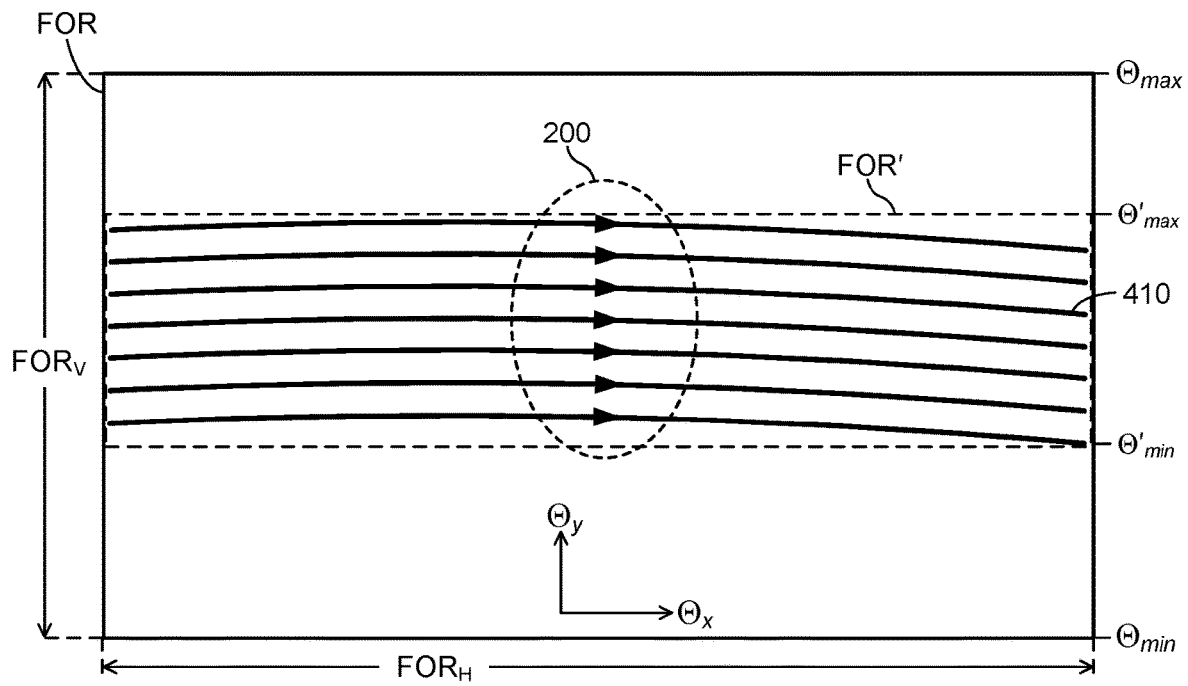
FIG. 13 illustrates an example focused scan pattern with slightly curved scan lines.

FIG. 13 illustrates an example scan pattern 200 with slightly curved scan lines 410. In particular embodiments, one or more scan lines 410 of a scan pattern 200 may be slightly curved or may have some amount of curvature. As an example, a scan line 410 may be slightly curved if each section of the scan line 410 has a slope or orientation that is within a particular angular range (e.g., within 1°, 2°, 5°, or 10°) of the scan axis $\Theta_x$. In FIG. 13, each scan line 410 has sections with orientations that are within approximately 5° of the scan axis $\Theta_x$. For example, each scan line 410 has a left section with an orientation (with respect to the scan axis $\Theta_x$) of approximately +2.5°, a middle section with an orientation of approximately 0°, and a right section with an orientation of approximately −5°. In particular embodiments, a scan line 410 that is slightly curved may be referred to as being oriented substantially parallel to a scan axis $\Theta_x$.

In particular embodiments, a scan pattern 200 may include any suitable number of scan lines 410. As an example, a scan pattern 200 may include from approximately 10 scan lines 410 to approximately 1,000 scan lines. In particular embodiments, the number of scan lines 410 in a scan pattern 200 may be adjustable. As an example, a lidar system 100 may perform a high-resolution scan using a scan pattern 200 with approximately 640 scan lines 410, and the lidar system 100 may perform a subsequent scan using a scan pattern 200 with approximately 64 scan lines 410.

In particular embodiments, each scan line 410 may extend from approximately one edge of the adjustable field of regard to approximately an opposite edge of the adjustable field of regard. In FIGS. 7-11, each scan line 410 extends along scan axis $\Theta_x$ from a left edge of the FOR to a right edge of the FOR. In particular embodiments, the edges of FOR and FOR' which are approximately parallel to scan axis $\Theta_y$ may be approximately coincident. In FIGS. 12 and 13, the left and right edges of the FOR' are approximately coincident with the respective left and right edges of the FOR, and each scan line 410 extends from the left edge of the FOR' to the right edge of the FOR'.

Figure 14:
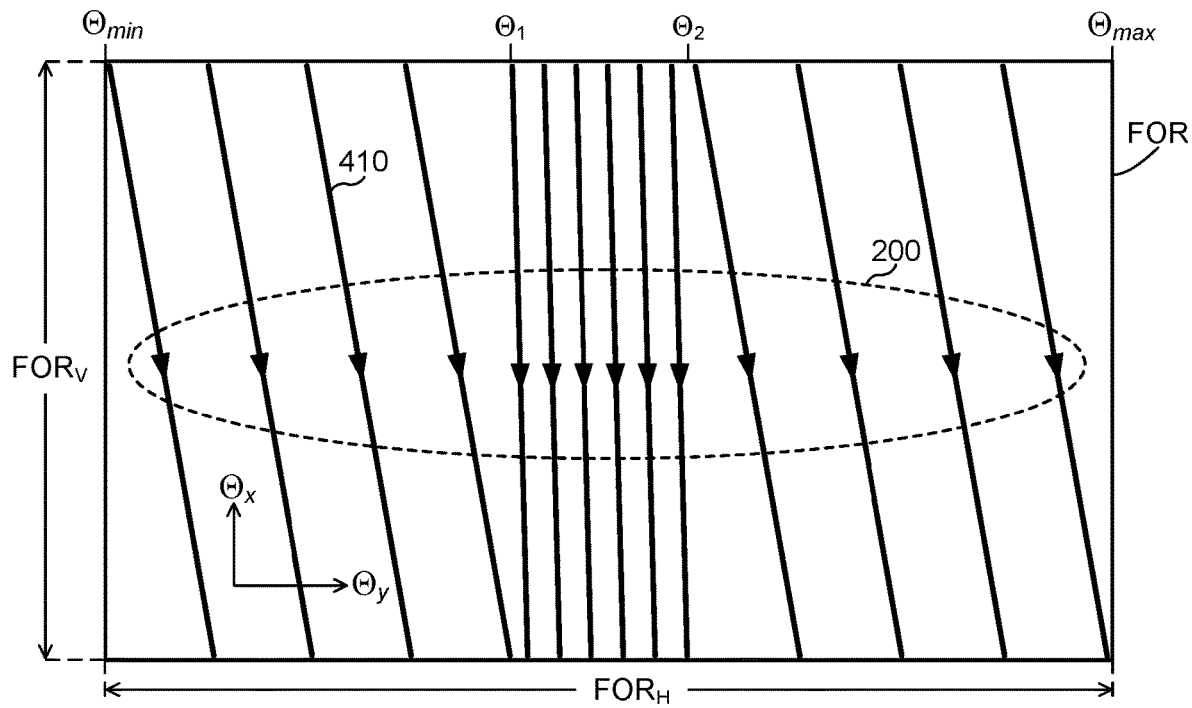
FIG. 14 illustrates an example nonuniform scan pattern with scan lines oriented vertically.

FIG. 14 illustrates an example nonuniform scan pattern 200 with scan lines 410 oriented vertically. The scan pattern 200 illustrated in FIG. 14 is a unidirectional scan pattern 200 where each scan line 410 travels vertically across the FOR in substantially the same direction (e.g., from top to bottom). In particular embodiments, scan axis $\Theta_x$ may have a substantially vertical orientation, and scan axis $\Theta_y$ may have a substantially horizontal orientation. The scan pattern 200 in FIG. 14 is similar to that of FIG. 11 with the orientation of the scan axes $\Theta_x$ and $\Theta_y$ reversed. Similarly, the orientation of the scan lines 410 in FIG. 14 is rotated by 90° with respect to the scan lines in FIG. 11. In FIG. 14, scan axis $\Theta_y$ corresponds to the horizontal field of regard (FOR$_H$) and may extend horizontally from −30 degrees to +30 degrees. Similarly, scan axis $\Theta_x$ corresponds to the vertical field of regard (FOR$_V$) and may extend vertically from −10 degrees to +10 degrees.

Figure 15:
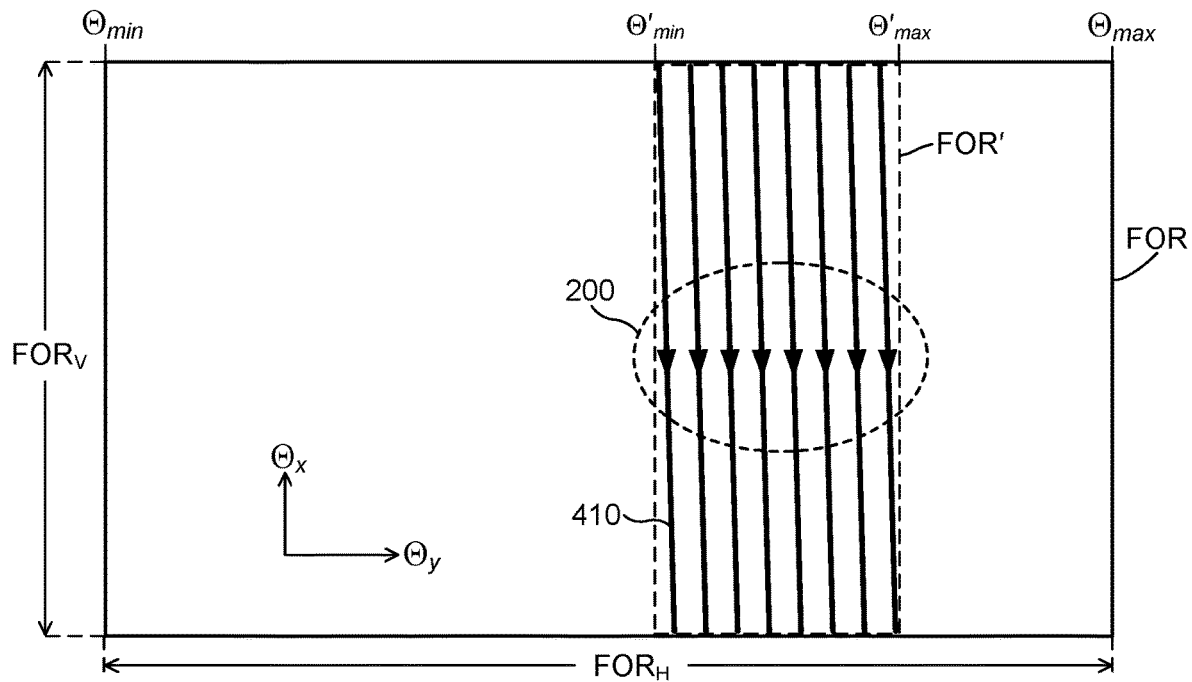
FIG. 15 illustrates an example focused scan pattern with scan lines oriented vertically.

FIG. 15 illustrates an example focused scan pattern 200 with scan lines 410 oriented vertically. In FIG. 15, the scan pattern 200 is contained within an adjustable field of regard FOR' that extends along the $\Theta_y$ scan axis between the angles $\Theta'_{min}$ and $\Theta'_{max}$. Additionally, the top and bottom edges of the FOR' are approximately coincident with the respective top and bottom edges of the FOR. The scan pattern 200 illustrated in FIG. 15 is similar to that of FIG. 12 with the orientation of the scan axes $\Theta_x$ and $\Theta_y$ reversed. Similarly, the orientation of the scan lines 410 in FIG. 15 is rotated by 90° with respect to the scan lines in FIG. 12. Each scan line 410 extends vertically across the full FOR$_V$, and the scan pattern 200 covers a portion of the FOR along the $\Theta_y$ scan axis. A scan pattern 200 with scan lines 410 oriented vertically (as illustrated in FIG. 14 or 15) may be produced by a lidar system 100 as illustrated in FIG. 4. The polygon mirror 300-1 may be configured to produce the vertically oriented scan lines 410, and the scanning mirror 300-2 may be configured to distribute the scan lines 410 horizontally along the $\Theta_y$ scan axis.

In particular embodiments, a $\Theta_x$ scan axis may be substantially horizontal, and the corresponding $\Theta_y$ scan axis may be substantially vertical. Additionally, the adjustable minimum scan angle $\Theta'_{min}$ and the adjustable maximum scan angle $\Theta'_{max}$ may each correspond to an elevation angle. In each of FIGS. 12 and 13, the $\Theta_x$ scan axis is substantially horizontal, and the $\Theta_y$ scan axis is substantially vertical. Additionally, the angles $\Theta'_{min}$ and $\Theta'_{max}$ are elevation angles.

In particular embodiments, a $\Theta_x$ scan axis may be substantially vertical, and the corresponding $\Theta_y$ scan axis may be substantially horizontal. Additionally, the adjustable minimum scan angle $\Theta'_{min}$ and the adjustable maximum scan angle $\Theta'_{max}$ may each correspond to an azimuth angle. In each of FIGS. 14 and 15, the $\Theta_x$ scan axis is substantially vertical, and the $\Theta_y$ scan axis is substantially horizontal. Additionally, in FIG. 15, the angles $\Theta'_{min}$ and $\Theta'_{max}$ are azimuth angles.

Figure 16:
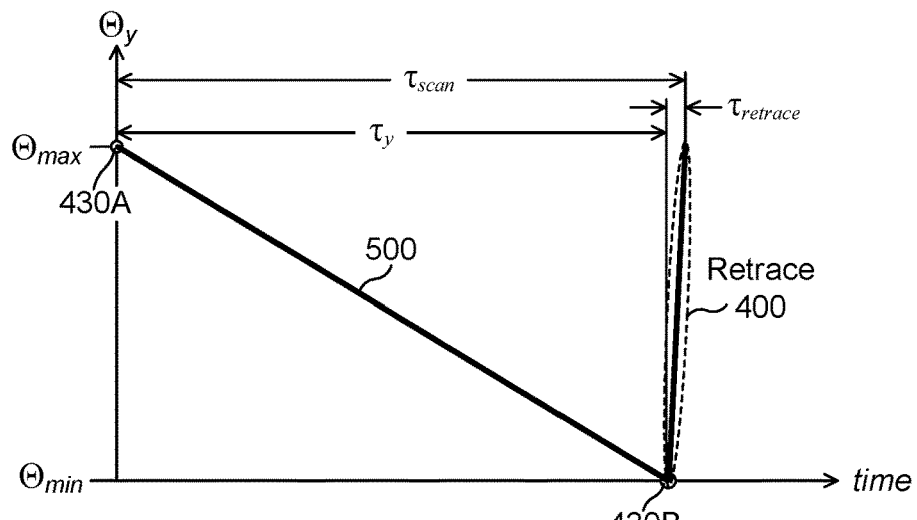
FIG. 16 illustrates an example scan profile for a scan pattern with a substantially uniform distribution of scan lines.

FIG. 16 illustrates an example scan profile 500 for a scan pattern 200 with a substantially uniform distribution of scan lines 410. In particular embodiments, a scan profile 500 may be referred to as a $\Theta_y$-axis scan profile, a y-axis scan profile, an adjustable scan profile, an adjustable $\Theta_y$-axis scan profile, an adjustable y-axis scan profile, or a scan-pattern y-component. In particular embodiments, a scan profile 500 may represent the position of a scanning mirror (e.g., mirror 300-2 in FIG. 3 or FIG. 4) versus time, or a scan profile 500 may represent the position of an output beam 125 along the $\Theta_y$ scan axis versus time. In particular embodiments, a scan profile 500 may correspond to the $\Theta_y$-axis portion of a scan where a scanner 120 directs an output beam 125 across a scan pattern 200 from a starting point 430A to an end point 430B, and a retrace 400 may represent the portion of a scan where the scanner 120 resets to the starting point of the scan. For example, the scan profile 500 illustrated in FIG. 16 may correspond to the scan pattern 200 in FIG. 7 which includes traversing the scan pattern 200 from starting point 430A to end point 430B and a retrace 400 from end point 430B to starting point 430A.

The y-axis scan time Ty corresponds to a time for the output beam 125 to be scanned across a scan pattern 200 from a starting point 430A to an end point 430B (not including the time to perform a retrace 400). For example, the y-axis scan time $\tau_y$ may correspond to a time for scanning mirror 300-2 in FIG. 3 or FIG. 4 to scan the output beam 125 from a maximum angle (e.g., $\Theta_{max}$ or $\Theta'_{max}$) to a minimum angle (e.g., $\Theta_{min}$ or $\Theta'_{min}$). The retrace time $\tau_{retrace}$ corresponds to a time for the output beam 125 to traverse the retrace path 400 (e.g., from an end point back to a starting point). The time $\tau_{scan}$ corresponds to the total time to scan one complete round-trip of a scan pattern 200 (e.g., from a starting point to an end point, and then retracing back to the starting point), and $\tau_{scan}$ equals $\tau_y+\tau_{retrace}$. The frame rate F at which a lidar system 100 scans may be expressed as $1/\tau_{scan}$ which is equal to $1/(\tau_y+\tau_{retrace})$. A lidar system 100 may have any suitable scan time $\tau_{scan}$, such as for example, a scan time of approximately 10 s, 2 s, 1 s, 0.5 s, 0.2 s, 100 ms, 50 ms, 10 ms, or 1 ms.

The scan profile 500 illustrated in FIG. 16 may correspond to the scan pattern 200 illustrated in FIG. 7 or FIG. 10. In particular embodiments, a slope of scan profile 500 may correspond to an angular scan speed along the $\Theta_y$ scan axis. For example, the slope of the scan profile 500 in FIG. 16 may be approximately 300 degrees per second, and this may correspond to a substantially constant scan speed (e.g., of output beam 125 along the $\Theta_y$ scan axis) of approximately 300 degrees per second. The substantially uniform distribution of scan lines 410 in FIGS. 7 and 10 corresponds to the substantially uniform slope of the scan profile 500. Since the slope of the scan profile 500 is substantially constant (corresponding to a substantially uniform scan speed), the scan lines 410 in FIGS. 7 and 10 are spaced apart along the $\Theta_y$ scan axis in a substantially uniform manner. In particular embodiments, a scan profile 500 may include any suitable slope or combination of two or more slopes, which corresponds to any suitable scan speed or combination of two or more scan speeds.

Figure 17:
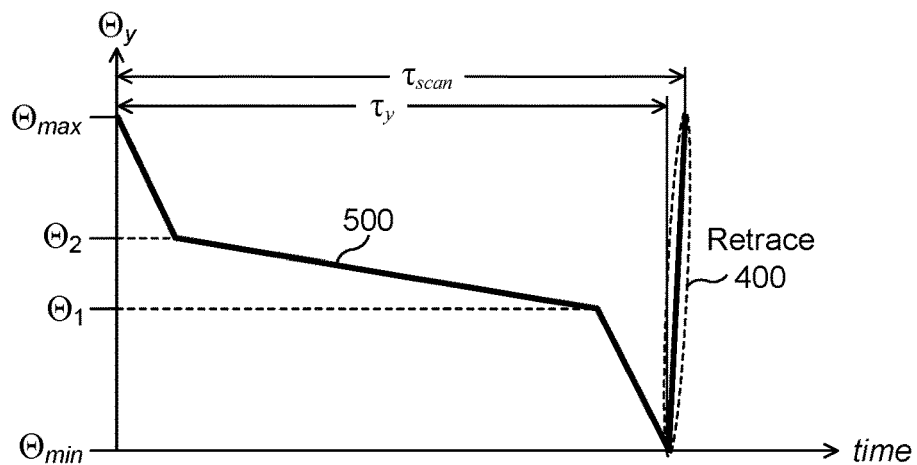
FIG. 17 illustrates an example scan profile for a scan pattern with a nonuniform distribution of scan lines.

FIG. 17 illustrates an example scan profile 500 for a scan pattern 200 with a nonuniform distribution of scan lines 410. The scan profile 500 illustrated in FIG. 17 may correspond to the scan pattern 200 illustrated in FIG. 8, FIG. 11, or FIG. 14. For example, the lower density of scan lines 410 between angles $\Theta_{min}$ and $\Theta_1$ and between angles $\Theta_2$ and $\Theta_{max}$ may be associated with the higher slope of the scan profile 500 between those angles (and a corresponding higher scan speed). Similarly, the higher density of scan lines 410 between angles $\Theta_1$ and $\Theta_2$ may be associated with the lower slope of the scan profile 500 between those angles (and a corresponding lower scan speed). An adjustable scan profile 500 as illustrated in FIG. 17 may be produced by a scanning mirror (e.g., mirror 300-2 in FIG. 3 or FIG. 4) having an adjustable scan rate along the $\Theta_y$ scan axis. Between angles $\Theta_{min}$ and $\Theta_1$ and between angles $\Theta_2$ and $\Theta_{max}$, the scan profile 500 may have a slope of approximately 400 degrees per second (which corresponds to a scan rate along the $\Theta_y$ scan axis of approximately 400 degrees per second). Additionally, between angles $\Theta_1$ and $\Theta_2$, the scan profile 500 may have a slope of approximately 50 degrees per second.

Figure 18:
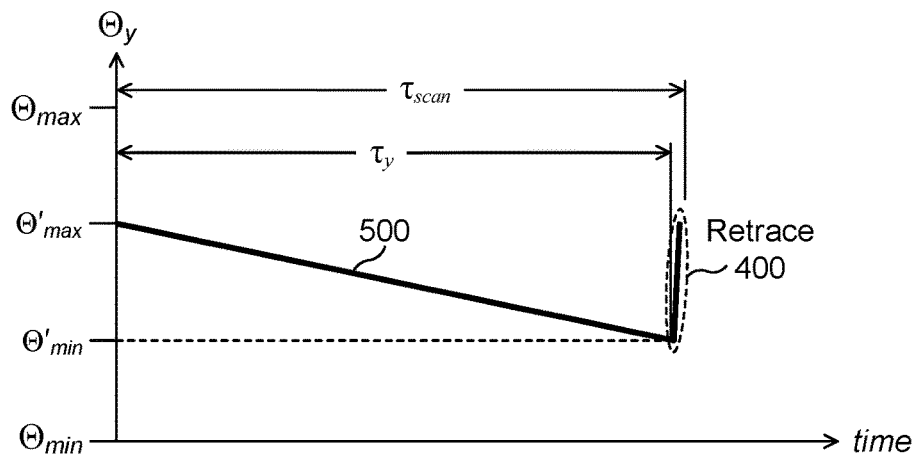
FIG. 18 illustrates an example scan profile associated with a focused scan pattern.

FIG. 18 illustrates an example scan profile 500 associated with a focused scan pattern. The scan profile 500 illustrated in FIG. 18 may correspond to the scan pattern 200 illustrated in FIG. 12, FIG. 13, or FIG. 15, where the scan pattern 200 is contained within an adjustable field of regard FOR'. The scan profile 500 in FIG. 18 represents a scan pattern 200 that scans output beam 125 along the $\Theta_y$ scan axis between the angles $\Theta'_{min}$ and $\Theta'_{max}$. The scan profile 500 illustrated in FIG. 18 has a substantially constant slope corresponding to a substantially uniform scan speed and a substantially uniform distribution of scan lines 410 between the angles $\Theta'_{min}$ and $\Theta'_{max}$ (e.g., as illustrated by the scan lines 410 in FIG. 12). In particular embodiments, a scan profile 500 for a focused scan pattern may include any suitable slope or combination of two or more slopes. As an example, a scan profile 500 located between the angles $\Theta'_{min}$ and $\Theta'_{max}$ may include one section with a higher slope (corresponding to a higher scanning speed and a lower density of scan lines 410) and another section with a lower slope (corresponding to a lower scanning speed and a higher density of scan lines 410). As another example, a scan profile 500 similar to that in FIG. 17 may be located between the angles $\Theta'_{min}$ and $\Theta'_{max}$ of an adjustable field of regard FOR'.

In particular embodiments, a scan profile 500 may include or may be based on a minimum scan angle (e.g., $\Theta'_{min}$ or $\Theta'_{min}$) and a maximum scan angle (e.g., $\Theta_{max}$ or $\Theta'_{max}$). In the example of FIG. 16 and FIG. 17, the scan profile 500 extends from the maximum scan angle $\Theta_{max}$ to the minimum scan angle $\Theta_{min}$. In the example of FIG. 18, the scan profile 500 extends from the adjustable maximum angle $\Theta'_{max}$ to the adjustable minimum angle $\Theta'_{min}$. In particular embodiments, a scan profile 500 may include or may be based on a scan-line distribution which represents a distribution of scan lines 410 between a minimum scan angle (e.g., $\Theta_{min}$ or $\Theta'_{min}$) and a maximum scan angle (e.g., $\Theta_{max}$ or $\Theta'_{max}$). The scan lines 410 may be distributed or arranged along the $\Theta_y$ scan axis and within the adjustable field of regard in any suitable manner. A scan-line distribution may include one or more slopes of the scan profile 500 or one or more scanning speeds of a mirror configured to scan along the $\Theta_y$ scan axis.

In particular embodiments, a scan profile 500 may be repeated any suitable number of times. As an example, a particular scan profile 500 may be repeated 1, 2, 5, 10, 100, 1,000, 10,000, or any other suitable number of times (e.g., a lidar system 100 may perform 50 scans in succession using the scan profile 500 illustrated in FIG. 17). In particular embodiments, a scan profile 500 may be changed or adjusted between scans. As an example, a lidar system 100 may perform any suitable number of scans using scan profile 500 illustrated in FIG. 16, and then the lidar system 100 may switch to the scan profile 500 illustrated in FIG. 18. In particular embodiments, a scan profile 500 may be adjusted between subsequent scans in any suitable manner. As an example, a minimum scan angle (e.g., $\Theta_{min}$ or $\Theta'_{min}$), a maximum scan angle (e.g., $\Theta_{max}$ or $\Theta'_{max}$), or a scan-line distribution may be adjusted in any suitable manner.

In particular embodiments, a lidar system 100 may include a processor configured to adjust a $\Theta_y$-axis scan profile 500. For example, a processor configured to adjust a scan profile 500 may include any suitable processor located within the lidar system 100 (e.g., the processor may include or may be part of controller 150) or located external to the lidar system 100. In particular embodiments, a processor may be configured to adjust a $\Theta_y$-axis scan profile 500 after a lidar system 100 captures one or more initial frames, and the adjusted $\Theta_y$-axis scan profile 500 may be applied to one or more subsequent frames that are captured after the initial frames. In particular embodiments, a processor may be configured to adjust a $\Theta_y$-axis scan profile 500 in response to detecting pulses of light scattered by a target 130. The $\Theta_y$-axis scan profile 500 may be adjusted to provide a scan of the target 130 that has a higher resolution (e.g., a higher density of scan lines 410) or a higher frame rate than a previous scan. For example, a lidar system may use scan profile 500 in FIG. 16 to scan a field of regard. After a target 130 is detected in a particular portion of the field of regard, the processor may adjust the $\Theta_y$-axis scan profile 500 to focus on that portion of the field of regard where the target 130 is located. For example, the processor may select scan profile 500 illustrated in FIG. 17 (e.g., at least part of the target 130 is located between angles $\Theta_1$ and $\Theta_2$) or scan profile 500 illustrated in FIG. 18 (e.g., at least part of the target 130 is located between angles $\Theta'_{min}$ and $\Theta'_{max}$).

In particular embodiments, adjusting a $\Theta_y$-axis profile 500 may include adjusting a minimum or maximum scan angle to reduce an angular range of an adjustable field of regard along the $\Theta_y$ scan axis. The angular range of an adjustable field of regard may be expressed as $\Theta'_{max}-\Theta'_{min}$ and may have any suitable value, such as for example, 0.5°, 1°, 2°, 5°, 10°, 20°, 30°, 40°, or 50°. In particular embodiments, the angular range of an adjustable field of regard may be reduced so that a lidar system 100 scans a particular region of interest with an increased density of scan lines 410. As an example, a scanner 120 may be configured to scan using scan profile 500 illustrated in FIG. 16, and for a subsequent scan, the scan profile 500 may be adjusted so that the scanner 120 scans using the scan profile 500 illustrated in FIG. 18. For example, in FIG. 16, $\Theta_{max}$ may be +15° and $\Theta_{min}$ may be −15°, corresponding to a 30° angular range. In FIG. 18, the maximum and minimum scan angles ($\Theta'_{max}$ and $\Theta'_{min}$) may be adjusted to +5° and −5°, respectively, corresponding to a reduced angular range of 10°. Additionally, the scan speed (corresponding to the slope of the scan profile) may be reduced when scanning across a reduced angular range, which results in an increase in scan-line density for the reduced angular range. For example, the scan speed may be reduced by a factor of 3, resulting in a 3× increase in the scan-line density for the reduced angular range. As another example, a scanner 120 may be configured to scan using scan profile 500 in FIG. 18, and for a subsequent scan, the angles $\Theta'_{max}$ and $\Theta'_{min}$ may be adjusted to focus on a particular region of interest. For example, in FIG. 18, $\Theta'_{max}$ may be +10° and $\Theta'_{min}$ may be −10°, corresponding to a 20° angular range. The maximum and minimum scan angles ($\Theta'_{max}$ and $\Theta'_{min}$) may be adjusted to +2° and −6°, respectively, corresponding to a reduced angular range of 8°.

In particular embodiments, the angular range of an adjustable field of regard may be reduced so that a lidar system 100 scans a particular region of interest with an increased frame rate. As an example, a scanner 120 may be adjusted to scan over a reduced angular range, and the scan speed may not be reduced (or the scan speed may be reduced by a factor less than the reduction in the angular range). If the angular scan range along the $\Theta_y$ scan axis is reduced by a factor of 4 and the scan speed remains substantially unchanged, then the frame rate will increase by approximately a factor of 4, and the scan-line density will remain substantially unchanged. For example, a scan over a 30° scan range may be performed in a scan time $\tau_y$ of approximately 100 ms and may include approximately 64 scan lines 410. The angular range may be reduced by 4× to a 7.5° scan range, and, if the scan speed is not changed, then the scan time $\tau_y$ will be reduced to approximately 25 ms, and the scan will include approximately 16 scan lines 410. The scan-line density for both the 30° scan and the 7.5° scan will be approximately 2.1 scan lines per degree.

In particular embodiments, the angular range of an adjustable field of regard may be reduced so that a lidar system 100 scans a particular region of interest with an increased frame rate and an increased scan-line density. As an example, if an angular scan range along the $\Theta_y$ scan axis is reduced by a factor of 4 and the scan speed is reduced by a factor of 2, then the frame rate will increase by approximately a factor of 2, and the scan-line density will increase by approximately a factor of 2. For example, a scan over a 20° scan range may be performed in a scan time $\tau_y$ of approximately 100 ms and may include approximately 64 scan lines 410 (corresponding to a scan-line density of approximately 3.2 scan lines per degree). The angular range may be reduced by 4× to a 5° scan range, and the scan speed may be reduced by 2× so that the scan time $\tau_y$ is approximately 50 ms (corresponding to an increase in the frame rate of approximately 2×). The reduced scan may include approximately 32 scan lines 410, and the scan-line density may be approximately 6.4 scan lines per degree (corresponding to a 2× increase in scan-line density).

In particular embodiments, adjusting a $\Theta_y$-axis scan profile 500 may include adding an angular-offset value $\Delta\Phi$ to each of the minimum and maximum scan angles to shift the adjustable field of regard along the $\Theta_y$ scan axis by the angular-offset value $\Delta\Phi$. As an example, a scanner 120 may be configured to scan using scan profile 500 illustrated in FIG. 18, and for a subsequent scan, the scan profile 500 may be adjusted so that the scan lines 410 are moved up or down by an angular-offset value $\Delta\Phi$. For example, in FIG. 18, $\Theta'_{max}$ may be +5° and $\Theta'_{min}$ may be −5°. The scan-profile angles may be adjusted upwards by $\Delta\Phi$=2° resulting in an adjusted scan profile 500 where $\Theta'_{max}$ is +7° and $\Theta'_{min}$ is −3°.

In particular embodiments, adjusting a $\Theta_y$-axis scan profile 500 may include adding an angular-offset value $\Delta\Phi_1$ to a maximum scan angle and adding an angular-offset value $\Delta\Phi_2$ to a minimum scan angle. As an example, a scanner 120 may be configured to scan using scan profile 500 illustrated in FIG. 18, and for a subsequent scan, the scan profile 500 may be adjusted so that $\Theta'_{max}$ is adjusted by $\Delta\Phi_1$, and $\Theta'_{min}$ is adjusted by $\Delta\Phi_2$. For example, in FIG. 18, $\Theta'_{max}$ may be +10° and $\Theta'_{min}$ may be −10°. The scan-profile angles may be adjusted by $\Delta\Phi_1$=−7° and $\Delta\Phi_2$=5° resulting in an adjusted scan profile 500 where $\Theta'_{max}$ is +3° and $\Theta'_{min}$ is −5°.

In particular embodiments, adjusting a $\Theta_y$-axis scan profile 500 may include adjusting a scan-line distribution to produce an increased density of scan lines 410 for a particular region of interest. As an example, a scanner 120 may be configured to scan using scan profile 500 illustrated in FIG. 16, and for a subsequent scan, an adjusted scan profile 500 based on FIG. 17 may be applied. The scan-line distribution may be adjusted to provide a reduced scan speed between angles $\Theta_1$ and $\Theta_2$ and a corresponding increase in scan-line density in that region. As another example, a scanner 120 may be configured to use scan profile 500 illustrated in FIG. 18, and for a subsequent scan, the scan profile 500 may be adjusted to provide a reduced scan speed between angles $\Theta'_{max}$ and $\Theta'_{min}$ (and a corresponding increase in scan-line density).

Figure 19:
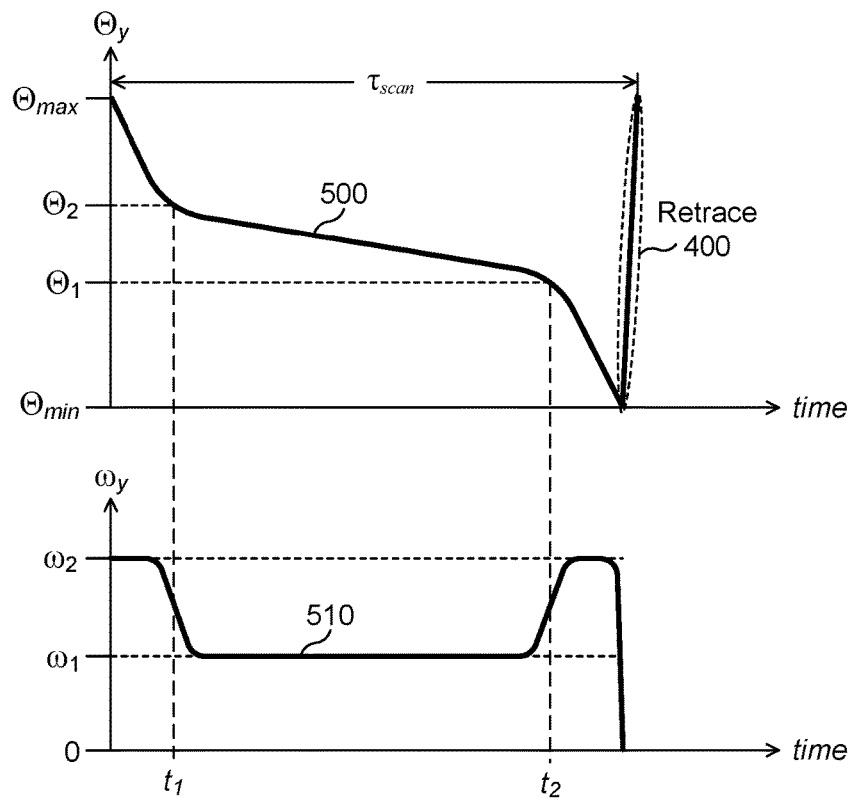
FIG. 19 illustrates an example scan profile and a corresponding angular scanning-speed curve.

FIG. 19 illustrates an example scan profile 500 and a corresponding angular scanning-speed curve 510. In particular embodiments, a scan profile 500 may include one or more piecewise linear sections or one or more substantially smooth or continuous curves. The scan profile 500 illustrated in FIG. 19 includes a smooth, continuous curve that corresponds to a smoothed version of the piecewise-linear scan profile 500 in FIG. 17. The scanning-speed curve 510 in FIG. 19 represents the angular scanning speed ($\omega_y$) of output beam 125 along the $\Theta_y$ scan axis and is proportional to the first derivative with respect to time of the scan profile 500. Around time $t_1$, the scanning speed is reduced from $\omega_2$ to $\omega_1$, and around time $t_2$, the scanning speed increases from $\omega_1$ to $\omega_2$. Rather than changing abruptly or instantaneously between the two scanning speeds $\omega_1$ and $\omega_2$, the scanning speed transitions smoothly between them. As an example, an output beam 125 may transition from a 200 degrees/second scan speed along the $\Theta_y$ scan axis to a 100 degrees/second scan speed over a time interval of approximately 50-500 µs. In particular embodiments, a scan profile 500 may include a slope that varies in a continuous manner (corresponding to a scan speed that also varies in a continuous manner). As an example, a scan profile 500 may include two sections with different slopes (corresponding to two different scan speeds), and the two sections may be connected together by a smooth, monotonic curve that represents a substantially continuous transition between the two slopes (corresponding to a substantially smooth transition from one scan speed to the other). In particular embodiments, a substantially smooth scan profile 500 or scanning-speed curve 510 may correspond to the motion of a scanning mirror (e.g., mirror 300-2 in FIG. 3 or FIG. 4) which may change its scan speed in a substantially smooth manner rather than in an abrupt or instantaneous manner.

Figure 20:
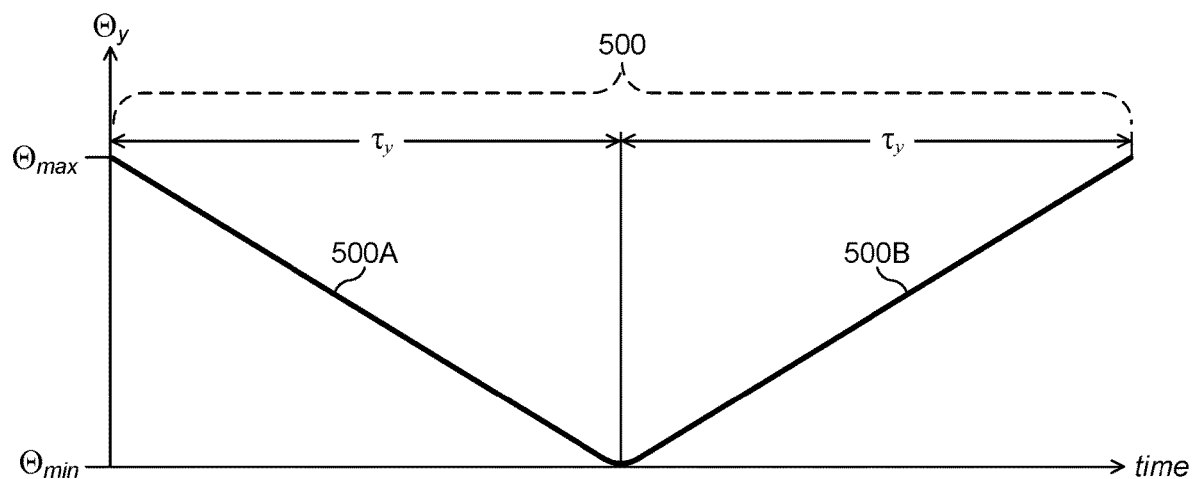
FIG. 20 illustrates an example dual-direction scan profile.

FIG. 20 illustrates an example dual-direction scan profile 500. The scan profile 500 in FIG. 20 includes a forward-scan profile 500A and a reverse-scan profile 500B. In particular embodiments, a scan profile 500 may not include a retrace 400, and the output beam 125 may be continuously scanned back-and-forth between the minimum and maximum scan angles (e.g., between angles $\Theta_{max}$ and $\Theta_{min}$ or between angles $\Theta'_{max}$ and $\Theta'_{min}$). In the example of FIG. 20, scan profile 500A corresponds to scan profile 500 in FIG. 16 where the output beam 125 is scanned along the $\Theta_y$ scan axis from $\Theta_{max}$ to $\Theta_{min}$. At the end of scan profile 500A, rather than performing a retrace operation, the output beam 125 is scanned in the reverse direction along reverse-scan profile 500B from $\Theta_{min}$ to $\Theta_{max}$. The lidar system 100 illustrated in FIG. 4 may perform a dual-direction scan by continuously rotating the polygon mirror 300-1 and scanning the output beam 125 along a dual-direction scan profile 500 as illustrated in FIG. 20. Each traversal of forward-scan profile 500A or reverse-scan profile 500B results in a complete scan of a scan pattern.

Figure 21:
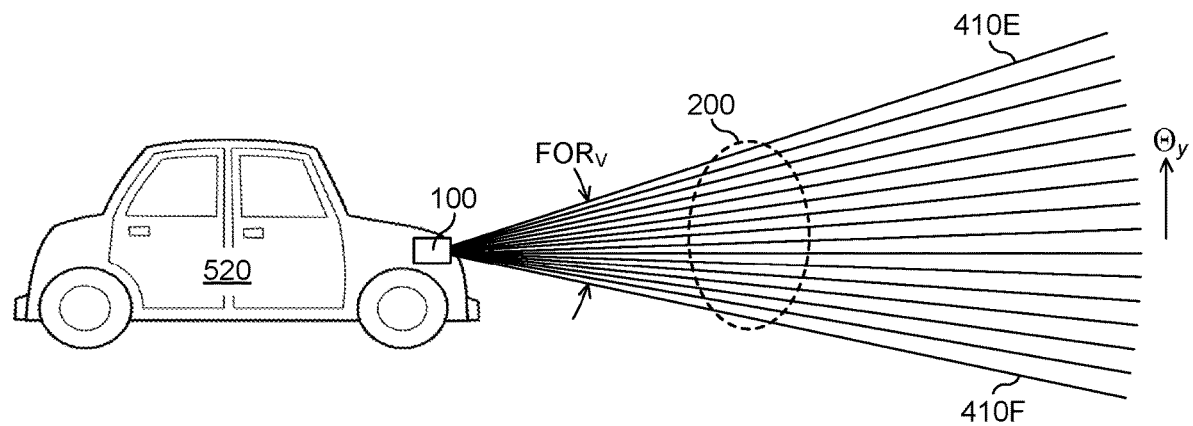
FIGS. 21-23 each illustrate an example vehicle with a lidar system configured to produce a particular scan pattern.
Figure 22:
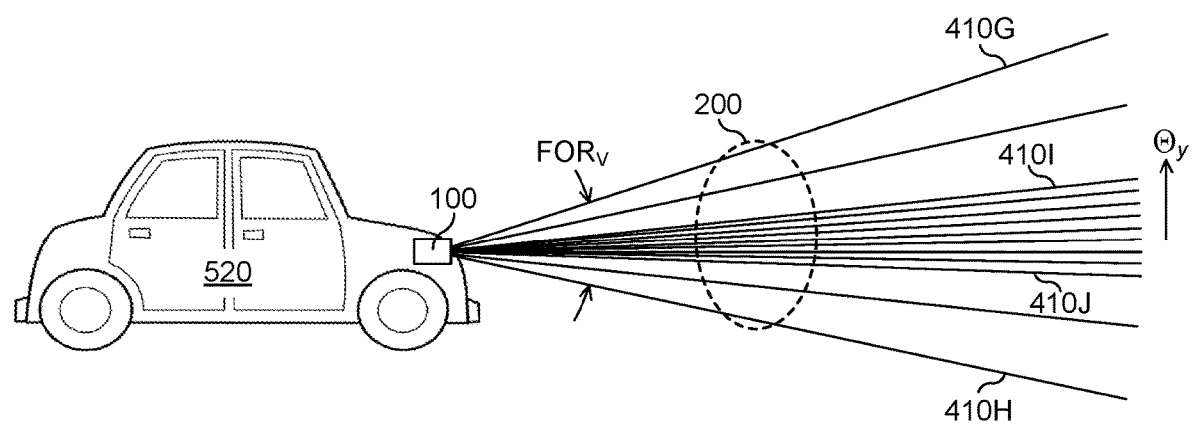
Figure 23:
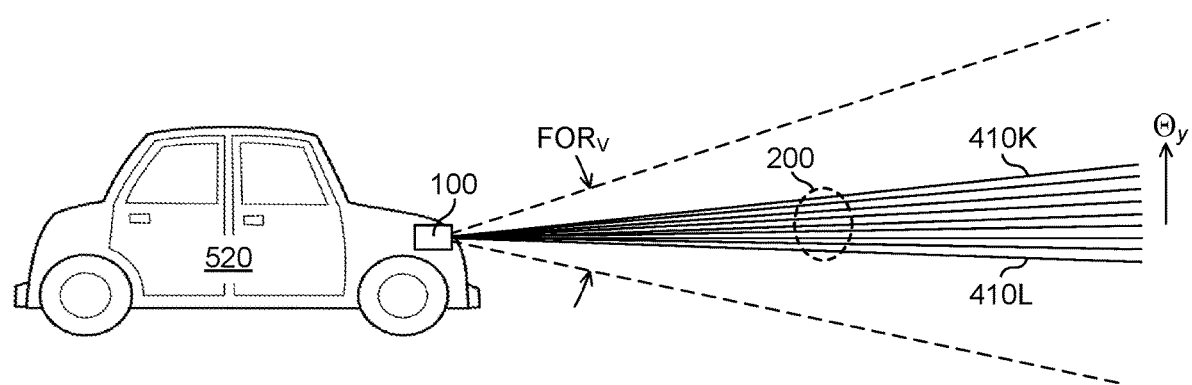

FIGS. 21-23 each illustrate an example vehicle 520 with a lidar system 100 configured to produce a particular scan pattern 200. The example scan pattern 200 illustrated in FIG. 21 is similar to scan pattern 200 illustrated in FIG. 10 or FIG. 12, where the scan lines 410 are distributed substantially evenly along the $\Theta_y$ scan axis. In FIG. 21, scan line 410E represents a scan line oriented at a maximum angle (e.g., $\Theta_{max}$ or $\Theta'_{max}$), and scan line 410F represents a scan line oriented at a minimum angle (e.g., $\Theta_{min}$ or $\Theta'_{min}$). The example scan pattern 200 illustrated in FIG. 22 is similar to scan pattern 200 illustrated in FIG. 11, where each scan pattern 200 has a variation in scan-line density along the $\Theta_y$ scan axis. In FIG. 22, scan line 410G represents a scan line oriented at a maximum angle (e.g., $\Theta_{max}$ or $\Theta'_{max}$), and scan line 410H represents a scan line oriented at a minimum angle (e.g., $\Theta_{min}$ or $\Theta'_{min}$). Additionally, the region with a higher scan-line density (between scan lines 410I and 410J) corresponds to the region between angles $\Theta_2$ and $\Theta_1$ in FIG. 11. The example scan pattern 200 illustrated in FIG. 23 is similar to scan pattern 200 illustrated in FIG. 12, where each scan pattern is contained within an adjustable field of regard. In FIG. 23, scan line 410K represents a scan line oriented at an adjustable maximum angle $\Theta'_{max}$ (similar to scan line 410X in FIG. 12), and scan line 410L represents a scan line oriented at an adjustable minimum angle $\Theta'_{min}$ (similar to scan line 410Y in FIG. 12). Additionally, the upper and lower dashed lines in FIG. 23 correspond to the upper and lower limits along the $\Theta_y$ axis for a fixed field of regard (e.g., $\Theta'_{max}$ and $\Theta'_{min}$, respectively).

FIGS. 24-25 each illustrate an example scan pattern 200 to which one or more angular offsets are applied. In FIG. 24, an angular-offset value $\Delta\Phi$ is added to each of the minimum and maximum scan angles to shift the scan pattern 200 along the $\Theta_y$ scan axis by the angular-offset value $\Delta\Phi$. For the initial scan pattern 200, scan line 410M represents a scan line oriented at a maximum angle (e.g., $\Theta'^{max}$), and scan line 410N represents a scan line oriented at a minimum angle (e.g., $\Theta'_{min}$). For the shifted scan pattern 200', scan line 410M' represents a scan line oriented at a shifted maximum angle equal to $\Theta'_{max}+\Delta\Phi$, and scan line 410N' represents a scan line oriented at a shifted minimum angle equal to $\Theta'_{min}+\Delta\Phi$. In particular embodiments, an angular-offset value $\Delta\Phi$ may have any suitable angular value, such as for example, approximately ±0.2°, ±0.5°, ±1°, ±2°, ±5°, ±10°, ±20°, or ±30°. In the example of FIG. 24, the angular-offset value $\Delta\Phi$ is approximately +6°, and the scan pattern 200 is shifted up by approximately 6 degrees. The same angular offset $\Delta\Phi$ is applied to both the maximum and minimum angles, and the initial scan pattern 200 and the shifted scan pattern 200' both have approximately the same angular range (e.g., approximately 20°). In FIG. 25, angular-offset value $\Delta\Phi_1$ is added to the maximum scan angle, and angular-offset value $\Delta\Phi_2$ is added to the minimum scan angle. For the initial scan pattern 200, scan line 410P represents a scan line oriented at a maximum angle (e.g., $\Theta'_{max}$), and scan line 410Q represents a scan line oriented at a minimum angle (e.g., $\Theta'_{min}$). For the adjusted scan pattern 200', the scan lines at the maximum and minimum angles are offset by the angular-offset values $\Delta\Phi_1$ and $\Delta\Phi_2$, respectively, to produce the shifted scan lines 410P' and 410Q'. In the example of FIG. 25, the angular-offset values $\Delta\Phi_1$ and $\Delta\Phi_2$ are approximately −6° and +6°, respectively. The initial scan pattern 200 has an angular range of approximately 26°, and the adjusted scan pattern 200' has an angular range of approximately 14°. In particular embodiments, angular-offset values $\Delta\Phi_1$ and $\Delta\Phi_2$ may be set to any suitable angular values, and the adjusted scan pattern 200' may be larger, smaller, or approximately the same size as the initial scan pattern 200. Additionally, the adjusted scan pattern 200' may be shifted up or down with respect to the initial scan pattern 200.

In particular embodiments, a lidar system 100 may include a processor configured to adjust a $\Theta_y$-axis scan profile 500 based at least in part on a driving condition of a vehicle 520 in which the lidar system 100 is operating. In particular embodiments, a driving condition that triggers adjustment of a $\Theta_y$-axis scan profile may include detection of a target 130 within the adjustable field of regard of the lidar system 100. As an example, a lidar system 100 in a vehicle 520 may operate with a scan pattern 200 based on FIG. 21. After a target 130 is detected, the scan pattern 200 may be adjusted to that of FIG. 22 (where at least part of the target 130 is located between scan lines 410I and 410J) or FIG. 23 (where at least part of the target 130 is located between scan lines 410K and 410L). As another example, a lidar system 100 may operate using scan pattern 200 illustrated in FIG. 25, and after a target 130 is detected, the maximum and minimum angles may be adjusted to produce the adjusted scan pattern 200'. The adjusted scan pattern 200' may have a higher scan-line density or a higher frame rate than the initial scan pattern 200. Scanning a target 130 with an adjusted scan pattern 200' may allow the lidar system 100 to provide information about the target 130 that has an increased spatial resolution (e.g., a higher density of scan lines 410) or an increased temporal resolution (e.g., a higher frame rate).

In particular embodiments, a driving condition that triggers adjustment of a $\Theta_y$-axis scan profile 500 may include a grade of a road on which the vehicle 520 is operating or a change in the grade of a road on which the vehicle 520 is operating. The grade of a road represents the slope of a road and may be referred to as a gradient, incline, pitch, rise, or slope. As an example, if the road ahead begins to slope upward (e.g., there is an uphill section ahead), then the lidar system 100 may apply a corresponding upward angular offset $\Delta\Phi$ to shift the scan pattern upward (e.g., as illustrated in FIG. 24). As another example, if the road ahead begins to slope downward (e.g., there is a downhill section ahead), then the lidar system 100 may apply a downward angular offset to shift the scan pattern downward).

Figure 26:
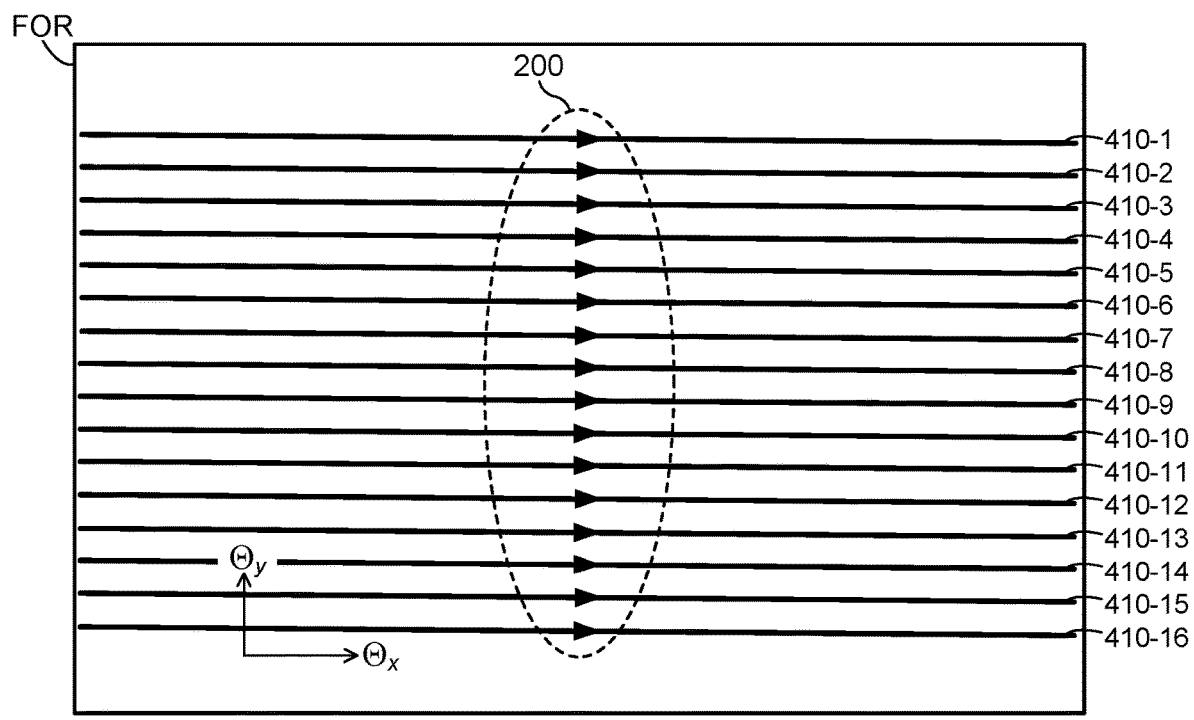
FIG. 26 illustrates an example scan pattern with 16 scan lines.

FIG. 26 illustrates an example scan pattern 200 with 16 scan lines (scan line 410-1 through scan line 410-16). In particular embodiments, a scan pattern 200 may be a non-interlaced scan pattern 200, where the scan lines 410 are scanned sequentially. A sequential scan of a series of scan lines 410 may refer to the scan lines 410 being scanned in order of their respective spatial position. For example, scanner 120 may be configured to scan a series of scan lines 410 in order from left to right or from top to bottom. As another example, a non-interlaced scan pattern 200 may include three adjacent scan lines 410 (e.g., in order of their spatial position, a first scan line, a second scan line, and a third scan line), where the second scan line is scanned after the first scan line, and the third scan line is scanned after the second scan line. Scan pattern 200 illustrated in FIG. 26 may be a non-interlaced scan pattern 200 where a scan begins with scan line 410-1 and ends with scan line 410-16. In FIG. 26, the scan lines may be scanned in order from scan line 410-1 to scan line 410-16 to form a full-resolution scan of a FOR or FOR'. For example, scan line 410-1 may be scanned first, followed by scan line 410-2, then scan line 410-3, and so on until scan line 410-16 is scanned. In particular embodiments, a non-interlaced scan pattern 200 (which may be referred to as a sequential scan pattern) may include any suitable number of scan lines 410, such as for example, approximately 5, 10, 20, 50, 100, 200, or 500 scan lines 410. In particular embodiments, a non-interlaced scan pattern 200 may cover all or part of a fixed field of regard or may cover all or part of an adjustable field of regard.

Figure 27:
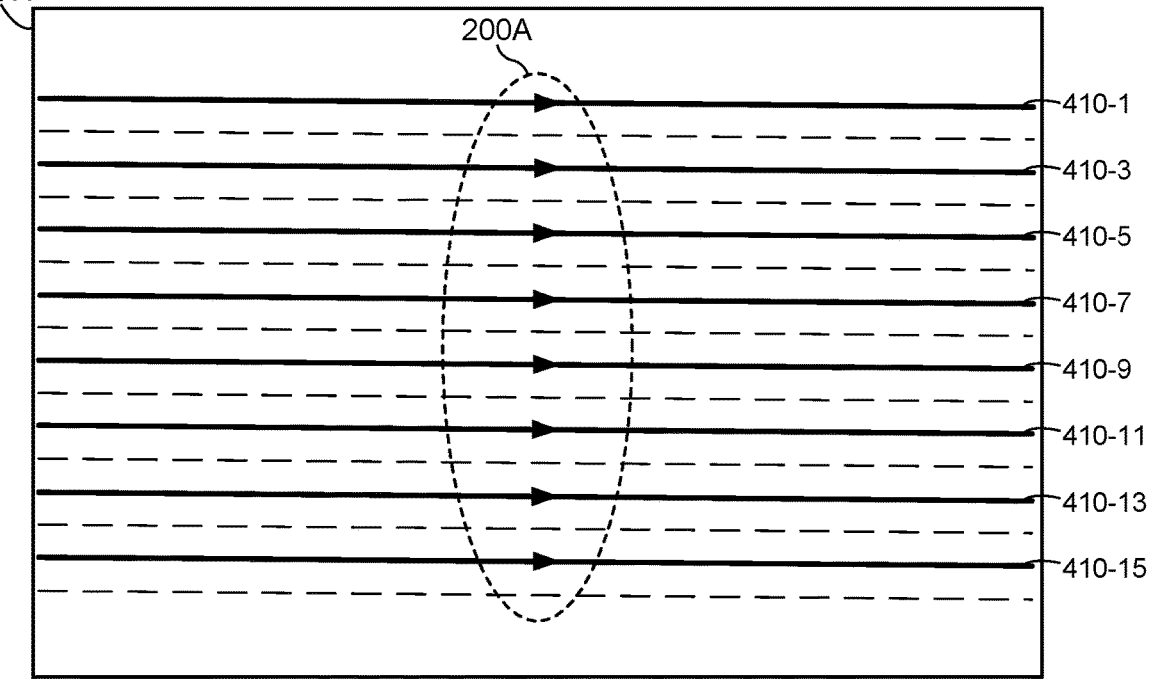
FIGS. 27-28 each illustrate one part of an example 2-fold interlaced scan pattern.
Figure 28:
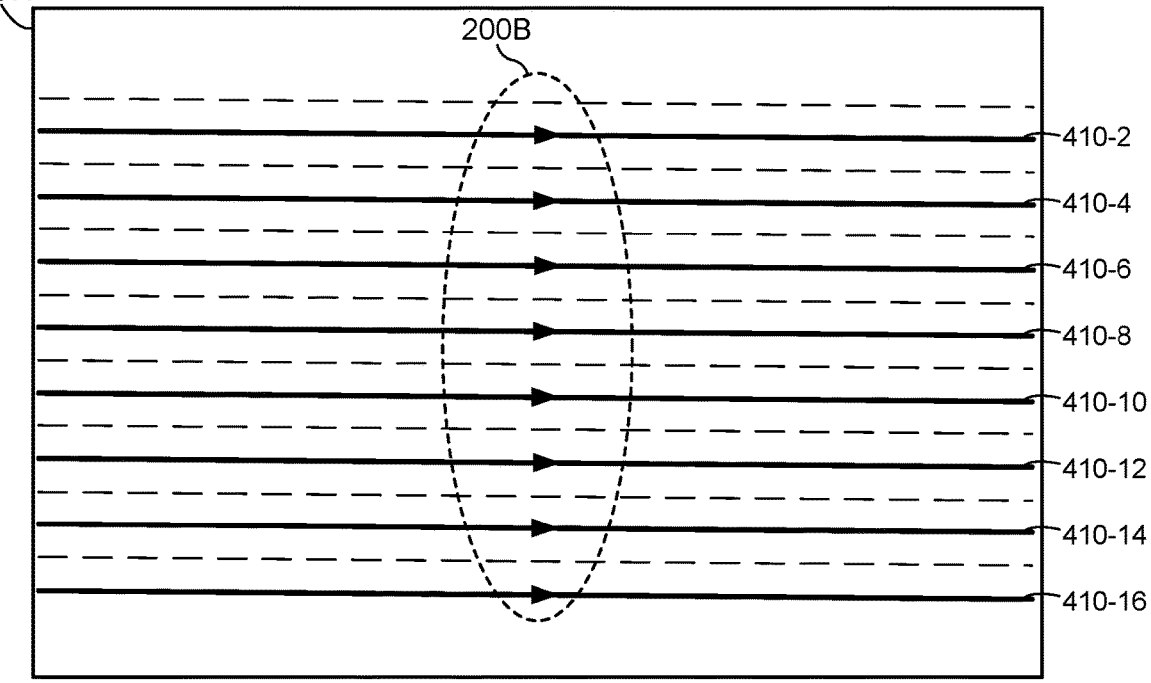

FIGS. 27-28 each illustrate one part of an example 2-fold interlaced scan pattern. In particular embodiments, an interlaced scan pattern may include two or more parts (e.g., scan patterns 200A and 200B), and each part may be referred to as a sub-scan, a sub-cycle, a partial scan, a low-resolution scan, a high-frequency scan, or a high frame-rate scan. The two sub-scans illustrated in FIGS. 27-28 (scan pattern 200A and scan pattern 200B) together may represent an interlaced scan pattern that corresponds to the full-resolution scan pattern 200 illustrated in FIG. 26. Scan pattern 200A in FIG. 27 includes the odd-numbered scan lines (scan lines 410-1, 410-3, 410-5, 410-7, 410-9, 410-11, 410-13, and 410-15) from scan pattern 200 in FIG. 26. Scan pattern 200B in FIG. 28 includes the even-numbered scan lines (scan lines 410-2, 410-4, 410-6, 410-8, 410-10, 410-12, 410-14, and 410-16) from scan pattern 200 in FIG. 26.

In FIG. 27, the dashed lines represent the even-numbered scan lines from scan pattern 200B. For example, the dashed line between adjacent scan lines 410-1 and 410-3 in FIG. 27 represents scan line 410-2 in FIG. 28. Similarly, in FIG. 28, the dashed lines represent the odd-numbered scan lines from scan pattern 200A. For example, the dashed line between adjacent scan lines 410-2 and 420-4 in FIG. 28 represents scan line 410-3 in FIG. 27. Each dashed line in FIGS. 27 and 28 represents a scan line that is part of an interlaced scan pattern but is not scanned in that particular sub-scan. The dashed lines in FIG. 27 represent scan lines that are not scanned in scan pattern 200A but are scanned in scan pattern 200B. Similarly, the dashed lines in FIG. 28 represent scan lines that are not scanned in scan pattern 200B but are scanned in scan pattern 200A.

FIGS. 29-32 each illustrate one part of an example 4-fold interlaced scan pattern. The four sub-scans (scan patterns 200-1, 200-2, 200-3, and 200-4) together may represent an interlaced scan pattern that corresponds to the full-resolution scan pattern 200 illustrated in FIG. 26. Each sub-scan in FIGS. 29-32 starts with a particular scan line from scan pattern 200 in FIG. 26 and includes every succeeding fourth scan line. Scan pattern 200-1 in FIG. 29 (which may start with scan line 410-1 or 410-13) includes scan lines 410-1, 410-5, 410-9, and 410-13 from scan pattern 200 in FIG. 26. Scan pattern 200-2 in FIG. 30 (which may start with scan line 410-2 or 410-14) includes scan lines 410-2, 410-6, 410-10, and 410-14 from scan pattern 200 in FIG. 26. Scan pattern 200-3 in FIG. 31 includes scan lines 410-3, 410-7, 410-11, and 410-15 from scan pattern 200 in FIG. 26. Scan pattern 200-4 in FIG. 32 includes scan lines 410-4, 410-8, 410-12, and 410-16 from scan pattern 200 in FIG. 26.

Figure 29:
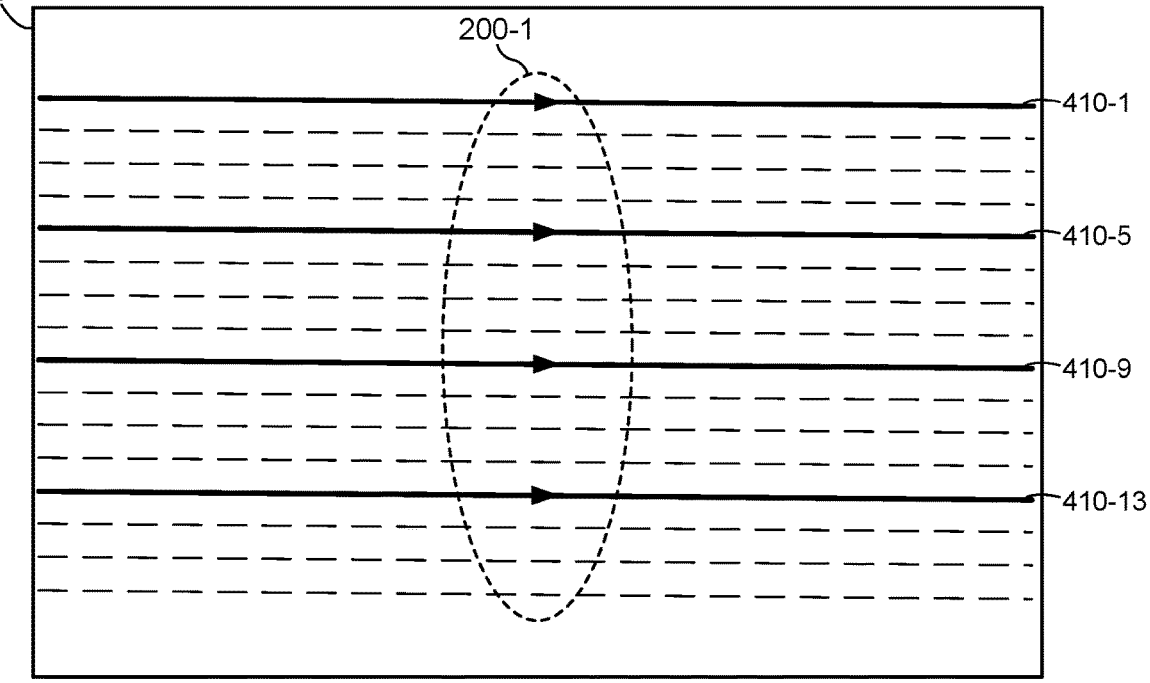
FIGS. 29-32 each illustrate one part of an example 4-fold interlaced scan pattern.
Figure 30:
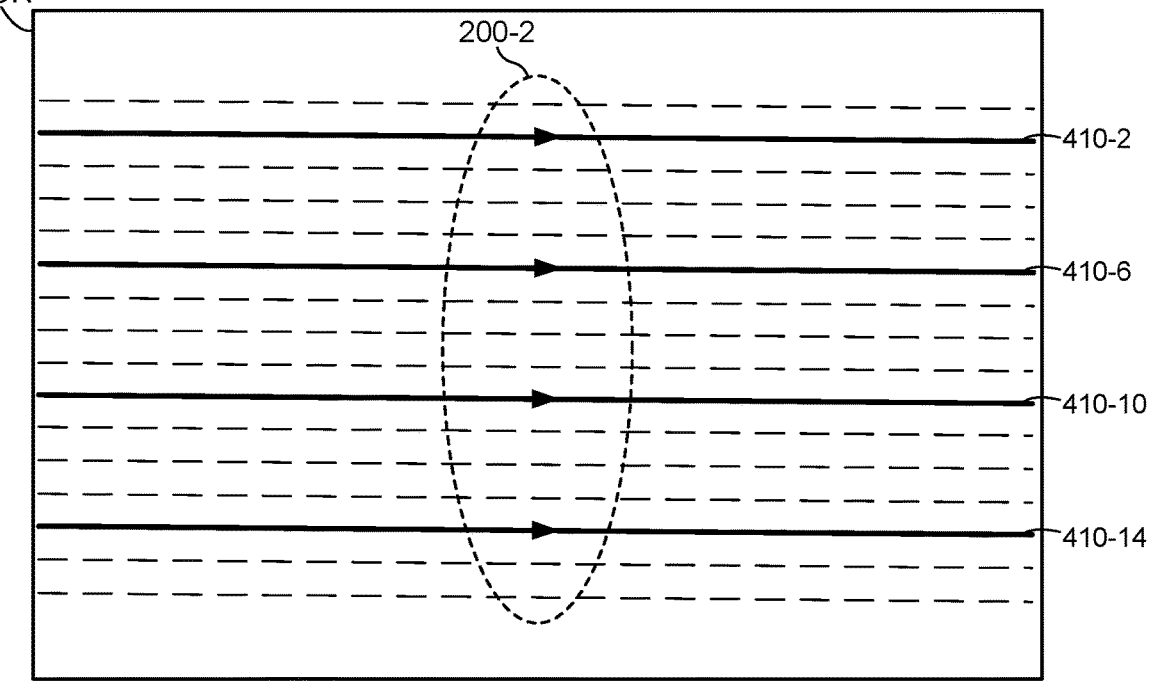
Figure 31:
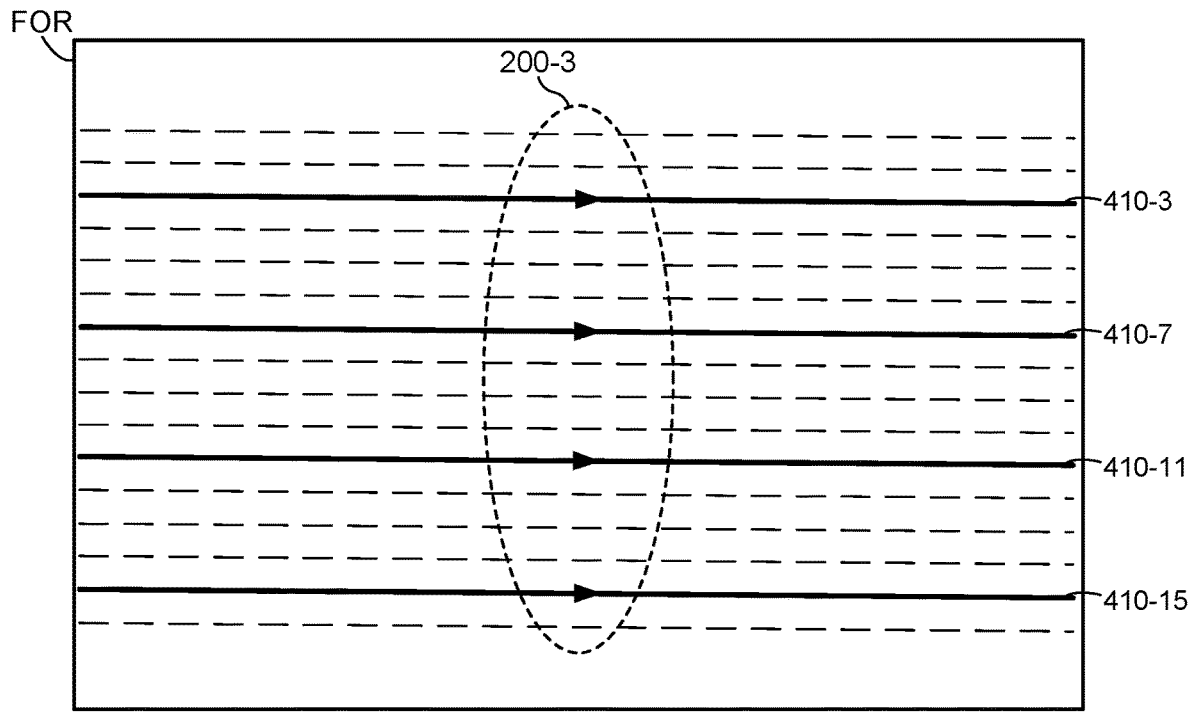
Figure 32:
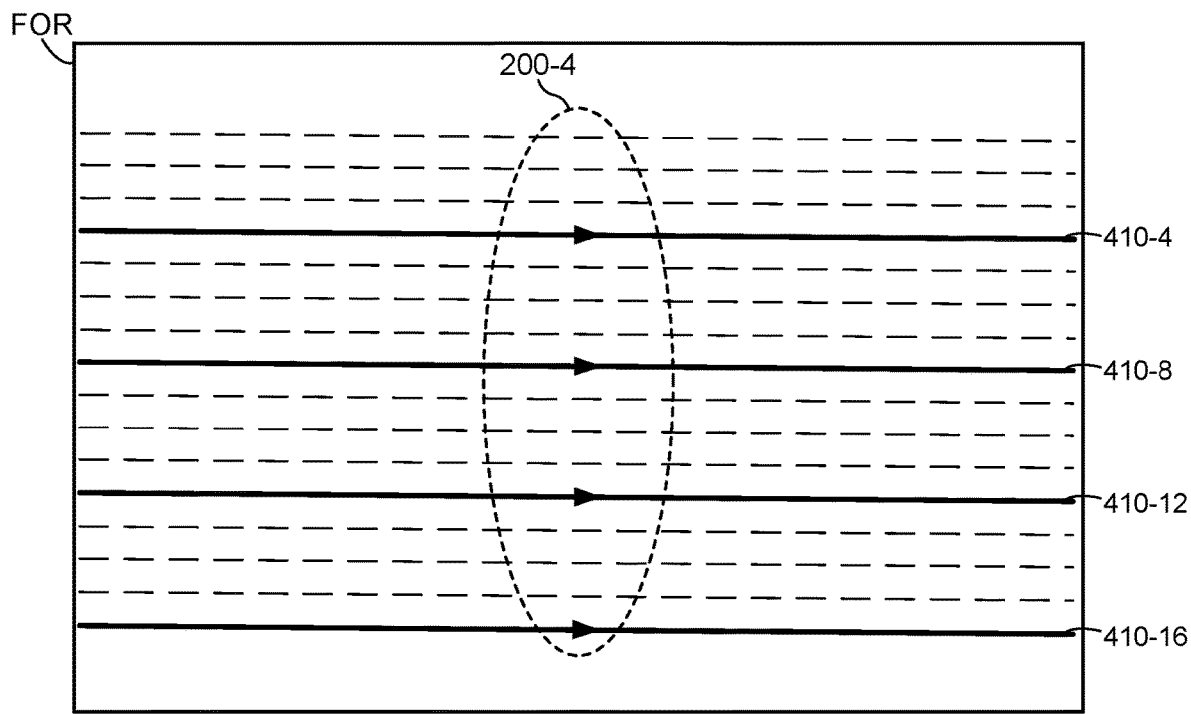

In FIGS. 29-32, each pair of adjacent scan lines in a particular sub-scan is separated by three scan lines (represented by dashed lines) from other sub-scans. Each dashed line in FIGS. 29-32 represents a scan line that is part of an interlaced scan pattern but is not scanned in that particular sub-scan. The dashed lines in FIG. 29 represent scan lines that are not scanned in scan pattern 200-1 but are scanned in scan patterns 200-2, 200-3, and 200-4. For example, the three dashed lines between adjacent scan lines 410-1 and 410-5 represent scan line 410-2 in FIG. 30, scan line 410-3 in FIG. 31, and scan line 410-4 in FIG. 32. As another example, in FIG. 32, the three dashed lines between adjacent scan lines 410-12 and 410-16 represent scan line 410-13 in FIG. 29, scan line 410-14 in FIG. 30, and scan line 410-15 in FIG. 31.

In particular embodiments, an interlaced scan pattern may refer to a scan pattern where the scan lines 410 are scanned in a non-sequential order (e.g., the scan lines are scanned in an order that differs from a spatial arrangement of the scan lines). An interlaced scan pattern may be referred to as a non-sequential scan pattern or an interleaved scan pattern. In particular embodiments, an interlaced scan pattern may include two or more sub-scans, where each sub-scan of the interlaced scan pattern represents a subset or a part of a full-resolution scan. Each sub-scan includes scan lines 410 that are interlaced with (e.g., located adjacent to or between) scan lines 410 of the other sub-scans. While the scan lines of an interlaced scan pattern may be scanned in a non-sequential manner, the scan lines of each sub-scan may be scanned sequentially according to the spatial arrangement of the scan lines in that sub-scan. For example, the scan lines of sub-scan 200-1 illustrated in FIG. 29 may be scanned in the following order: 410-1, 410-5, 410-9, 410-13.

In particular embodiments, the sub-scans of an interlaced scan pattern may be scanned in a particular order (e.g., scan pattern 200B may be scanned after scan pattern 200A is scanned), and each sub-scan may be used to generate a partial-resolution point cloud. Additionally, the pixels 210 or point clouds from each of the sub-scans may be combined together to produce a full-resolution point cloud. The partial-resolution point clouds may have a lower resolution than the full-resolution point cloud, but a series of partial-resolution point clouds may be produced at a higher frame rate than the full-resolution point cloud.

In FIGS. 27-28, scan patterns 200A and 200B together may represent an interlaced scan pattern that corresponds to the full-resolution scan pattern 200 illustrated in FIG. 26. When scan patterns 200A and 200B are scanned in series, each scan of scan pattern 200A and 200B may be used to generate a corresponding partial-resolution point cloud. Additionally, successive scans of scan patterns 200A and 200B may be combined together to form a full-resolution point cloud corresponding to scan pattern 200 in FIG. 26. Similarly, scan patterns 200-1, 200-2, 200-3, and 200-4 together may represent an interlaced scan pattern that corresponds to scan pattern 200 illustrated in FIG. 26. The scan patterns 200-1, 200-2, 200-3, and 200-4 may be scanned sequentially to produce a series of partial-resolution point clouds, where each partial-resolution point cloud corresponds to one of the sub-scans. Additionally, the pixels 210 or point clouds obtained from each of the four sub-scans 200-1, 200-2, 200-3, and 200-4 may be combined together to form a full-resolution point cloud corresponding to scan pattern 200 in FIG. 26.

In particular embodiments, an interlaced scan pattern may include any suitable number of sub-scans, such as for example, 2, 3, 5, 10, 20, or 50 sub-scans. FIGS. 27-28 represent an interlaced scan pattern that includes 2 sub-scans, and FIGS. 29-32 represent an interlaced scan pattern that includes 4 sub-scans. In particular embodiments, the sub-scans of an interlaced scan pattern may be scanned in any suitable sequence or order. For example, the four sub-scans illustrated in FIGS. 29-32 may be scanned in the following order: 200-1, 200-2, 200-3, 200-4. As another example, the four sub-scans may be scanned in the following order: 200-1, 200-3, 200-2, 200-4. In particular embodiments, an interlaced scan pattern may be scanned repeatedly using a particular sequence. For example, the four sub-scans in FIGS. 29-32 may be repeatedly scanned using the same sequence (e.g., 200-1, 200-2, 200-3, 200-4). In particular embodiments, an interlaced scan pattern may be scanned repeatedly using two or more particular sequences. For example, the four sub-scans in FIGS. 29-32 may scanned first with one sequence (e.g., 200-1, 200-2, 200-3, 200-4) and then with a different sequence (e.g., 200-4, 200-3, 200-2, 200-1). In particular embodiments, scanning the sub-scans of an interlaced scan pattern in sequence may refer to scanning the sub-scans such that a succeeding sub-scan begins only after a preceding sub-scan is completed.

In particular embodiments, an interlaced scan pattern may include any suitable number of scan lines 410 distributed between any suitable number of sub-scans. As an example, an interlaced scan pattern may include 64 scan lines 410 distributed between two sub-scans (e.g., each sub-scan may include 32 scan lines) or distributed between four sub-scans (e.g., each sub-scan may include 16 scan lines). FIGS. 27-28 represent an interlaced scan pattern with 16 scan lines distributed between two sub-scans (sub-scans 200A and 200B), and FIGS. 29-32 represent an interlaced scan pattern with 16 scan lines distributed between four sub-scans (sub-scans 200-1, 200-2, 200-3, and 200-4). In particular embodiments, the scan lines 410 of an interlaced scan pattern may be distributed substantially evenly between the associated sub-scans. As an example, for an interlaced scan pattern with 64 scan lines 410 and four sub-scans, each sub-scan may include 15-17 scan lines 410. In particular embodiments, the scan lines 410 of an interlaced scan pattern may be distributed in a non-uniform manner between the associated sub-scans. As an example, for an interlaced scan pattern with 64 scan lines and four sub-scans, a first sub-scan may include approximately 32 scan lines, a second sub-scan may include approximately 16 scan lines, and the remaining two sub-scans may each include approximately 8 scan lines.

In particular embodiments, each sub-scan of an interlaced scan pattern may be scanned in the same direction. As an example, each of the four sub-scans illustrated in FIGS. 29-32 may be scanned along the $\Theta_y$ scan axis in a top-to-bottom direction (e.g., as illustrated by scan profile 500 in FIG. 16). The scan lines of sub-scan 200-1 may be scanned in order 410-1, 410-5, 410-9, 410-13. Then, the scan lines of sub-scan 200-2 may be scanned in order 410-2, 410-6, 410-10, 410-14. In particular embodiments, sequential sub-scans of an interlaced scan pattern may be scanned in opposite directions (e.g., as illustrated by the dual-direction scan profile 500 in FIG. 20). As an example, sub-scans 200-1 and 200-3 may be scanned along the $\Theta_y$ scan axis in a top-to-bottom direction, and sub-scans 200-2 and 200-4 may be scanned in a bottom-to-top direction. The scan lines of sub-scan 200-1 may be scanned in a top-down order (e.g., 410-1, 410-5, 410-9, 410-13), and then, the scan lines of sub-scan 200-2 may be scanned in a bottom-up order (e.g., 410-14, 410-10, 410-6, 410-2).

In particular embodiments, a lidar system 100 may include a light source 110 configured to emit pulses of light and a scanner 120 configured to scan at least a portion of the emitted pulses of light along an interlaced scan pattern. The scanner 120 may include an x-scan mirror (e.g., mirror 300-1 in FIG. 3 or 4) and a y-scan mirror (e.g., mirror 300-2 in FIG. 3 or 4). The x-scan mirror may be configured to scan pulses of light substantially parallel to a $\Theta_x$ scan axis to produce multiple scan lines 410 of the interlaced scan pattern, where each scan line 410 is oriented substantially parallel to the $\Theta_x$ scan axis. The y-scan mirror may be configured to distribute the scan lines 410 along a $\Theta_y$ scan axis that is substantially orthogonal to scan axis $\Theta_x$. In particular embodiments, the scan lines 410 (which may include a first scan line, a second scan line, and a third scan line) may be distributed in an interlaced manner. As an example, the second scan line may be disposed between the first and third scan lines, and the second scan line may be scanned after the first and third scan lines are scanned. In the example of FIGS. 27-28, scan line 410-2 of sub-scan 200B is located between the adjacent scan lines 410-1 and 410-3 of sub-scan 200A, and scan line 410-2 may be scanned after scan lines 410-1 and 410-3 are scanned. For example, a scanner 120 may be configured to scan across scan pattern 200A (which includes scan lines 410-1 and 410-3) prior to scanning across scan pattern 200B (which includes scan line 410-2).

In particular embodiments, an interlaced scan pattern may include two sub-scans having multiple even scan lines and multiple odd scan lines, respectively. The even and odd scan lines may be distributed in an interlaced manner where: (1) each pair of adjacent even scan lines is separated by an odd scan line; (2) each pair of adjacent odd scan lines is separated by an even scan line; and (3) the even scan lines are scanned after the odd scan lines are scanned. The interlaced scan pattern represented by FIGS. 27-28 includes the odd-numbered scan lines of sub-scan 200A and the even-numbered scan lines of sub-scan 200B. The scan lines of sub-scans 200A and 200B are interlaced so that adjacent odd-numbered scan lines are separated by an even-numbered scan line, and adjacent even-numbered scan lines are separated by an odd-numbered scan line. For example, the adjacent odd-numbered scan lines 410-9 and 410-11 of sub-scan 200A are separated by a dashed line which represents the even-numbered scan line 410-10 of sub-scan 200B. Similarly, the adjacent even-numbered scan lines 410-14 and 410-16 of sub-scan 200B are separated by a dashed line which represents the odd-numbered scan line 410-15 of sub-scan 200A.

In particular embodiments, a scanner 120 of a lidar system 100 may be configured to alternately scan sub-scan 200A and sub-scan 200B. For example, the scanner 120 may first scan the odd scan lines of sub-scan 200A, and then, the scanner 120 may scan the even scan lines of sub-scan 200B (or vice versa). Additionally, the scanner may continue the scanning sequence by repeatedly scanning the odd scan lines followed by the even scan lines. In particular embodiments, the odd scan lines of an interlaced scan pattern may be used to produce a first partial-resolution point cloud, and the even scan lines may be used to produce a second partial-resolution point cloud. Additionally, the first and second partial-resolution point clouds (or the pixels 210 associated with each of the point clouds) may be combined to produce a full-resolution point cloud. For example, the odd scan lines of sub-scan 200A in FIG. 27 may be used to produce a first partial-resolution point cloud, and the even scan lines of sub-scan 200B in FIG. 28 may be used to produce a second partial-resolution point cloud. The two partial-resolution point clouds (or the pixels 210 associated with each of the point clouds) may be combined together to produce a full-resolution point cloud corresponding to scan pattern 200 in FIG. 26. For an interlaced scan pattern with two sub-scans, each partial-resolution point cloud may have approximately one-half as many pixels 210 as the full-resolution point cloud. As an example, each scan line in FIGS. 27-28 may include approximately 1,000 pixels, and each partial-resolution point cloud may include approximately 8,000 pixels 210. The full-resolution point cloud (which corresponds to scan pattern 200 in FIG. 26) may include approximately 16,000 pixels.

In particular embodiments, an interlaced scan pattern that includes n sub-scans (where n is an integer greater than or equal to 2) may be referred to as an n-fold interlaced scan pattern. Each sub-scan of an n-fold interlaced scan pattern may include two or more scan lines 410, and then sub-scans may be scanned in any suitable sequential manner. FIGS. 27-28 represent a 2-fold interlaced scan pattern (e.g., n=2) that includes two sub-scans (sub-scans 200A and 200B). Each sub-scan includes eight scan lines 410, and the sub-scans may be scanned in a sequential manner (e.g., sub-scan 200A is scanned prior to sub-scan 200B, or vice versa). FIGS. 29-32 represent a 4-fold interlaced scan pattern (e.g., n=4) that includes four sub-scans (sub-scans 200-1, 200-2, 200-3, and 200-4). Each sub-scan includes four scan lines 410, and the sub-scans may be scanned in any suitable sequential order. As an example, the sub-scans may be scanned in order 200-1, 200-2, 200-3, 200-4, and the scanning sequence may continue by repeatedly scanning the four sub-scans in order.

In particular embodiments, for an n-fold interlaced scan pattern (which includes n sub-scans), adjacent scan lines of a particular sub-scan may be separated from one another by (n−1) intermediate scan lines of the other sub-scans. The other sub-scans may include the (n−1) sub-scans which are different from the particular sub-scan, and the (n−1) intermediate scan lines located between the adjacent scan lines of the particular sub-scan may include one scan line from each of the other (n−1) sub-scans. For example, for a 3-fold interlaced scan pattern (which includes three sub-scans), adjacent scan lines of each sub-scan may be separated by two intermediate scan lines from the other two sub-scans. In particular embodiments, a pair of scan lines 410 in a particular sub-scan may be referred to as being adjacent if there are no other scan lines from that particular sub-scan located between the pair. In particular embodiments, an intermediate scan line 410 may refer to a scan line associated with another sub-scan that is located between adjacent scan lines 410 of a particular sub-scan. A pair of adjacent scan lines 410 may have one or more intermediate scan lines 410 from other sub-scans located between the pair. Sub-scan 200-1 in FIG. 29 includes three pairs of adjacent scan lines: scan lines 410-1 and 410-5; scan lines 410-5 and 410-9; and scan lines 410-9 and 410-13. Each pair of adjacent scan lines in sub-scan 200-1 has three intermediate scan lines.

In FIGS. 27-28, which represent a 2-fold interlaced scan pattern, adjacent odd-numbered scan lines in sub-scan 200A are separated by one intermediate scan line of sub-scan 200B. Similarly, each pair of adjacent even-numbered scan lines in sub-scan 200B is separated by one intermediate scan line of sub-scan 200A. In FIGS. 29-32, which represent a 4-fold interlaced scan pattern, adjacent scan lines are separated from one another by 3 intermediate scan lines of other sub-scans. For example, scan lines 410-1 and 410-5 of sub-scan 200-1 are separated by 3 intermediate scan lines (represented by the three dashed lines between scan lines 410-1 and 410-5 in FIG. 29). Additionally, the three intermediate scan lines include one scan line from each of the other 3 sub-scans: scan line 410-2 from sub-scan 200-2; scan line 410-3 from sub-scan 200-3; and scan line 410-4 from sub-scan 200-4. As another example, scan lines 410-7 and 410-11 of sub-scan 200-3 are separated by 3 intermediate scan lines from each of the other 3 sub-scans: scan line 410-8 from sub-scan 200-4; scan line 410-9 from sub-scan 200-1; and scan line 410-10 from sub-scan 200-2.

In particular embodiments, an n-fold interlaced scan pattern may include a total of N scan lines 410, and each sub-scan of the n-fold interlaced scan pattern may include approximately N/n scan lines 410. As an example, a 3-fold interlaced scan pattern may include a total of 64 scan lines 410, and the scan lines 410 may be allocated to each of the three sub-scans in a substantially uniform manner so that each sub-scan includes approximately 21-22 scan lines 410. As another example, for a 4-fold interlaced scan pattern with a total of 100 scan lines 410, each sub-scan may include approximately 25 scan lines 410. FIGS. 29-32 represent a 4-fold interlaced scan pattern with a total of 16 scan lines, and each sub-scan includes four scan lines 410.

In particular embodiments, an n-fold interlaced scan pattern may be scanned in a time period $\Delta T$ (where $\Delta T$ may be approximately equal to scan time $\tau_{scan}$ discussed above). As an example, a scanner 120 may scan across an interlaced scan pattern every 100 ms, corresponding to a 10 Hz frame rate. For each scan of an interlaced scan pattern, a corresponding full-resolution point cloud may be produced, and a series of full-resolution point clouds (associated with repeated scans of the interlaced scan pattern) may be produced at a frequency of approximately $1/\Delta T$. As an example, a scanner 120 may scan across an interlaced scan pattern in a 100-ms time period, and full-resolution point clouds corresponding to each scan of the interlaced scan patterns may be produced at a frequency (or, frame rate) of approximately 10 Hz. In particular embodiments, for an n-fold interlaced scan pattern that is scanned in a time period $\Delta T$, partial-resolution point clouds based on each of the n sub-scans of the interlaced scan pattern may be produced at a frequency of approximately $n/\Delta T$. As an example, for a 4-fold interlaced scan pattern that is scanned in a 100-ms time period, partial-resolution point clouds based on each of the four sub-scans may be produced approximately every 25 ms, corresponding to a frequency of approximately 40 Hz. In particular embodiments, for an n-fold interlaced scan pattern, partial-resolution point clouds may be produced at a frame rate that is approximately n times higher than the frame rate of the corresponding full-resolution point clouds.

In particular embodiments, a scanner 120 may be configured to scan pulses of light emitted by light source 110 along a non-interlaced scan pattern as well as along an interlaced scan pattern. As an example, a scanner 120 may be configured to scan along a non-interlaced scan pattern represented by scan pattern 200 in FIG. 26. Additionally, the scanner 120 may be configured to scan along an interlaced scan pattern represented by sub-scans 200-1, 200-2, 200-3, and 200-4 illustrated in FIGS. 29-32. In particular embodiments, an interlaced scan pattern may provide a higher frame rate than a non-interlaced scan pattern. As an example, a non-interlaced scan pattern may produce full-resolution point clouds at a frame rate of $1/\Delta T$, and a corresponding n-fold interlaced scan pattern may produce partial-resolution point clouds at a frame rate that is approximately n-times higher (e.g., $n/\Delta T$). An interlaced scan pattern represented by the four sub-scans in FIGS. 29-32 may produce point clouds at a frame rate that is approximately four times higher than a non-interlaced scan pattern based on FIG. 26. The partial-resolution point clouds produced by an interlaced scan pattern may have lower resolution (e.g., a lower number of pixels 210 or a lower density of pixels 210) than the full-resolution point clouds produced by a non-interlaced scan pattern, but the partial-resolution point clouds may allow a lidar system 100 to monitor or track objects at a higher frame rate. Additionally, a set of n successive partial-resolution point clouds may be combined to produce a full-resolution point cloud having approximately the same resolution and frame rate as a full-resolution point cloud produced using a non-interlaced scan pattern.

In particular embodiments, a scanner 120 in a lidar system 100 may be configured to switch from scanning along a non-interlaced scan pattern to scanning along an interlaced scan pattern (or vice versa). As an example, lidar system 100 may be coupled to or may include a processor (e.g., controller 150) configured to send an instruction that results in the scanner 120 switching from scanning along a non-interlaced scan pattern to scanning along an interlaced scan pattern. In particular embodiments, switching from a non-interlaced scan pattern to an interlaced scan pattern (or vice versa) may be based at least in part on a driving condition of a vehicle in which lidar system 100 is operating. As an example, a driving condition may include determining that a target 130 is within a particular threshold distance of the vehicle or lidar system 100. The target 130 may be a bicycle located within 50 meters of the vehicle, and the lidar system may switch to scanning with an n-fold interlaced scan pattern so that information about the bicycle (e.g., location, direction, or speed) may be provided at a n-times higher rate. As another example, a driving condition may include determining that a target 130 has a speed with respect to the lidar system 100 that is above a particular threshold speed. The target 130 may be a vehicle moving at greater than 50 miles per hour with respect to the lidar system 100, and scanning with an interlaced scan pattern may provide information about the vehicle (e.g., location, direction, or speed) at a higher rate than a non-interlaced scan pattern.

Figure 33:
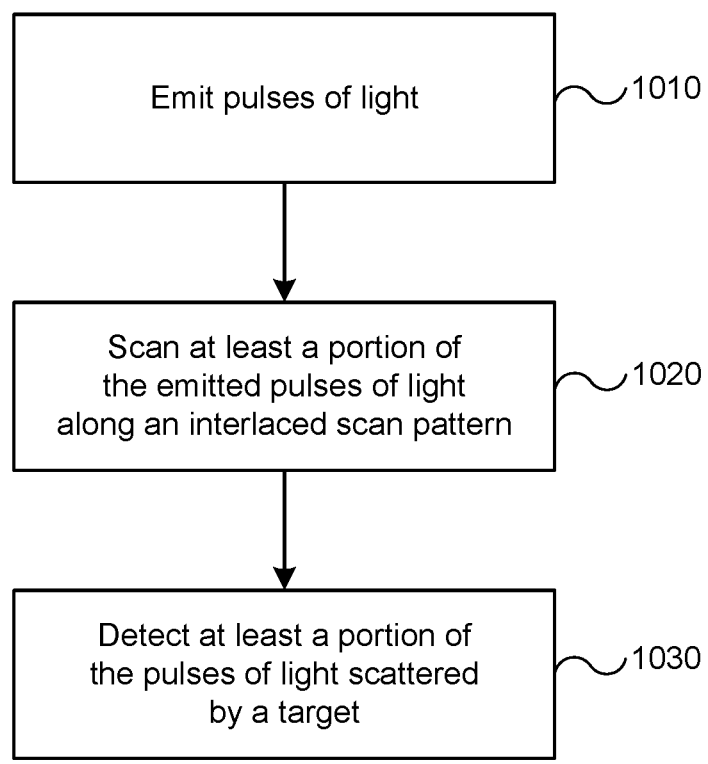
FIG. 33 illustrates an example method for scanning along an interlaced scan pattern.

FIG. 33 illustrates an example method 1000 for scanning along an interlaced scan pattern. The method may begin at step 1010, where pulses of light may be emitted by a light source 110 of a lidar system 100. As an example, light source 110 may be a pulsed laser that emits pulses with a 0.5-5 ns duration and a wavelength of 1400-1600 nm. At step 1020, at least a portion of the emitted pulses of light may be scanned along an interlaced scan pattern. The pulses may be scanned substantially parallel to scan axis $\Theta_x$ to produce multiple scan lines 410 of the interlaced scan pattern, where each scan line 410 is oriented substantially parallel to scan axis $\Theta_x$, and the scan lines 410 may be distributed along scan axis $\Theta_y$ in an interlaced manner. For example, the scan lines 410 may include a first scan line, a second scan line, and a third scan line. The second scan line may be an intermediate scan line disposed between the first and third scan lines, and the second scan line may be scanned after the first and third scan lines are scanned. At step 1030, at least a portion of the pulses of light scattered by a target 130 may be detected, at which point the method may end. As an example, pulses of light scattered by a target 130 may be detected by an APD that is part of a receiver 140.

Figure 34:
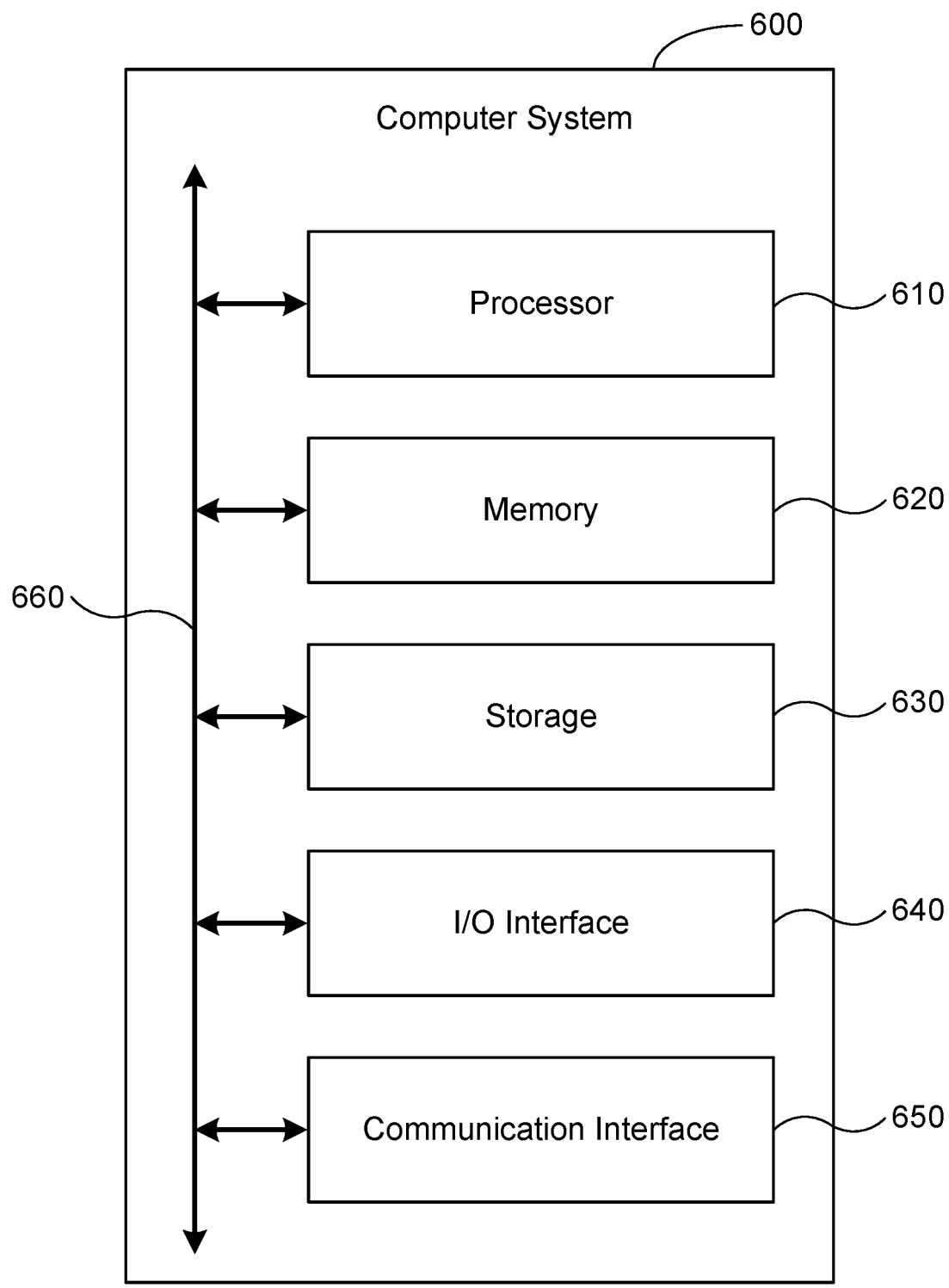
FIG. 34 illustrates an example computer system.

FIG. 34 illustrates an example computer system 600. In particular embodiments, one or more computer systems 600 may perform one or more steps of one or more methods described or illustrated herein. In particular embodiments, one or more computer systems 600 may provide functionality described or illustrated herein. In particular embodiments, software running on one or more computer systems 600 may perform one or more steps of one or more methods described or illustrated herein or may provide functionality described or illustrated herein. Particular embodiments may include one or more portions of one or more computer systems 600. In particular embodiments, a computer system may be referred to as a computing device, a computing system, a computer, a general-purpose computer, or a data-processing apparatus. Herein, reference to a computer system may encompass one or more computer systems, where appropriate.

Computer system 600 may take any suitable physical form. As an example, computer system 600 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 600 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

As illustrated in the example of FIG. 34, computer system 600 may include a processor 610, memory 620, storage 630, an input/output (I/O) interface 640, a communication interface 650, or a bus 660. Computer system 600 may include any suitable number of any suitable components in any suitable arrangement.

In particular embodiments, processor 610 may include hardware for executing instructions, such as those making up a computer program. As an example, to execute instructions, processor 610 may retrieve (or fetch) the instructions from an internal register, an internal cache, memory 620, or storage 630; decode and execute them; and then write one or more results to an internal register, an internal cache, memory 620, or storage 630. In particular embodiments, processor 610 may include one or more internal caches for data, instructions, or addresses. Processor 610 may include any suitable number of any suitable internal caches, where appropriate. As an example, processor 610 may include one or more instruction caches, one or more data caches, or one or more translation lookaside buffers (TLBs). Instructions in the instruction caches may be copies of instructions in memory 620 or storage 630, and the instruction caches may speed up retrieval of those instructions by processor 610. Data in the data caches may be copies of data in memory 620 or storage 630 for instructions executing at processor 610 to operate on; the results of previous instructions executed at processor 610 for access by subsequent instructions executing at processor 610 or for writing to memory 620 or storage 630; or other suitable data. The data caches may speed up read or write operations by processor 610. The TLBs may speed up virtual-address translation for processor 610. In particular embodiments, processor 610 may include one or more internal registers for data, instructions, or addresses. Processor 610 may include any suitable number of any suitable internal registers, where appropriate. Where appropriate, processor 610 may include one or more arithmetic logic units (ALUs); may be a multi-core processor; or may include one or more processors 610.

In particular embodiments, memory 620 may include main memory for storing instructions for processor 610 to execute or data for processor 610 to operate on. As an example, computer system 600 may load instructions from storage 630 or another source (such as, for example, another computer system 600) to memory 620. Processor 610 may then load the instructions from memory 620 to an internal register or internal cache. To execute the instructions, processor 610 may retrieve the instructions from the internal register or internal cache and decode them. During or after execution of the instructions, processor 610 may write one or more results (which may be intermediate or final results) to the internal register or internal cache. Processor 610 may then write one or more of those results to memory 620. One or more memory buses (which may each include an address bus and a data bus) may couple processor 610 to memory 620. Bus 660 may include one or more memory buses. In particular embodiments, one or more memory management units (MMUs) may reside between processor 610 and memory 620 and facilitate accesses to memory 620 requested by processor 610. In particular embodiments, memory 620 may include random access memory (RAM). This RAM may be volatile memory, where appropriate. Where appropriate, this RAM may be dynamic RAM (DRAM) or static RAM (SRAM). Memory 620 may include one or more memories 620, where appropriate.

In particular embodiments, storage 630 may include mass storage for data or instructions. As an example, storage 630 may include a hard disk drive (HDD), a floppy disk drive, flash memory, an optical disc, a magneto-optical disc, magnetic tape, or a Universal Serial Bus (USB) drive or a combination of two or more of these. Storage 630 may include removable or non-removable (or fixed) media, where appropriate. Storage 630 may be internal or external to computer system 600, where appropriate. In particular embodiments, storage 630 may be non-volatile, solid-state memory. In particular embodiments, storage 630 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 630 may include one or more storage control units facilitating communication between processor 610 and storage 630, where appropriate. Where appropriate, storage 630 may include one or more storages 630.

In particular embodiments, I/O interface 640 may include hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 640 may include one or more device or software drivers enabling processor 610 to drive one or more of these I/O devices. I/O interface 640 may include one or more I/O interfaces 640, where appropriate.

In particular embodiments, communication interface 650 may include hardware, software, or both providing one or more interfaces for communication (such as, for example, packet-based communication) between computer system 600 and one or more other computer systems 600 or one or more networks. As an example, communication interface 650 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 600 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 600 may communicate using fiber-optic communication based on 100 Gigabit Ethernet (100 GbE), 10 Gigabit Ethernet (10 GbE), or Synchronous Optical Networking (SONET). Computer system 600 may include any suitable communication interface 650 for any of these networks, where appropriate. Communication interface 650 may include one or more communication interfaces 650, where appropriate.

In particular embodiments, bus 660 may include hardware, software, or both coupling components of computer system 600 to each other. As an example, bus 660 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 660 may include one or more buses 660, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 600. As an example, computer software may include instructions configured to be executed by processor 610. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
a light source configured to emit pulses of light;
a scanner configured to scan at least a portion of the emitted pulses of light along an interlaced scan pattern, comprising:
scanning the portion of the emitted pulses of light substantially parallel to a first scan axis to produce a plurality of scan lines of the interlaced scan pattern, the plurality of scan lines comprising N scan lines; and
distributing the N scan lines along a second scan axis in an interlaced manner, wherein the interlaced scan pattern is an n-fold interlaced scan pattern comprising n sub-scans, wherein:
n is an integer greater than or equal to 2;
each sub-scan comprises approximately N/n scan lines of the interlaced scan pattern;
the n sub-scans are scanned sequentially wherein a first sub-scan of the n sub-scans is scanned prior to a second sub-scan; and
adjacent scan lines of a particular sub-scan are separated from one another by (n−1) intermediate scan lines of other sub-scans; and
a receiver configured to detect at least a portion of the scanned pulses of light scattered by a target located a distance from the lidar system.

2. The lidar system of claim 1, further comprising a processor, wherein:
the n-fold interlaced scan pattern is scanned in a time period ΔT; and
the processor is configured to produce partial-resolution point clouds based on each of the sub-scans at a frequency of approximately n/ΔT, wherein each partial-resolution point cloud corresponds to one of the sub-scans.

3. The lidar system of claim 2, wherein:
the time period ΔT is approximately 100 ms;
n is equal to 4, so that the interlaced scan pattern is a 4-fold interlaced scan pattern comprising four sub-scans; and
partial-resolution point clouds based on each of the sub-scans are produced at a frequency of approximately 40 Hz.

4. The lidar system of claim 1, further comprising a processor, wherein:
the n-fold interlaced scan pattern is scanned in a time period ΔT; and
the processor is configured to produce full-resolution point clouds based on the n-fold interlaced scan pattern at a frequency of approximately 1/ΔT.

5. The lidar system of claim 4, wherein:
the time period ΔT is approximately 100 ms; and
the full-resolution point clouds are produced at a frequency of approximately 10 Hz.

6. The lidar system of claim 1, wherein:
n=2; and
the interlaced scan pattern is a 2-fold interlaced scan pattern comprising the first sub-scan and the second sub-scan.

7. The lidar system of claim 6, wherein the first sub-scan comprises a plurality of even scan lines and the second sub-scan comprises a plurality of odd scan lines, wherein:
each pair of adjacent even scan lines is separated by an odd scan line; and
each pair of adjacent odd scan lines is separated by an even scan line.

8. The lidar system of claim 7, wherein:
the odd scan lines are used to produce a first partial-resolution point cloud; and
the even scan lines are used to produce a second partial-resolution point cloud.

9. The lidar system of claim 8, wherein the first and second partial-resolution point clouds are combined to produce a full-resolution point cloud.

10. The lidar system of claim 1, wherein:
n=4; and
the interlaced scan pattern is a 4-fold interlaced scan pattern comprising four sub-scans.

11. The lidar system of claim 1, wherein:
the other sub-scans comprise (n−1) sub-scans of the n sub-scans which are different from the particular sub-scan; and
the (n−1) intermediate scan lines located between the adjacent scan lines of the particular sub-scan comprise one scan line from each of the other sub-scans.

12. The lidar system of claim 1, wherein:
each scan line is oriented substantially parallel to the first scan axis; and
the second scan axis is substantially orthogonal to the first scan axis.

13. The lidar system of claim 1, wherein the scanner is further configured to scan another portion of the emitted pulses of light along a non-interlaced scan pattern, wherein scan lines of the non-interlaced scan pattern are scanned sequentially in order of their respective spatial position.

14. The lidar system of claim 13, wherein:
the scan lines of the non-interlaced scan pattern comprise a first scan line, a second scan line, and a third scan line, wherein the second scan line is disposed between the first and third scan lines; and
during a scan of the non-interlaced scan pattern, the second scan line is scanned after the first scan line is scanned, and the third scan line is scanned after the second scan line is scanned.

15. The lidar system of claim 13, wherein the interlaced scan pattern is configured to provide a higher frame rate than the non-interlaced scan pattern.

16. The lidar system of claim 13, further comprising a processor configured to instruct the scanner to switch from scanning along the non-interlaced scan pattern to scanning along the interlaced scan pattern.

17. The lidar system of claim 16, wherein the processor is configured to instruct the scanner to switch from the non-interlaced scan pattern to the interlaced scan pattern based at least in part on a driving condition of a vehicle in which the lidar system is operating.

18. The lidar system of claim 17, wherein the driving condition comprises the target being within a particular threshold distance of the vehicle or lidar system.

19. The lidar system of claim 17, wherein the driving condition comprises the target having a speed with respect to the lidar system above a particular threshold speed.

20. The lidar system of claim 1, wherein the scanner comprises a scanning mirror configured to scan the portion of the emitted pulses of light substantially parallel to the first scan axis, wherein the scanning mirror is driven repeatedly in a back-and-forth motion, wherein each scan line corresponds to a single forward or backward motion of the scanning mirror.

21. The lidar system of claim 1, wherein the scanner comprises a polygon mirror comprising two or more reflective surfaces, wherein:
   the polygon mirror is configured to continuously rotate in one direction about a rotation axis of the polygon mirror; and
   the portion of the emitted pulses of light are reflected sequentially from the reflective surfaces as the polygon mirror is rotated, resulting in the portion of the emitted pulses of light being scanned substantially parallel to the first scan axis to produce the plurality of scan lines, wherein each scan line corresponds to a reflection from one of the reflective surfaces.

22. The lidar system of claim 1, wherein the scanner comprises a scanning mirror configured to distribute the scan lines along the second scan axis.

23. The lidar system of claim 1, further comprising a processor configured to determine the distance from the lidar system to the target based at least in part on a round-trip time of flight for an emitted pulse of light to travel from the lidar system to the target and back to the lidar system.

24. A lidar system comprising:
   a light source configured to emit pulses of light;
   a scanner configured to scan at least a portion of the emitted pulses of light along an interlaced scan pattern, comprising:
      scanning the portion of the emitted pulses of light substantially parallel to a first scan axis to produce a plurality of scan lines of the interlaced scan pattern; and
      distributing the scan lines along a second scan axis in an interlaced manner, wherein the interlaced scan pattern is an n-fold interlaced scan pattern comprising n sub-scans, wherein:
         n is an integer greater than or equal to 2;
         each sub-scan comprises two or more of the scan lines of the interlaced scan pattern;
         the n sub-scans are scanned sequentially wherein a first sub-scan of the n sub-scans is scanned prior to a second sub-scan;
         the interlaced scan pattern is a dual-direction interlaced scan pattern wherein the first sub-scan is scanned in a first direction and the second sub-scan is scanned in a second direction opposite the first direction; and
         adjacent scan lines of a particular sub-scan are separated from one another by (n−1) intermediate scan lines of other sub-scans; and
   a receiver configured to detect at least a portion of the scanned pulses of light scattered by a target located a distance from the lidar system.

25. The lidar system of claim 24, wherein the first direction is a top-to-bottom direction and the second direction is a bottom-to-top direction.

\* \* \* \* \*